United States Patent [19]

Ohba et al.

[11] Patent Number: 4,499,544

[45] Date of Patent: * Feb. 12, 1985

[54] ELECTRONIC IGNITION CONTROL APPARATUS

[75] Inventors: Masahiro Ohba, Toyohashi; Kenzo Ito, Okazaki; Susumu Akiyama, Kariya; Yuuji Hirabayashi, Aichi; Satoshi Hirano, Kariya; Naoto Ooka, Gamagori, all of Japan

[73] Assignee: Nippondenso Co., Ltd., Kariya, Japan

[*] Notice: The portion of the term of this patent subsequent to Nov. 23, 1999 has been disclaimed.

[21] Appl. No.: 411,362

[22] Filed: Aug. 25, 1982

Related U.S. Application Data

[63] Continuation of Ser. No. 199,234, Oct. 21, 1980, Pat. No. 4,360,874.

[30] Foreign Application Priority Data

Oct. 22, 1979 [JP] Japan ............... 54-136216

[51] Int. Cl.³ .................. F02P 5/04; F02P 3/02; G05B 15/02
[52] U.S. Cl. .................. 364/431.04; 123/417; 123/610; 123/613; 364/431.12
[58] Field of Search ............. 123/416, 417, 418, 609; 364/431.04

[56] References Cited

U.S. PATENT DOCUMENTS

| | | | |
|---|---|---|---|
| 4,207,847 | 6/1980 | Hattori et al. | 123/418 |
| 4,225,925 | 9/1980 | Hattori et al. | 123/416 |
| 4,258,683 | 3/1981 | Hattori et al. | 123/416 |
| 4,273,089 | 6/1981 | Maier | 123/417 |
| 4,276,601 | 6/1981 | Tokuda et al. | 364/431.04 |
| 4,284,045 | 8/1981 | Maier | 123/416 |
| 4,298,941 | 11/1981 | Furuhashi | 364/431.04 |
| 4,303,977 | 12/1981 | Kobashi et al. | 364/431.04 |
| 4,304,203 | 12/1981 | Garcea et al. | 123/416 |
| 4,309,973 | 1/1982 | Tamura | 123/609 |
| 4,347,570 | 8/1982 | Akiyama et al. | 364/431.04 |

Primary Examiner—Felix D. Gruber
Attorney, Agent, or Firm—Cushman, Darby & Cushman

[57] ABSTRACT

In an electronic ignition control apparatus having RAM to initially store first and second signals indicative of the starting and terminating points for calculation of a time necessary for rotation of a predetermined angle defined by integer times as large as a predetermined angular interval of an output shaft of an engine, a rotation time of the output shaft is calculated during rotation of an angle of the output shaft defined by the first and second signals from RAM to calculate an optimum spark advance angle in relation to the operating condition of the engine such that an angular position defined by integer times as large as the predetermined angular interval at the advance angle side of the calculated advance angle is determined to be stored in RAM as a third signal. Calculation of a time defined by the difference between the calculated advance angle and the angular position defined by the third signal is started upon arrival of the output shaft to the angular position defined by the third signal from RAM and completed to deenergize the ignition coil of the engine previously energized.

8 Claims, 20 Drawing Figures

Fig. 20

| FIVE-DEGREE CRANK-ANGLE | DATA BIT ADDRESS | 9 | 10 | 11 | 12 | 13 | 14 | 15 |
|---|---|---|---|---|---|---|---|---|
| 0° | $200_{16}$ | $D_9$ | | $D_{11}$ | | | | |
| 5° ~ 25° | $202_{16}$ ~ $20A_{16}$ | | | | | | | |
| 30° | $20C_{16}$ | | | | $D_{12}$ | | | $D_{15}$ |
| 35° ~ 55° | $20E_{16}$ ~ $216_{16}$ | | | | | | | |
| 60° ~ 80° | $218_{16}$ ~ $220_{16}$ | | $D_{10}$ | | | | | |
| 85° | $222_{16}$ | | $D_{10}$ | | | | | |
| 90° ~ 115° | $224_{16}$ ~ $22E_{16}$ | | $D_{10}$ | | | | | |
| 120° | $230_{16}$ | $D_9$ | | $D_{11}$ | | | | |
| 125° ~ 145° | $232_{16}$ ~ $23A_{16}$ | | | | | | | |
| 150° | $23C_{16}$ | | | | $D_{12}$ | | | $D_{15}$ |
| 155° ~ 175° | $23E_{16}$ ~ $246_{16}$ | | | | | | | |
| 180° ~ 200° | $248_{16}$ ~ $250_{16}$ | | $D_{10}$ | | | | | |
| 205° | $252_{16}$ | | $D_{10}$ | | | | | |
| 210° ~ 235° | $254_{16}$ ~ $25E_{16}$ | | $D_{10}$ | | | | | |
| 240° | $260_{16}$ | $D_9$ | | $D_{11}$ | | | | |
| 245° ~ 265° | $262_{16}$ ~ $26A_{16}$ | | | | | | | |
| 270° | $26C_{16}$ | | | | $D_{12}$ | | | $D_{15}$ |
| 275° ~ 295° | $26E_{16}$ ~ $276_{16}$ | | | | | | | |
| 300° ~ 320° | $278_{16}$ ~ $280_{16}$ | | $D_{10}$ | | | | | |
| 325° | $282_{16}$ | | $D_{10}$ | | | | | |
| 330° ~ 355° | $284_{16}$ ~ $28E_{16}$ | | $D_{10}$ | | | | | |

ELECTRONIC IGNITION CONTROL APPARATUS

This is a continuation of application Ser. No. 199,234 filed Oct. 21, 1980, now U.S. Pat. No. 4,360,874.

BACKGROUND OF THE INVENTION

The present invention relates to an electronic control apparatus for internal combustion engines, and more particularly to an electronic ignition control apparatus of the type including a calculation circuit to calculate an optimum spark advance angle of the engine in dependence upon changes of the operating condition of the engine.

To adapt a conventional electronic ignition control apparatus of this kind to an internal combustion engine, it is required that the ignition control apparatus is specifically arranged in a complicated construction in accordance with such control specifications for the engine as the number of cylinders, the timing and extent for starting calculation of the engine speed, the timing for starting calculation of the ignition timing, and the like. This means that the ignition control apparatus is designed in a different construction on a basis of a different control specification for the respective engines. This results in high production cost of the control apparatus and late supply to demand of the control apparatus.

SUMMARY OF THE INVENTION

It is, therefore, a primary object of the present invention to provide an electronic ignition control apparatus in which optimum control of the spark advance angle is accomplished by the same electronic circuits in spite of modification of the control specifications for the engine.

Another object of the present invention is to provide an electronic ignition control apparatus in which only the processing program is modified in accordance with each control specification for various engines to realize supply of the control apparatus in a short period of time.

A further object of the present invention is to provide an electronic ignition control apparatus in which the electronic circuits or hardware for the control apparatus can be standardized in the same manner to supply the control apparatus in a low production cost as possible.

A still another object of the present invention is to provide an electronic ignition control apparatus including a memory in the form of a random-access memory for intially storing first and second signals indicative of the starting and terminating points for calculation of a time necessary for rotation of a predetermined angle defined by integer times as large as a predetermined angular interval of an output shaft of the engine, in which a rotation time of the output shaft is calculated during rotation of an angle of the output shaft defined by the first and second signals from the memory to calculate an optimum spark advance angle of the engine in relation to the operating condition of the engine such that an angular position defined by integer times as large as the predetermined angular interval at the advance angle side of the calculated advance angle is determined to be stored in the memory as a third signal, and wherein calculation of a time defined by the difference between the calculated advance angle and the angular position defined by the third signal is started upon arrival of the output shaft to the angular position defined by the third signal from the memory and completed to deenergize the ignition coil of the engine previously energized.

According to the present invention, there is provided an electronic ignition control apparatus for an internal combustion engine having an output shaft rotated by a piston, an ignition coil adapted to generate a spark voltage upon deenergization thereof and a spark plug activated by the spark voltage to ignite the air-fuel mixture metered into a combustion chamber of the engine, the ignition control apparatus comprising:

first detecting means for producing a reference signal indicative of a reference angular position of the output shaft;

second detecting means for producing a series of electric angular signals respectively at a predetermined angular interval related to the reference signal;

third detecting means for producing a first binary signal indicative of the operating condition of the engine;

a pulse signal generator for producing a series of pulse signals at a predetermined frequency; and first memory means for previously memorizing second and third binary signals respectively indicative of the starting and terminating points for calculation of a time necessary for rotation of a predetermined angle defined by integer times as large as the predetermined angular interval, the first memory further memorizing a program for calculating an optimum spark advance angle of the engine based on a function describing a desired relationship among the operating condition of the engine, a rotational time of the output shaft and the spark advance angle, for determining a fourth binary signal indicative of an angular position defined by integer times as large as the predetermined angular interval at the advance angle side of the calculated advance angle, and for calculating a time defined by the difference between the calculated advance angle and the angular position defined by the fourth binary signal.

The control apparatus further comprises second memory means for temporarily storing the second and third binary signals from the first memory means and storing the fourth binary signal and a fifth binary signal indicative of the time defined by the difference between the calculated advance angle and the angular position defined by the fourth binary signal; control means responsive to the pulse signals from the pulse signal generator and the electric angular signals from the second detecting means for producing a first control signal based on a first logic equation describing a relationship between the second binary signal and the first predetermined number of the pulse signals, for producing a second control signal based on a second logic equation describing a relationship between the third binary signal and the second predetermined number of the pulse signals and for producing a third control signal based on a third logic equation describing a relationship between the fourth binary signal and the third predetermined number of the pulse signals; and calculation means responsive to the first control signal to start calculation of the number of the pulse signals and responsive to the second control signal to cease the calculation of the number of the pulse signals, the calculation means producing a sixth binary signal indicative of the calculated number of the pulse signals defining the the actual rotation time of the output shaft.

Furthermore, the control apparatus comprises:
processing means for calculating the optimum spark advance angle from the function in dependence upon the first and sixth binary signals such that the fourth binary signal is determined in relation to the calculated spark advance angle to be stored in the second memory means, the processing means further determining an energization timing of the ignition coil in relation to the calculated advance angle and calculating the difference between the calculated spark advance angle and the angular position defined by the fourth binary signal such that the fifth binary signal is determined in relation to the calculated difference to be stored in the second memory means; and drive means responsive to the determined energization timing from the processing means to energize the ignition coil and responsive to the third control signal from the control means to start calculation of the value of the fifth binary signal from the second memory means to conduct deenergization of the ignition coil upon completing the calculation.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 20 is a logic schematic diagram showing the initial condition of RAM in FIG. 2.

DESCRIPTION OF THE PREFERRED EMBODIMENT

Figure 1:
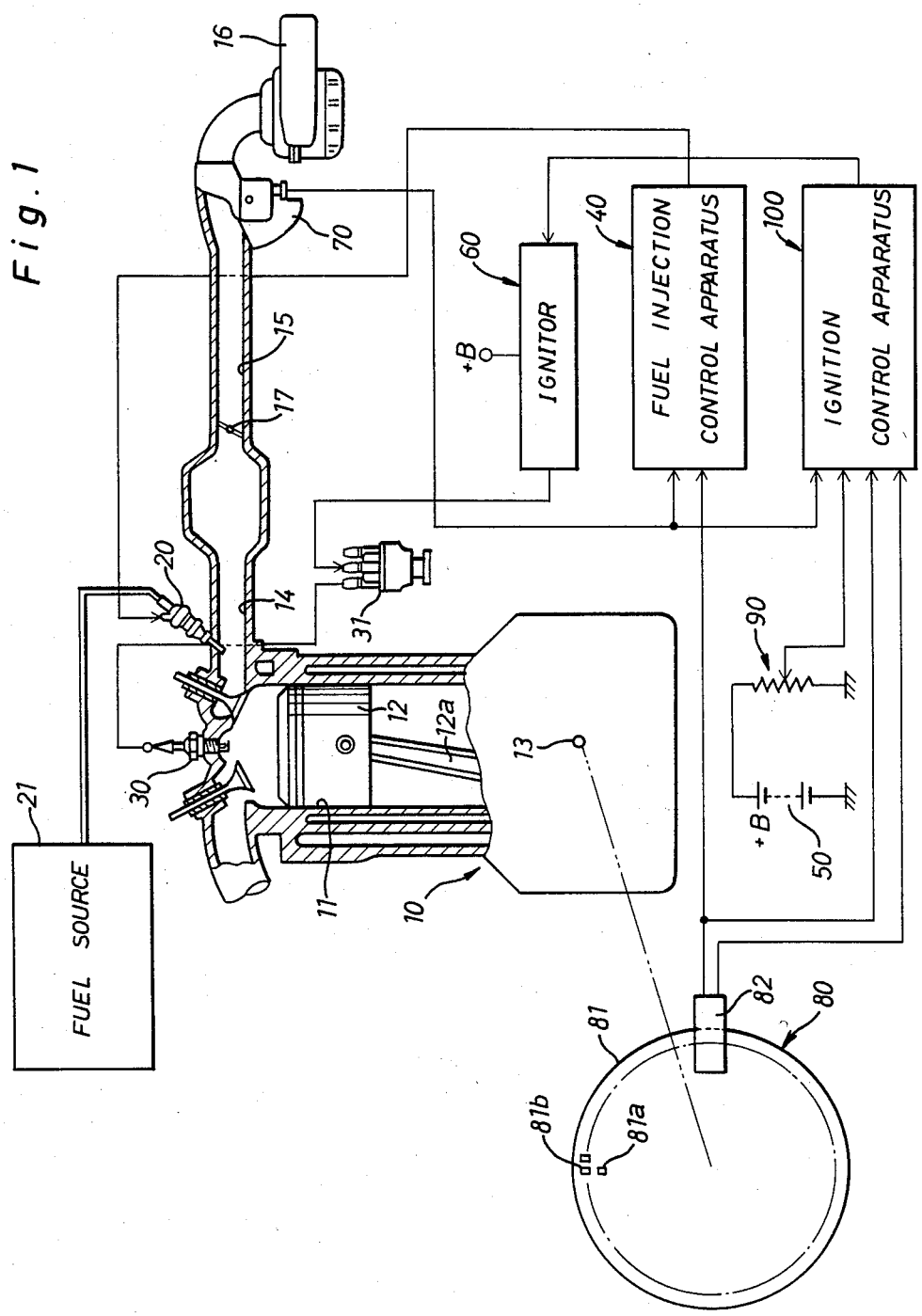
FIG. 1 is a schematic block diagram of an electronic control system including an electronic ignition control apparatus in accordance with the present invention which is adapted to an internal combustion engine for an automotive vehicle.

Referring now to FIG. 1 of the drawings, there is illustrated a schematic block diagram of an electronic control system adapted to an internal combustion engine 10 for an automotive vehicle and including an electronic ignition control apparatus 100 in accordance with the present invention. The engine 10 is a six cylinder, four stroke internal combustion engine and includes pistons 12 each of which is reciprocable within a cylinder 11 and connected by a connecting rod 12a to a crankshaft 13. The engine 10 also includes six fuel injectors 20 mounted on an intake manifold 14 and six spark plugs 30 mounted on a cylinder head. Each of the fuel injectors 20 is activated upon receiving an output signal from an electronic fuel injection control apparatus 40 to supply fuel from a fuel source 21 into the cylinder 11. Each of the spark plugs 30 is energized upon receiving a spark voltage from a distributor 31 to generate sparks for igniting air-fuel mixture within the cylinder 11. The distributor 31 serves to distribute the spark voltage from an ignitor 60 to each of the spark plugs 30 at appropriate intervals.

The electronic control system comprises an air flow meter 70 provided within an induction passage 15 and a signal detector 80 assembled on the crankshaft 13. The air flow meter 70 serves to detect an amount of air sucked into the engine 10 through the induction passage 15 and a throttle valve 17 from an air cleaner 16 and to produce an analog signal with a level corresponding to an amount of the sucked air. The signal detector 80 includes a slit member 81 of a disc type which is supported on the crankshaft 13 and provided at its outer periphery portion with a first slit 81a and three hundred and sixty of second slits 81b. Each of the second slits 81b is arranged at an interval of one degree on an identical circumference of slit member 81, and the first slit 81a is arranged together with one of the second slits 81b on a radius of slit member 81 which is defined by the top dead center position of one of pistons 12.

The signal detector 80 also includes a photodetector 82 which is located in optical relationship with the slit member 81. The photodetector 82 includes a pair of photo-couplers each of which is formed, for example, by a light emission diode and a photo diode. These photo-couplers are located respectively to detect the first slit 81a and each of the second slits 81b. When the slit member 81 rotates, one of the photo-couplers serves to detect the first slit 81a to produce a first detection signal which is defined by a rotational reference angle of crankshaft 13 corresponding to the top dead center position of piston 12. In the embodiment, it is assumed that the reference angle of crankshaft 13 is determined to be zero degrees. When the slit member 81 rotates, the other of the photo-couplers serves to sequentially detect each of the second slits 81b to produce a second detection signal indicative of one degree of crankshaft 13 or a one-degree crank-angle. A potentiometer 90 serves to detect the DC voltage from a DC power supply 50 for the vehicle and to produce an analog signal with a level proportional to the DC voltage.

The fuel injection control apparatus 40 receives the analog signal from air flow meter 70 and the first detection signal from signal detector 80 to produce an output signal such that an amount of fuel to be injected from each injector 20 is controlled in an optimum value. The ignition control apparatus 100 receives the analog signals from the air flow meter 70 and potentiometer 90 and each of the first and second detection signals from signal detector 80 to produce a first output signal indicative of an optimum timing for starting energization of an ignition coil of ignitor 60 and to produce a second output signal indicative of an optimum timing for terminating the energization of the ignition coil. In the ignitor 60, a flip flop is provided to produce a reset signal in response to the first output signal from ignition control apparatus 100 so as to energize the ignition coil of igniter 60. The flip flop also produces a set signal in response to the second output signal from ignition control apparatus 100 such that the ignition coil is deenergized to produce the spark voltage.

Figure 2:
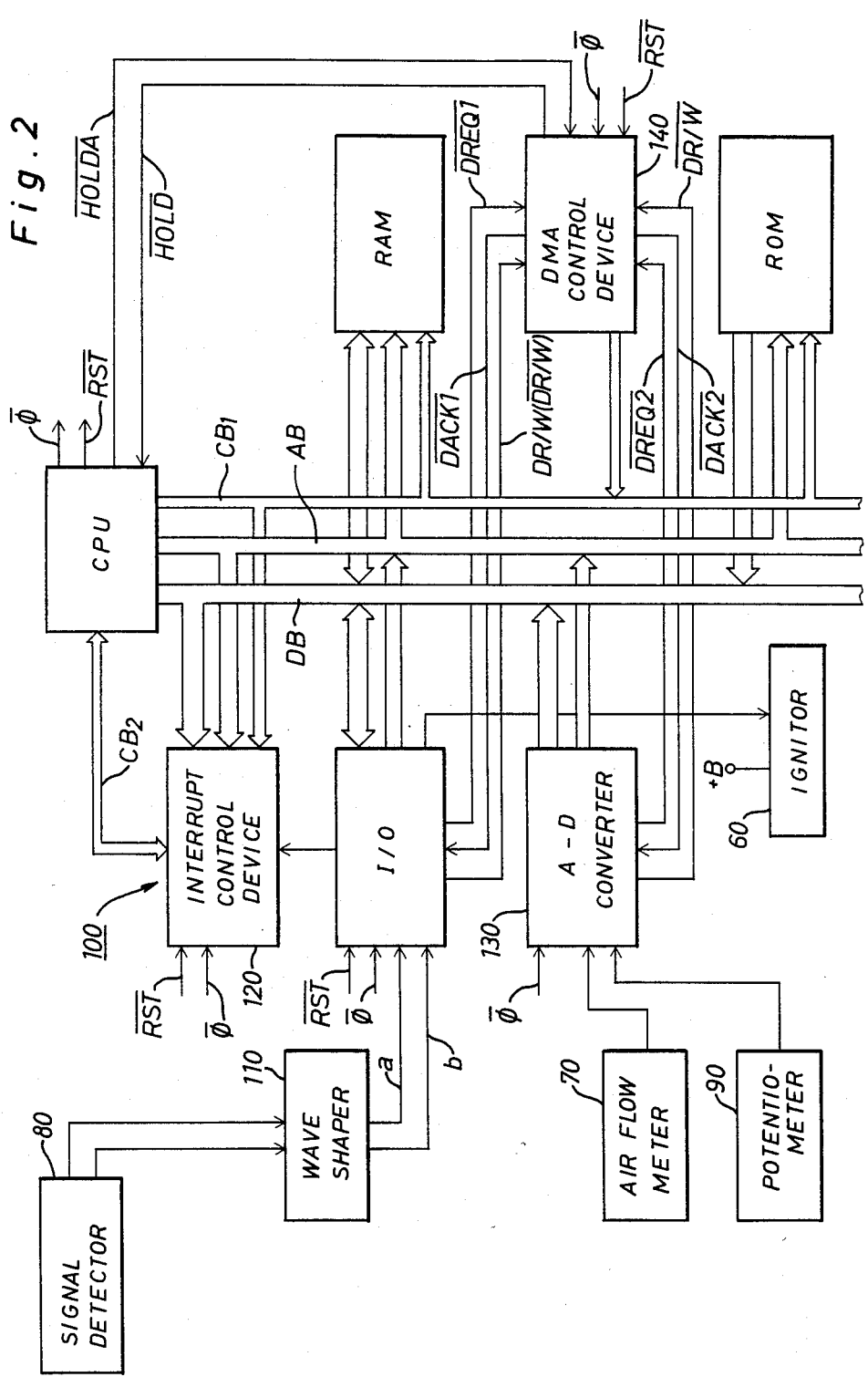
FIG. 2 is a block diagram of the ignition control apparatus shown in FIG. 1.

In FIG. 2, there is illustrated a preferred embodiment of the ignition control apparatus 100 which is shown in block form in FIG. 1. The ignition control apparatus 100 comprises a central processing unit or CPU which is connected through a first control bus $CB_1$, an address bus AB and a data bus DB to an interrupt control device 120, a random access memory or RAM, and a read only memory or ROM. CPU is also connected to the interrupt control device 120 through a second control bus $CB_2$ and to a direct-memory-access or DMA control device 140 through the first control bus $CB_1$. CPU is further connected through the buses AB, DB to an analog-to-digital or A-D converter 130, and an input-output device or I/O.

The interrupt control device 120 is reset in response to a reset signal $\overline{RST}$ from CPU such that it receives a specified angular interrupt signal from I/O to produce an interrupt request signal. When an interruption request based on the interrupt request signal from I/O is received by CPU, the interrupt control device 120 serves to cease generation of the interrupt request signal therefrom upon request of CPU. The A-D converter 130 serves to convert the analog signals from the air flow meter 70 and potentiometer 90 sequentially into binary signals at a predetermined time interval in accordance with a series of clock signals $\overline{\phi}$ (see FIG. 4(a)) from CPU. Upon completing each conversion in the A-D converter 130, a low level signal is produced from the A-D converter 130 as a direct-memory-access or DMA request signal $\overline{DREQ2}$ (see FIG. 4(b)). The A-D converter 130 also serves to produce a write-enable signal $\overline{DR/W}$ (see FIG. 4(g)) upon receiving a DMA acknowledge signal $\overline{DACK2}$ from DMA control device 140. In the embodiment, it is to be understood in later descriptions that electric signals defined by reference characters of which the upper portion is barred with a line segment have respectively a low level. It is also to be understood that electric signals defined by reference characters of which the upper portion is not barred with a line segment have respectively a high level.

A plurality of binary signals described later are previously stored in ROM to define the control specifications in accordance with which the engine 10 is repetitively controlled by the ignition control apparatus 100 at each crank-angle of five degrees or each five-degree crank-angle.

BINARY SIGNALS STORED PREVIOUSLY IN ROM (1) A binary signal $D_9$ which indicates auxiliary deenergization timing for forcibly deenergizing the ignition coil of igniter 60 at respective crank-angles of zero degrees (0°), one hundred and twenty degrees (120°), and two hundred and fourty degrees (240°)

(2) A binary signal $D_{10}$ which indicates an ignition range permissible to conduct ignition of engine 10 at each five-degree crank-angle within respective crank-angle ranges of sixty degrees (60°) to one hundred and fifteen degrees (115°), one hundred and eighty degrees (180°) to two hundred and thirty five degrees (235°), and three hundred degrees (300°) to three hundred and fifty five degrees (355°).

(3) A binary signal $D_{11}$ which indicates respective crank-angles of zero degrees (0°), one hundred and twenty degrees (120°), and two hundred and fourty degrees (240°) as an angular starting position for measuring rotative time of crankshaft 13

(4) A binary signal $D_{12}$ which indicates respective crank-angles of thirty degrees (30°), one hundred and fifty degrees (50°), and two hundred and seventy degrees (270°) as an angular terminating position for measuring the rotative time of crankshaft 13

(5) A binary signal $D_{15}$ which indicates an interruption at respective specified crank-angles of thirty degrees (30°), one hundred and fifty degrees (150°), and two hundred and seventy degrees (270°)

In these binary signals stored previously in ROM, the binary signals $D_9$, $D_{11}$ are at a low level at respective five-degree crank-angles except zero degrees (0°), one hundred and twenty degrees (120°), and two hundred and fourty degrees (240°). The binary signal $D_{10}$ is at a low level at respective five-degree crank-angles except each of the above-noted ignition ranges. The binary signals $D_{12}$, $D_{15}$ are also at a low level at respective five-degree crank-angles except thirty degrees (30°), one hundred and fifty degrees (150°), and two hundred and seventy degrees (270°). Furthermore, a binary signal $D_{13}$ indicative of main deenergization timing for forcibly deenergizing the ignition coil is previously stored in ROM to be initially at a low level at all the five-degree crank-angles. A binary signal $D_{14}$ indicative of an angular starting position from which count operation in I/O is conducted to determine normal deenergization timing of the ignition coil is also previously stored in ROM to be initially at a low level at all the five-degree crank-angles. Additionally, the five-degree crank-angles defining the above-noted respective binary signals may be experimentally determined in relation to performance of engine 10.

A predetermined program is previously stored in ROM such that CPU calculates a value indicative of an optimum ignition spark advance angle from a first function defining a desired relationship among an amount of the sucked air, rotative time of crankshaft 13 and the optimum ignition spark advance angle. The predetermined program is also previously stored in ROM such that CPU calculates a value indicative of deenergization time of the ignition coil from a second function defining a desired relationship among the calculated ignition spark advance angle value, the DC voltage from DC power supply 50, energization time of the ignition coil and the deenergization time of the ignition coil. Each of the first and second functions is experimentally obtained and previously stored in ROM.

The above-noted predetermined program is stored previously in ROM such that a pair of five-degree crank-angles located close to the calculated ignition spark advance angle value at advance and retard sides of the calculated ignition spark advance angle value is determined by CPU respectively as the binary signals $D_{14}$ and $D_{13}$ in relation to the calculated ignition spark advance angle value. The above-noted predetermined program is further stored previously in ROM such that a difference between the calculated ignition spark advance angle value an the crank-angle defined by the binary signal $D_{14}$ is calculated by CPU as a value indicative of time during which counting operation in I/O is conducted to determine the ignition timing of engine 10. In addition, initial values indicative respectively of an ignition spark advance angle and deenergization time of the ignition coil necessary for start of engine 10 are respectively determined experimentally and previously stored in ROM.

RAM is provided therein with a plurality of sixteen-bit addresses $E0_{16}$, $E2_{16}$, $E4_{16}$, $200_{16}$, $202_{16}$, ---, $28C_{16}$, $28E_{16}$ of which the reference characters are represented by hexadecimal notation. RAM serves to temporarily store the rotative time of crankshaft 13 and the value indicative of deenergization time of the ignition coil respectively at the addresses $E0_{16}$ and $E2_{16}$. At the address $E4_{16}$ of RAM, stored temporarily is the calculated time value during which counting operation in I/O is conducted to determine the ignition timing of engine 10. A plurality of the binary signals $D_9$ (or $\overline{D}_9$), $D_{10}$ (or $\overline{D}_{10}$), $D_{11}$ (or $\overline{D}_{11}$), $D_{12}$ (or $\overline{D}_{12}$), $D_{13}$ (or $\overline{D}_{13}$), $D_{14}$ (or $\overline{D}_{14}$) and $D_{15}$ (or $\overline{D}_{15}$) are stored respectively at a nine-bit to a fifteen-bit of each address $200_{16}$ to $28E_{16}$. In the embodiment, the addresses $200_{16}$ to $28E_{16}$ are allotted respectively to correspond with the zero-degree crank-angle to the three-hundred-and-sixty-degree crank-angle at each angular interval of five degrees.

CPU includes a microprocessor of 9900 type which is manufactured by TEXAS INSTRUMENTS INCORPORATED in U.S.A. CPU also includes reset and clock circuits connected to the microprocessor, and an inverter buffer connected to the microprocessor and the reset and clock circuits, the inverter buffer being connected to the first and second control buses $CB_1$, $CB_2$, address bus AB and data bus DB. The clock circuit serves to issue a series of clock signals $\bar{\phi}$ of a predetermined frequency (about three MHz) through the inverter buffer. The reset circuit serves to produce the above-noted reset signal $\overline{RST}$ through the inverter buffer upon its starting operation.

Upon start of operation, the microprocessor serves to start calculation of energization time of the ignition coil in a conventional manner and to read out the binary signals $D_9$ (or $\overline{D}_9$), $D_{10}$ (or $\overline{D}_{10}$), $D_{11}$ (or $\overline{D}_{11}$), $D_{12}$ (or $\overline{D}_{12}$), $\overline{D}_{13}$, $\overline{D}_{14}$ and $D_{15}$ (or $\overline{D}_{15}$) from ROM respectively to store the same signals at the above-noted predetermined addresses of RAM. At the same time, the initial ignition spark advance angle value and the initial value indicative of deenergization time of the ignition coil are respectively read out by the microprocessor from ROM and stored at predetermined addresses in RAM. The microprocessor receives the interrupt request signal from I/O through the second control bus $CB_2$ to halt calculation of energization time of the ignition coil, to conduct calculation of the optimum ignition spark advance angle value on a basis of the first function from ROM in accordance with an amount of the sucked air and rotative time of crankshaft 13 respectively from RAM and also to conduct calculation of the value indicative of deenergization time of the ignition coil on a basis of the second function from ROM in accordance with the calculated ignition spark advance angle value, the calculated energization time and the DC voltage of DC power source 50 from RAM. These calculated values are respectively stored in RAM by the microprocessor.

Determination of the respective five-degree crank-angles located close to the calculated ignition spark advance angle value at advance and retard sides of the calculated ignition spark advance angle value is conducted by the microprocessor in relation to the calculated ignition spark advance angle value to define the binary signals $D_{14}$ and $D_{13}$, and calculation of the difference between the calculated ignition spark advance angle value and the crank-angle defined by the binary signal $D_{14}$ is conducted by the microprocessor to define the value indicative of time during which counting operation in I/O is conducted to determine the ignition timing of engine 10. The defined binary signals $D_{13}$ and $D_{14}$ are respectively stored by the microprocessor at addresses of RAM corresponding to the crank-angles defined by the binary signals $D_{13}$ and $D_{14}$, and the calculated time value during which counting operation in I/O is conducted to determine the ignition timing is also stored by the microprocessor at a predetermined address of RAM. Furthermore, the microprocessor receives a hold request signal $\overline{HOLD}$ (see FIG. 4(c)) from DMA control device 140 to issue a hold acknowledge signal $\overline{HOLDA}$ (see FIG. 4(d)) through the inverter buffer such that a high impedance is produced at connecting points between the inverter buffer and each of the first control bus $CB_1$, the address bus AB and the data bus DB. This means to permit each of the DMA control device 140, I/O and A-D converter 130 to use the first control bus $CB_1$, the address bus AB and the data bus DB.

Figure 4:
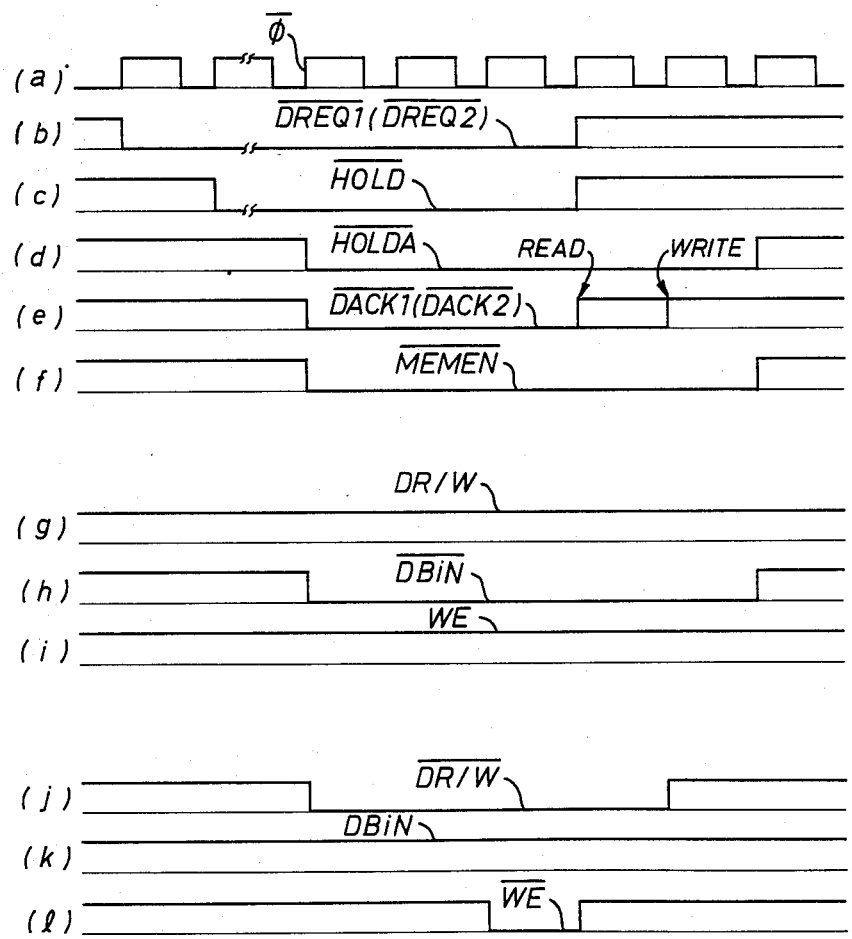
FIG. 4 illustrates waveforms obtained at various points in the circuit diagram of FIG. 3.

The DMA control device 140 serves to be reset by the reset signal $\overline{RST}$ from CPU such that it receives the clock signals $\bar{\phi}$ from CPU and one of DMA request signals $\overline{DREQ1}$ and $\overline{DREQ2}$ (see FIG. 4(b)) respectively from I/O and the A-D converter 130 to conduct generation of the hold request signal $\overline{HOLD}$. The DMA control device 140 serves to produce one of DMA acknowledge signals $\overline{DACK1}$ and $\overline{DACK2}$ (see FIG. 4(e)) in response to the hold acknowledge signal $\overline{HOLDA}$ from CPU. Upon receiving the write-enable signal DR/W from A-D converter 130, the DMA control device 140 acts to apply the binary signals from A-D converter 130 to RAM through the data bus DB and to temporarily store the same in RAM. When the DMA control device 140 receives a read-enable signal DR/W (see FIG. 4(g)) from I/O to apply address signals of binary form from I/O to RAM through the address bus AB, the calculated deenergization time value of the ignition coil and the calculated time value during which counting operation in I/O is conducted to determine the ignition timing are respectively read out from RAM by the DMA control device 140 and applied as binary signals to I/O through the data bus DB. When the DMA control device 140 receives a write-enable signal $\overline{DR/W}$ (see FIG. 4(j)) from I/O to apply address signals of binary form from I/O to RAM, it serves to transfer rotative time of crankshaft 13 obtained in I/O into RAM as a binary signal through the data bus DB. A wave shaper 110 serves to reshape the first and second detection signals from signal detector 80 respectively into a reference signal a and a series of angular signals b (see FIG. 7). In the wave shaper 110, the reference signal a is arranged to rise up by about ten microseconds earlier than the angular signal b defined by the zero-degree crank-angle.

After reset by the reset signal $\overline{RST}$ from CPU, I/O serves to receive the reference and angular signals a, b from wave shaper 110 and the clock signals $\overline{\phi}$ from CPU so as to repetitively conduct generation of the DMA request signal $\overline{DREQ1}$. Upon receipt of the DMA acknowledge signal $\overline{DACK1}$ from DMA control device 140, I/O serves to conduct generation of the write-enable signal $\overline{DR/W}$ and also to conduct generation of the address signals and the binary signal indicative of rotative time of crankshaft 13 obtained therein. Furthermore, I/O is responsive to the DMA acknowledge signal $\overline{DACK1}$ from DMA control device 140 to conduct generation of each of the read-enable signals DR/W and the address signals such that the calculated deenergization time value of the ignition coil and the calculated time value during which counting operation in I/O is conducted to determine the ignition timing are read out from addresses of RAM defined by the address signals and are produced as the above-noted second and first signals.

Figure 3:
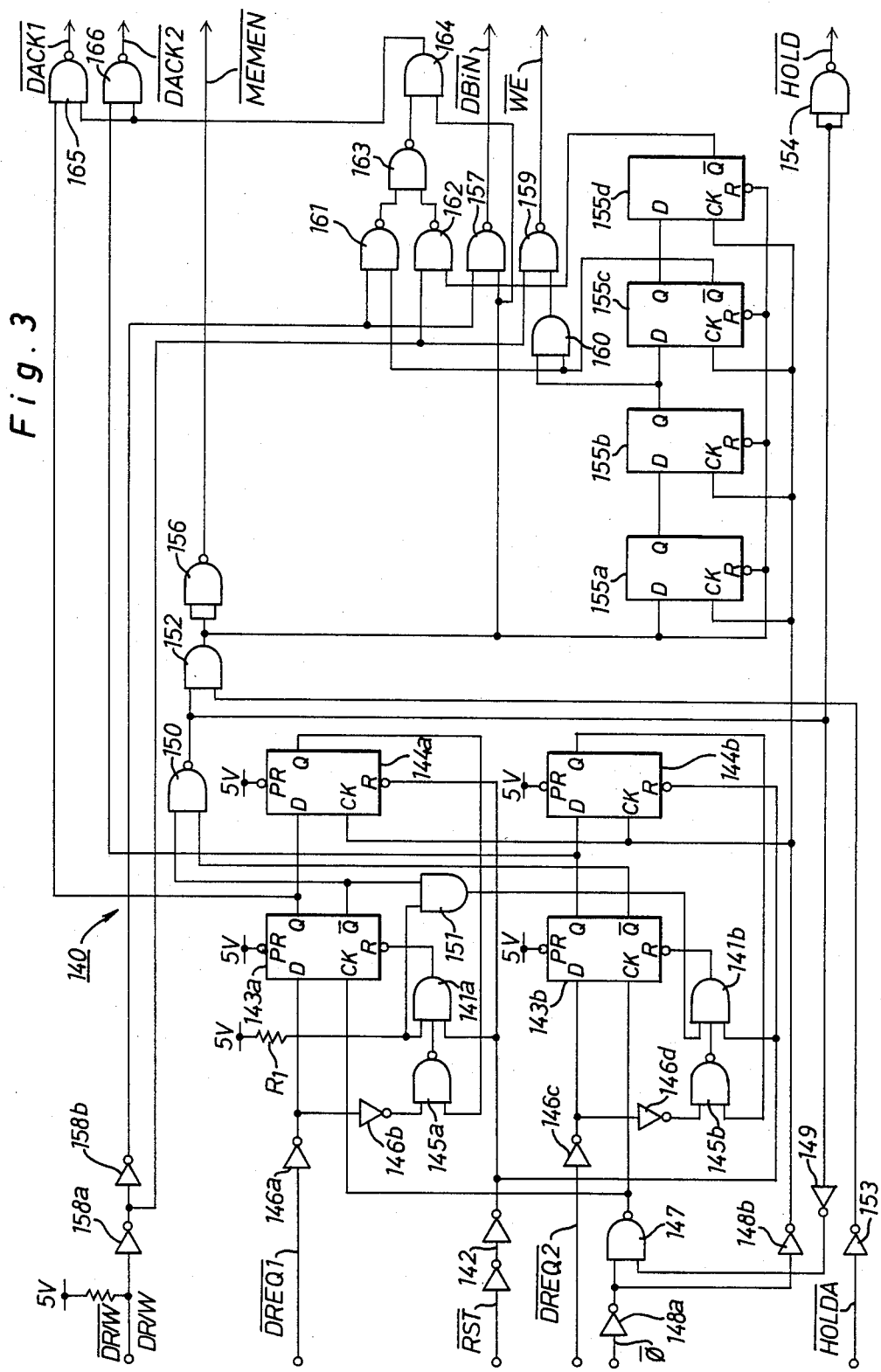
FIG. 3 is a circuit diagram of the direct-memory-access or DMA control device illustrated in block form in FIG. 2.

FIG. 3 illustrates a preferred embodiment of the DMA control device 140 which is provided therein with D-flip flops 143a, 143b, 144a and 144b. Upon receipt of the reset signal $\overline{RST}$ from CPU through an inverter circuit 142 and an AND-gate 141a, D-flip flop 143a is reset to produce low and high level signals respectively at its output terminals Q and $\overline{Q}$. When the DMA request signal $\overline{DREQ1}$ from I/O is inverted by an inverter 146a into a high level signal, D-flip flop 143a is responsive to the high level signal from inverter 146a at the trailing edge of one of the clock signals $\overline{\phi}$ from CPU through an inverter 148a and a NAND-gate 147 to produce high and low level signals respectively at its output terminals Q and $\overline{Q}$. When the DMA request signal $\overline{DREQ1}$ rises to a high level, the high and low level signals respectively from the output terminals Q and $\overline{Q}$ of D-flip flop 143a are inverted at the trailing edge of one of the clock signals $\overline{\phi}$.

Upon receiving the reset signal $\overline{RST}$ from inverter circuit 142, D-flip flop 144a is reset to produce a low level signal at its output terminal Q. The D-flip flop 144a is responsive to the high or low level signal from the output terminal Q of D-flip flop 143a at the trailing edge of one of the clock signals $\overline{\phi}$ from CPU through inverters 148a, 148b to produce a high or low level signal at its output terminal Q. NAND-gate 145a receives one of the DMA request signal $\overline{DREQ1}$ from I/O through inverters 146a, 146b and the low level signal from D-flip flop 144a to produce a high level signal. When both of the DMA request signal $\overline{DREQ1}$ and the low level signal from D-flip flop 144a rise to a high level, the high level signal from NAND-gate 145a drops to a low level. In addition, AND-gate 141a is connected at one input terminal thereof to a five-volt DC power source through a resistor $R_1$. Applying of the clock signals $\overline{\phi}$ from NAND-gate 147 to D-flip flops 143a, 143b is inhibited by a low level signal issued from an inverter 149.

Upon receipt of the reset signal $\overline{RST}$ from inverter circuit 142 through an AND-gate 141b, D-flip flop 143b is reset to produce low and high level signals respectively at its output terminals Q and $\overline{Q}$. When the DMA request signal $\overline{DREQ2}$ from A-D converter 130 is inverted by an inverter 146c into a high level signal, D-flip flop 143b is responsive to the high level signal from inverter 146c at the trailing edge of one of the clock signals $\phi$ from NAND-gate 147 to produce high and low level signals respectively at its output terminals Q and $\overline{Q}$. When the DMA request signal $\overline{DREQ2}$ rises to a high level, the high and low level signals respectively from the output terminals Q and $\overline{Q}$ of D-flip flop 143b are inverted at the trailing edge of one of the clock signals $\overline{\phi}$.

Upon receiving the reset signal $\overline{RST}$ from inverter circuit 142, D-flip flop 144b is reset to produce a low level signal at its output terminal Q. The D-flip flop 144b is responsive to the high or low level signal from the output terminal Q of D-flip flop 143b at the trailing edge of one of the clock signals $\overline{\phi}$ from inverters 148a, 148b to produce a high or low level signal at its output terminal Q. NAND-gate 145b receives one of the DMA request signal $\overline{DREQ2}$ from A-D converter 130 through inverters 146c, 146d and the low level signal from D-flip flop 144b to produce a high level signal. When both of the DMA request signal $\overline{DREQ2}$ and the low level signal from D-flip flop 144b rise to a high level, the high level signal from NAND-gate 145b drops to a low level. Additionally, AND-gate 141b is connected at one input terminal thereof through an AND-gate 151 to the resistor $R_1$ and the output terminal $\overline{Q}$ of D-flip flop 143a.

The DMA control device 140 comprises a NAND-gate 150 which is connected to the inverter 149, an AND-gate 152 and a NAND-gate 154. NAND-gate 150 is responsive to the high level signals respectively from the output terminals $\overline{Q}$ of D-flip flops 143a, 143b to produce a low level signal. The low level signal from NAND-gate 150 rises to a high level in response to the low level signal from one of the output terminals $\overline{Q}$ of D-flip flops 143a, 143b. The low and high level signals from NAND-gate 150 are inverted by inverter 149 respectively into high and low level signals to be applied to NAND-gate 147. When the hold acknowledge signal $\overline{HOLDA}$ from CPU is inverted by an inverter 153 into a high level signal, AND-gate 152 is responsive to the high level signals from NAND-gate 150 and inverter 153 to produce a high level signal. The high level signal from AND-gate 152 drops to a low level when one of the high level signals from NAND-gate 150 and inverter 153 becomes a low level signal. NAND-gate 154 is in the form of an inverter buffer of open-collector type which serves to conduct generation of the hold request signal $\overline{HOLD}$ in response to the high level signal from NAND-gate 150. The hold request signal $\overline{HOLD}$ becomes a high level signal in response to the low level signal from NAND-gate 150.

The DMA control device 140 also comprises D-flip flops 155a to 155d and NAND-gates 156, 157, each of which is connected to AND-gate 152 described above. NAND-gate 156 is in the form of an open-collector type inverter buffer which receives the high level signal from AND-gate 152 to produce a memory-enable signal $\overline{MEMEN}$ (see FIG. 4(f)). The memory-enable signal $\overline{MEMEN}$ from NAND-gate 156 rises to a high level in response to the low level signal from AND-gate 152. NAND-gate 157 is in the form of an open-collector type buffer which acts to produce a data-bus input signal $\overline{DBiN}$ (see FIG. 4(h)) in response to the high level signal from AND-gate 152 and a high level signal from an inverter 158b. The data-bus input signal $\overline{DBiN}$ from NAND-gate 157 rises to a high level when one of the high level signals from AND-gate 152 and inverter 158b drops to a low level. The inverter 158b is connected through an inverter 158a to the five-volt DC power source, I/O and A-D converter 130. The read-enable signal DR/W from I/O and the DC voltage of five volts are respectively inverted by inverter 158a into low level signals. The write-enable signal $\overline{DR/W}$ from one of I/O and A-D converter 130 is also inverted by inverter 158a into a high level signal. The high or low level signal from inverter 158a is inverted by inverter 158b into the low or high level signal.

D-flip flop 155a is responsive to the low or high level signal from AND-gate 152 at the trailing edge of one of the clock signals from CPU through inverters 148a, 148b to produce a low or high level signal at its output terminal Q. D-flip flop 155b is responsive to the low or high level signal from D-flip flop 155a at the trailing edge of one of the clock signals $\bar{\phi}$ from inverters 148a, 148b to produce a low or high level signal at its output terminal Q. D-flip flop 155c is also responsive to the high level signal from D-flip flop 155b at the trailing edge of one of the clock signals $\bar{\phi}$ to produce high and low level signals respectively at its output terminals Q and $\overline{Q}$. These high and low level signals are inverted by D-flip flop 155c in response to the low level signal from D-flip flop 155b at the trailing edge of one of the clock signals $\bar{\phi}$. Furthermore, D-flip flop 155d is responsive to the low or high level signal from the output terminal Q of D-flip flop 155c at the trailing edge of one of the clock signals $\bar{\phi}$ to produce a high or low level signal at its output terminal $\overline{Q}$.

A NAND-gate 159 is in the form of an open-collector type buffer from which a write-enable signal $\overline{WE}$ (see FIG. 4(l)) is generated in response to the high level signal from inverter 158a and a high level signal from an AND-gate 160. The write-enable signal $\overline{WE}$ from NAND-gate 159 rises to a high level when one of the high level signals from inverter 158a and AND-gate 160 drops to a low level. The high level signal from AND-gate 160 is generated in response to the high level signals from the output terminals Q and $\overline{Q}$ of D-flip flops 155b and 155c and drops to a low level in response to one of the low level signals from the output terminals Q and $\overline{Q}$ of D-flip flops 155b and 155c. A NAND-gate 165 receives a high level signal from an AND-gate 164 and the high level signal from the output terminal Q of D-flip flop 143a to conduct generation of the DMA acknowledge signal $\overline{DACK1}$. The DMA acknowledge signal $\overline{DACK1}$ from NAND-gate 165 rises to a high level when one of the high level signals from AND-gate 164 and output terminal Q of D-flip flop 143a drops to a low level.

A NAND-gate 166 receives the high level signals respectively from AND-gate 164 and the output terminal Q of D-flip flop 143b to conduct generation of the DMA acknowledge signal $\overline{DACK2}$. The DMA acknowledge signal $\overline{DACK2}$ from NAND-gate 166 rises to a high level in response to one of the low level signals from AND-gate 164 and D-flip flop 143b. AND-gate 164 is provided with one input terminal connected to AND-gate 152 and with the other input terminal connected through NAND-gates 161, 162 and 163 to D-flip flops 155c, 155d and inverters 158a, 158b. NAND-gate 161 is responsive to one of the low level signals respectively from inverter 158b and the output terminal $\overline{Q}$ of D-flip flop 155c to produce a high level signal. The high level signal from NAND-gate 161 drops to a low level in response to the high level signals respectively from inverter 158b and D-flip flop 155c. NAND-gate 162 is responsive to the high level signals respectively from inverter 158a and the output terminal $\overline{Q}$ of D-flip flop 155d to produce a low level signal. NAND-gate 162 is also responsive to one of the low level signals from inverter 158a and D-flip flop 155d to produce a high level signal. NAND-gate 163 receives the high level signals from NAND-gates 161, 162 to produce a low level signal such that the low level signal is produced from AND-gate 164. NAND-gate 163 also receives one of the low level signals from NAND-gates 161, 162 to produce a high level signal such that the high level signal is produced from AND-gate 164 under generation of the high level signal from AND-gate 152.

When CPU and I/O produce a series of clock signals $\bar{\phi}$ (see FIG. 4(a)) and a DMA request signal $\overline{DREQ1}$ (see FIG. 4(b)) respectively after completion of initial setting in DMA control device 140 responsive to a reset signal $\overline{RST}$ from CPU, a series of the clock signals $\bar{\phi}$ are applied to D-flip flops 143a, 143b through inverter 148a and NAND-gate 147 and also to D-flip flops 144a, 144b through inverters 148a, 148b. The DMA request signal $\overline{DREQ1}$ from I/O is then inverted by inverter 146a and applied to D-flip flop 143a as a high level signal. At this stage, it is assumed that hold acknowledge and DMA request signals $\overline{HOLDA}$ and $\overline{DREQ2}$ respectively from CPU and A-D converter 130 are at a high level.

When high and low level signals are produced respectively from the output terminals Q and $\overline{Q}$ of D-flip flop 143a in response to the high level signal from inverter 146a and one of the clock signals $\bar{\phi}$ from NAND-gate 147, the former signal is applied to D-flip flop 144a and NAND-gate 165, and the latter signal is applied to NAND-gate 150. When the DMA request signal $\overline{DREQ2}$ from A-D converter 130 is at the high level, as previously described, the high level signal from A-D converter 130 is inverted by the inverter 146c and applied as a low level signal to D-flip flop 143b. Then, low and high level signals are produced respectively from the output terminals Q and $\overline{Q}$ of D-flip flop 143b in response to the low level signal from inverter 146c and one of the clock signals $\bar{\phi}$ from NAND-gate 147. Subsequently, the low level signal from D-flip flop 143b is applied to D-flip flop 144b and NAND-gate 166, and the high level signal from D-flip flop 143b is applied to NAND-gate 150.

When the low and high level signals respectively from D-flip flops 143a, 143b are applied to NAND-gate 150, as previously described, a high level signal is produced from NAND-gate 150 and applied to the inverter 149, AND-gate 152 and NAND-gate 154. Then, NAND-gate 154 is responsive to the high level signal from NAND-gate 150 to produce a hold request signal $\overline{HOLD}$, and the inverter 149 is also responsive to the high level signal from NAND-gate 150 to inhibit applying of the clock signals $\bar{\phi}$ from NAND-gate 147 to D-flip flops 143a, 143b. When the hold acknowledge signal $\overline{HOLDA}$ from CPU is applied to the inverter 153 as the high level signal, this high level signal is inverted by the inverter 153 into a low level signal and applied to AND-gate 152. Then, a low level signal is produced from AND-gate 152 in response to the high and low level signals from NAND-gate 150 and inverter 153 and applied to D-flip flops 155a to 155d, NAND-gates 156, 157 and AND-gate 164.

When the low level signal from AND-gate 152 is applied to NAND-gates 156, 157, as previously described, memory-enable and data-bus input signals $\overline{\text{MEMEN}}$ and $\overline{\text{DBiN}}$ are produced from NAND-gates 156 and 157 respectively as high level signals. A write-enable signal $\overline{\text{WE}}$ is also produced from NAND-gate 159 as a high level signal in response to a low level signal from the inverter 158a under control of AND-gate 160 derived from reset conditions of D-flip flops 155a to 155d. When a high level signal is produced from NAND-gate 163 under control of NAND-gates 161, 162 responsive to the low level signal from inverter 158a and high level signals from inverter 158b and D-flip flops 155c, 155d, it is applied to AND-gate 164 together with the low level signal from AND-gate 152 so that NAND-gates 165 and 166 produce DMA acknowledge signals $\overline{\text{DACK1}}$ and $\overline{\text{DACK2}}$ as high level signals respectively under generation of the high and low level signals from D-flip flops 143a and 143b.

When a hold acknowledge signal $\overline{\text{HOLDA}}$ is produced from CPU in response to the hold request signal $\overline{\text{HOLD}}$ from NAND-gate 154, it is inverted by the inverter 153 and applied as a high level signal to AND-gate 152 which produces a high level signal under generation of the high level signal from NAND-gate 150. The high level signal from AND-gate 152 is applied to D-flip flops 155a to 155d, NAND-gates 156, 157 and AND-gate 164. Then, NAND-gates 156, 157 serve to respectively produce memory-enable and data-bus input signals $\overline{\text{MEMEN}}$ and $\overline{\text{DBiN}}$ in response to the high level signal from AND-gate 152, these signals $\overline{\text{MEMEN}}$, $\overline{\text{DBiN}}$ being applied to the first control bus $CB_1$. When AND-gate 164 produces a high level signal in response to the high level signals from NAND-gate 163 and AND-gate 152, a DMA acknowledge signal $\overline{\text{DACK1}}$ is produced from NAND-gate 165 under generation of the high level signal from D-flip flop 143a. This permits I/O to produce a read-enable signal DR/W.

When the high level signal from AND-gate 152 is applied to D-flip flops 155a to 155d, as previously described, D-flip flop 155a produces a high level signal in response to one of the clock signals $\bar{\phi}$ from inverter 148b. At this stage, D-flip flops 155b to 155d are maintained in their reset conditions. When D-flip flop 155b produces a high level signal in response to the high level signal from D-flip flop 155a and one of the clock signals $\bar{\phi}$ from inverter 148b, a high level signal is produced from AND-gate 160 so that NAND-gate 159 maintains the write-enable signal $\overline{\text{WE}}$ as the high level signal under generation of the low level signal from inverter 158a. When D-flip flop 155c produces high and low level signals respectively at its output terminals Q and $\overline{Q}$ in response to the high level signal from D-flip flop 155b and one of the clock signals $\bar{\phi}$, NAND-gate 161 is responsive to the low level signal from the output terminal $\overline{Q}$ of D-flip flop 155c to produce a high level signal so that NAND-gate 163 produces a low level signal under generation of the high level signal from NAND-gate 162. Then, NAND-gate 165 receives the low level signal from NAND-gate 163 through AND-gate 164 to make the DMA acknowledge signal $\overline{\text{DACK1}}$ a high level signal. When the DMA request signal $\overline{\text{DREQ1}}$ from I/O rises again to a high level, NAND-gate 150 produces a low level signal, as previously described, such that inverter 149 permits NAND-gate 147 to apply a series of the clock signals $\bar{\phi}$ to D-flip flops 143a, 143b. At this stage, the hold request and hold acknowledge signals $\overline{\text{HOLD}}$ and $\overline{\text{HOLDA}}$ respectively from NAND-gate 154 and CPU sequentially become a high level signal.

When a DMA request signal $\overline{\text{DREQ2}}$ is produced from A-D converter 130 under this condition, it is inverted by the inverter 146c and applied as a high level signal to D-flip flop 143b which serves to produce high and low level signals respectively at its output terminals Q and $\overline{Q}$. Then, the high level signal from D-flip flop 143b is applied to NAND-gate 166 and D-flip flop 144b, and the low level signal from D-flip flop 143b is applied to NAND-gate 150. Subsequently, a high level signal is produced from NAND-gate 150 in response to the low level signal from D-flip flop 143b and applied to the inverter 149, AND-gate 152 and NAND-gate 154. Thus, NAND-gate 154 produces a hold request signal $\overline{\text{HOLD}}$, and the inverter 149 inhibits applying of clock signals $\bar{\phi}$ from NAND-gate 147 to D-flip flops 143a, 143b, as previously described.

When a low level signal is produced from AND-gate 152 in response to the high and low level signals respectively from NAND-gate 150 and inverter 153, it is applied to NAND-gates 156, 157, AND-gate 164 and D-flip flops 155a to 155d. Then, memory-enable, data-bus input and write-enable signals $\overline{\text{MEMEN}}$, $\overline{\text{DBiN}}$ and $\overline{\text{WE}}$ are produced from NAND-gates 156, 157 and 159 respectively as high level signals, and DMA acknowledge signals $\overline{\text{DACK1}}$ and $\overline{\text{DACK2}}$ are also produced from NAND-gates 165 and 166 respectively as high level signals, as previously described.

When a hold acknowledge signal $\overline{\text{HOLDA}}$ is produced from CPU in response to the hold request signal $\overline{\text{HOLD}}$ from NAND-gate 154, a high level signal is produced from AND-gate 152 and applied to NAND-gates 156, 157, AND-gate 164 and D-flip flops 155a to 155d, as previously described. Then, NAND-gate 156 produces a memory-enable signal $\overline{\text{MEMEN}}$ in response to the high level signal from AND-gate 152, and NAND-gate 166 is controlled by AND-gate 164 in response to the high level signal from AND-gate 152 to produce a DMA acknowledge signal $\overline{\text{DACK2}}$ so as to permit generation of a write-enable signal $\overline{\text{DR/W}}$ from A-D converter 130. In Addition, a data-bus input signal $\overline{\text{DBiN}}$ from NAND-gate 157 is at a high level in response to the high and low level signals respectively from AND-gate 152 and inverter 158b.

When the high level signal from AND-gate 152 is applied to D-flip flops 155a to 155d, as previously described, D-flip flop 155a produces a high level signal in response to one of the clock signals $\bar{\phi}$ from inverter 148b. At this stage, the remaining D-flip flops 155b to 155d are maintained in their reset conditions. When D-flip flop 155b produces a high level signal in response to the high level signal from D-flip flop 155a and one of the clock signals $\bar{\phi}$ from inverter 148b, a high level signal is produced from AND-gate 160 so that NAND-gate 159 produces a write-enable signal $\overline{\text{WE}}$ under generation of high level signal from inverter 158a to transfer the same to the first control bus $CB_1$.

When D-flip flop 155c produces high and low level signals respectively at its output terminals Q and $\overline{Q}$ in response to the high level signal from D-flip flop 155b and one of the clock signals $\bar{\phi}$, NAND-gate 161 is responsive to the low level signals from D-flip flop 155c and inverter 158b to produce a high level signal. When D-flip flop 155d receives the high level signal from D-flip flop 155c and one of the clock signals $\bar{\phi}$ to produce a low level signal at its output terminal $\overline{Q}$, NAND-gate 163 serves to produce a low level signal under control of NAND-gate 162 so as to make the DMA acknowledge signal $\overline{\text{DACK2}}$ from NAND-gate 166 a high level signal.

Figure 5:
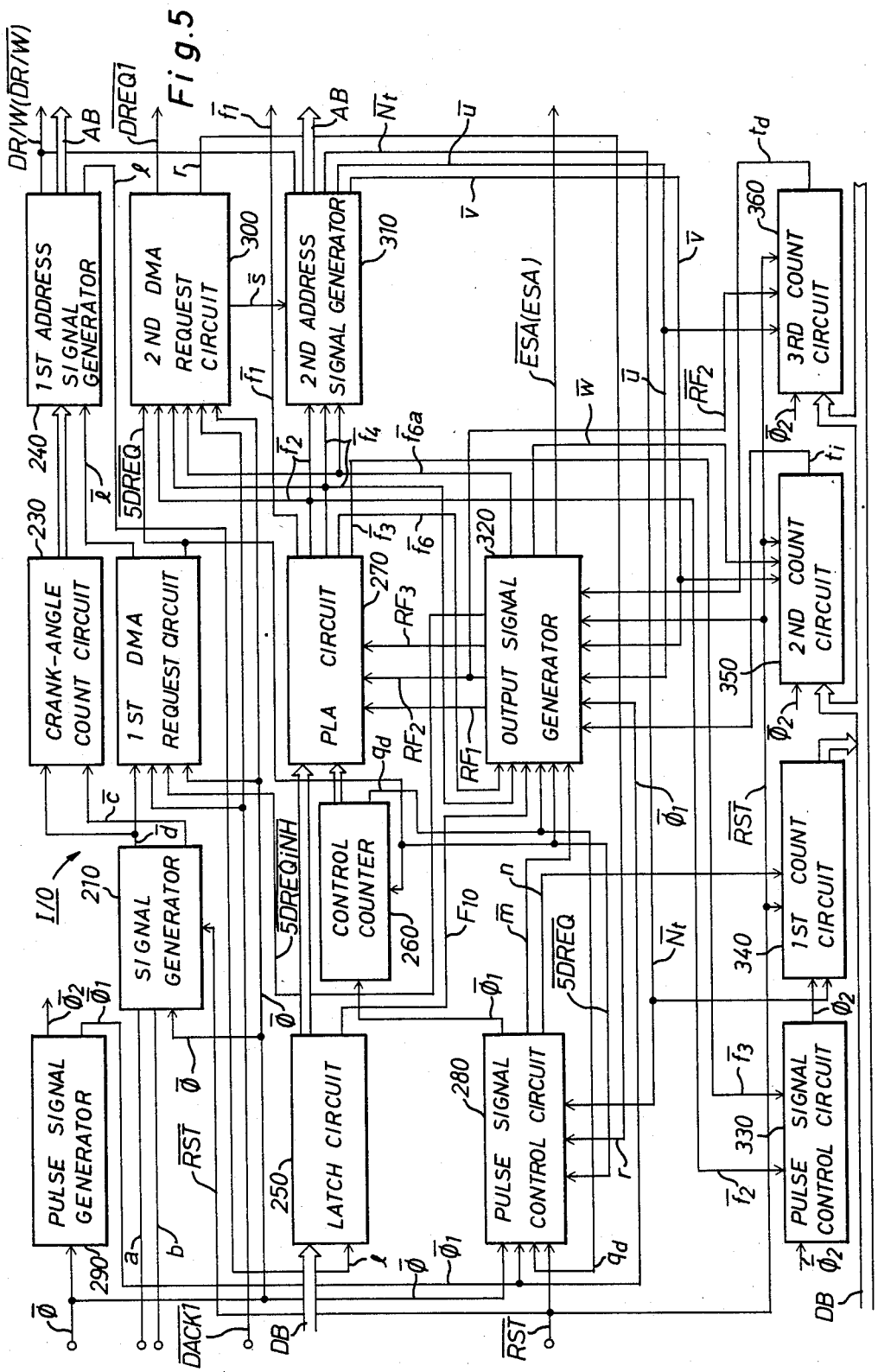
FIG. 5 is a block diagram of I/O shown in FIG. 2.

FIG. 5 illustrates a preferred embodiment of I/O in which a first direct-memory-access or DMA request circuit 220 and a crank-angle count circuit 230 are connected to the wave shaper 110 through a signal generator 210. The signal generator 210 is reset by the reset signal $\overline{\text{RST}}$ from CPU and serves to produce a reset signal $\bar{c}$ (see FIG. 7(d)) in response to the reference signal a from wave shaper 110 and one of the clock signals $\bar{\phi}$ from CPU. The signal generator 210 also produces repetitively a pulse signal $\bar{d}$ (see FIG. 7(f)) in accordance with a series of the clock signals $\bar{\phi}$ upon receiving each of fifth angular signals b which are successively produced from the wave shaper 110 on a basis of the angular signal b defined by the zero-degree crank-angle.

Figure 9:
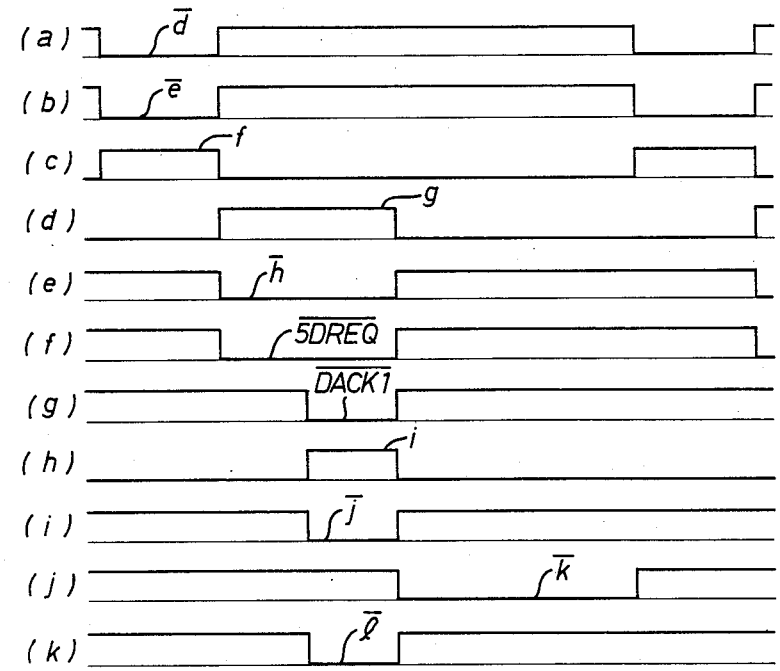
FIG. 9 illustrates waveforms obtained at various points in the circuit diagram of FIG. 8.

The first DMA request circuit 220 is responsive to the pulse signal $\bar{d}$ from signal generator 210 and one of the clock signals $\bar{\phi}$ from CPU to produce a direct-memory-access or DMA request signal $\overline{\text{5DREQ}}$ and also responsive to the DMA acknowledge signal $\overline{\text{DACK1}}$ from DMA control device 140 and a high level signal from an output signal generator 320, described later, to produce a low level signal $\bar{l}$ (see FIG. 9). The crank-angle count circuit 230 is reset by the reset signal $\bar{c}$ from signal generator 210 such that it counts a series of the pulse signals $\bar{d}$ from signal generator 210 to produce a binary signal indicative of the number of the counted pulse signals $\bar{d}$. The binary signal from count circuit 230 is applied to a first address signal generator 240. The first address signal generator 240 is responsive to the low level signal $\bar{l}$ from first DMA request circuit 220 and the binary signal from crank-angle count circuit 230 to produce a latch signal l and also to conduct generation of the read-enable signal DR/W and the address signals of binary form defining the predetermined address of RAM.

I/O also comprises a programmable-logic-array or PLA circuit 270 connected through a latch circuit 250 to the data bus DB, and a control counter 260 connected to the PLA circuit 270. The latch circuit 250 is responsive to the latch signal l from first address signal generator 240 to receive and latch the binary signals through data bus DB from the addresses $200_{16}$ to $28E_{16}$ of RAM so as to produce the same as binary flag signals respectively. The control counter 260 is reset by each of the DMA request signals $\overline{\text{5DREQ}}$ from first DMA request circuit 220 to count a series of pulse signals $\bar{\phi}_1$ from a pulse signal control circuit 280 and to produce a binary signal indicative of the number of the counted pulse signals $\bar{\phi}_1$.

The PLA circuit 270 is responsive to the binary flag signals from latch circuit 250 and binary frag signals $RF_1$, $RF_2$, $RF_3$ from output signal generator 320 to selectively prodce output signals $\bar{f}_1$, $\bar{f}_2$, $\bar{f}_3$, $\bar{f}_4$ and $\bar{f}_6$ in accordance with binary signals from control counter 260. The pulse signal control circuit 280 is reset by the reset signal $\overline{\text{RST}}$ from CPU and receives each series of clock and pulse signals $\bar{\phi}$ and $\bar{\phi}_1$ respectively from CPU and a pulse signal generator 290 to produce pulse and latch signals $\bar{\phi}_1$ and $\overline{m}$ at a trailing edge of the DMA request signal $\overline{\text{5DREQ}}$ from first DMA request circuit 220. After the DMA request signal $\overline{\text{5DREQ}}$ rises to a high level, the pulse signal control circuit 280 serves to conduct generation of the pulse signal $\bar{\phi}_1$ and produce an output signal n at a trailing edge of a load signal $\overline{N}_t$ from a second address signal generator 310. Generation of the pulse signal $\bar{\phi}_1$ from pulse signal control circuit 280 is inhibited in response to one of output signals $q_d$, r respectively from the control counter 260 and a second DMA request circuit 300.

The second DMA request circuit 300 serves to produce the output signal r in response to one of an output signal $\bar{f}_{6a}$ from output signal generator 320 and the output signals $\bar{f}_2$, $\bar{f}_4$ from PLA circuit 270. Upon receiving one of the output signals $\bar{f}_2$, $\bar{f}_4$ and $\bar{f}_{6a}$ and the DMA request and clock signals $\overline{\text{5DREQ}}$ and $\bar{\phi}$ respectively from first DMA request circuit 220 and CPU, the second DMA request circuit 300 acts to produce a DMA request signal $\overline{\text{DREQ1}}$. Furthermore, the second DMA request circuit 300 is responsive to the DMA acknowledge and clock signals $\overline{\text{DACK1}}$ and $\bar{\phi}$ respectively from DMA control device 140 and CPU and one of the output signals $\bar{f}_2$, $\bar{f}_4$ and $\bar{f}_{6a}$ to produce a selection-enable signal s.

The second address signal generator 310 receives the output and selection-enable signals $\bar{f}_2$ and $\bar{s}$ respectively from PLA and DMA request circuits 270, 300 to conduct generation of the write-enable and load signals $\overline{\text{DR/W}}$ and $\overline{N}_t$ and to produce a binary signal as the above-noted address signals to define the address $E0_{16}$ of RAM. The second address signal generator 310 is also responsive to the selection-enable signal $\bar{s}$ and the output signal $\bar{f}_4$ from PLA circuit 270 to conduct generation of the read-enable signal DR/W and to produce a load signal $\bar{u}$ and a binary signal for defining the address $E2_{16}$ of RAM as the above-noted address signals. Furthermore, the second address signal generator 310 is responsive to the selection-enable signal $\bar{s}$ and the output signal $\bar{f}_{6a}$ from output signal generator 320 to conduct generation of the read-enable signal DR/W and to produce a load signal $\bar{v}$ and a binary signal for defining the address $E4_{16}$ of RAM as the above-noted address signals.

The output signal generator 320 is reset by the reset signal $\overline{\text{RST}}$ from CPU and responsive to the output signal $\bar{f}_6$ from PLA circuit 270 to conduct generation of the output signal $\bar{f}_{6a}$. The output signal generator 320 serves to produce a low level signal $\bar{w}$ in response to the pulse and load signals $\bar{\phi}$ and $\bar{v}$ respectively from pulse and address signal generators 290, 310. Upon receiving a high level signal $t_l$ from a second count circuit 350, the output signal generator 320 makes the low level signal $\bar{w}$ a high level signal, conducts generation of the flag signal $RF_1$ and produces a DMA request prohibition signal $\overline{\text{5DREQiNH}}$. The output signal generator 320 is responsive to the output signal $\bar{f}_4$ from PLA circuit 270 to produce a low level signal $\overline{\text{ESA}}$ as the second output signal described above.

When it receives the pulse and load signals $\bar{\phi}_1$ and $\bar{u}$ respectively from pulse and address signal generators 290, 310, the output signal generator 320 serves to conduct generation of the flag signal $RF_3$ and to make the flag and DMA request prohibition signals $RF_1$ and $\overline{\text{5DREQiNH}}$ low and high level signals respectively. When it receives a high level signal $t_d$ from a third count circuit 360, the output signal generator 320 conducts generation of the flag signal $RF_2$ and produces a high level signal ESA as the first output signal described above. Furthermore, the output signal generator 320 is responsive to the flag and latch signals $F_{10}$ and $\overline{m}$ respectively from latch and pulse signal control circuits 250, 280 to make the flag signal $RF_3$ a low level signal and is responsive to the output signal $g_d$ from control counter 260 to permit generation of the flag signal $RF_1$.

A pulse signal control circuit 330 is responsive to the output signal $\bar{f}_3$ from PLA circuit 270 to generate a series of pulse signals $\bar{\phi}_2$ as a series of pulse signals $\phi_2$. Generation of the pulse signals $\phi_2$ from pulse signal generator 330 is inhibited by the output signal $\bar{f}_2$ from PLA circuit 270. The pulse signal generator 290 receives a series of the clock signals $\bar{\phi}$ from CPU to produce each series of the pulse signals $\bar{\phi}_1$ and $\bar{\phi}_2$ respectively at predetermined frequencies of one and four microseconds. When reset by one of the reset and output signals $\overline{RST}$ and n respectively from CPU and pulse signal control circuit 280, a first count circuit 340 counts a series of the pulse signals $\phi_2$ from pulse signal control circuit 330 to produce a binary signal indicative of the number of the counted pulse signals $\phi_2$, this binary signal being applied by the count circuit 340 to the data bus DB in response to the load signal $\overline{N}_t$ from address signal generator 310.

The second count circuit 350 is reset by the reset signal $\overline{RST}$ from CPU and responsive to the load signal $\bar{v}$ from address signal generator 310 to receive the calculated time value for determination of the ignition timing as a binary signal from RAM through the data bus DB. The second count circuit 350 is also responsive to the low level signal $\bar{w}$ from output signal generator 320 to count down the value of the above binary signal in accordance with a series of the pulse signals $\bar{\phi}_2$ from pulse signal generator 290. Upon completion of the count down operation, the count circuit 360 serves to conduct generation of the high level signal $t_i$. After reset by the reset signal $\overline{RST}$ from CPU, the third count circuit 360 is responsive to the load signal $\bar{u}$ from address signal generator 310 to receive the calculated deenergization time value of the ignition coil from RAM as a binary signal. Upon receiving the flag signal $RF_2$ from output signal generator 320 as a low level signal, the third count circuit 360 serves to count down the value of the above binary signal in accordance with a series of the pulse signals $\bar{\phi}_2$ to conduct generation of the high level signal $t_d$ upon completion of its count down operation.

Figure 6:
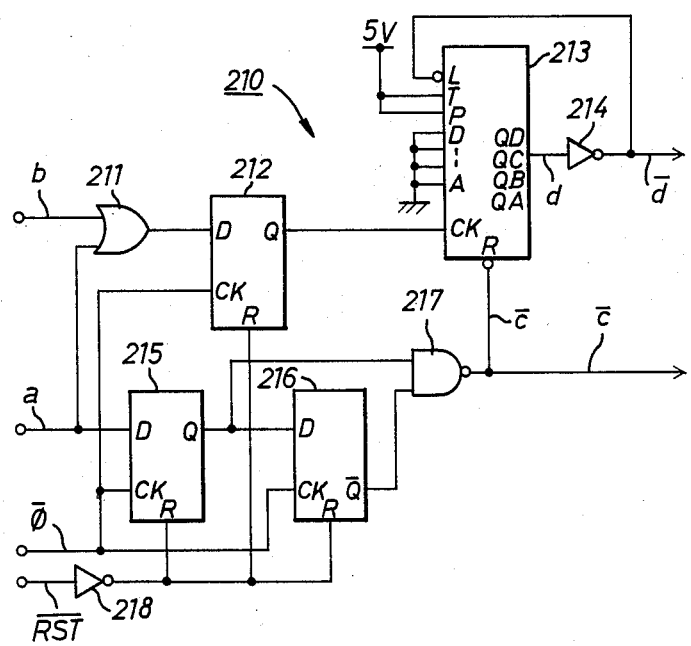
FIG. 6 is a circuit diagram of the signal generator illustrated in block form in FIG. 5.

In FIG. 6, there is illustrated an embodiment of the signal generator 210 of I/O which comprises a D-flip flop 212 connected to CPU and also to the wave shaper 110 through an OR-gate 211. When the reset signal $\overline{RST}$ from CPU is inverted by an inverter 218 into a high level signal, the D-flip flop 212 is reset by the high level signal from inverter 218 to produce a low level signal at its output terminal Q. The D-flip flop 212 receives the reference and angular signals a, b from wave shaper 110 through OR-gate 211 to sequentially produce a pulse signal at each trailing edge of the clock signals $\bar{\phi}$. In addition, the angular signal b of one degree is conditioned by OR-gate 211 in synchronization with the reference signal a.

The signal generator 210 also comprises a synchronous differentiator which has a pair of D-flip flops 215, 216 and a NAND-gate 217. D-flip flop 215 is reset by the high level signal from inverter 218 to produce a low level signal at its output terminal Q. D-flip flop 215 is also responsive to the reference signal a at the trailing edge of one of the clock signals $\bar{\phi}$ from CPU to produce a high level signal at its output terminal Q. D-flip flop 216 is reset by the high level signal from inverter 218 to produce a high level signal at its output terminal $\bar{Q}$. D-flip flop 216 is also responsive to the high or low level signal from D-flip flop 215 at the trailing edge of one of the clock signals $\bar{\phi}$ to produce a low or high level signal at its output terminal $\bar{Q}$. NAND-gate 217 receives the high level signals from D-flip flops 215, 216 to conduct generation of the reset signal $\bar{c}$ (see FIG. 7(d)). The reset signal $\bar{c}$ from NAND-gate 217 rises to a high level when one of the high level signals from D-flip flops 215, 216 drops to a low level. In the embodiment, a D-flip flop of CMOSTC4013B type manufactured by TOKYO SHIBAURA DENKI KABUSHIKI KAISHA in Japan is used as each of D-flip flops 212, 215 and 216.

Figure 7:
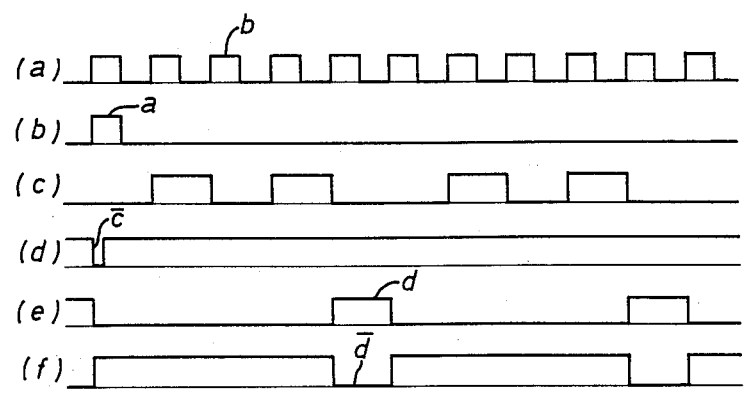
FIG. 7 illustrates waveforms obtained at various points in the circuit diagram of FIG. 6.

A synchronous four-bit counter 213 acts as a one-fifth frequency divider which is reset by the reset signal $\bar{c}$ from NAND-gate 217 to produce a low level signal at its output terminal $Q_c$. The counter 213 starts to count a series of the pulse signals from D-flip flop 212 at the leading edge of a first pulse signal issued from D-flip flop 212 after generation of the reset signal $\bar{c}$ and produces a pulse signal d (see FIG. 7(e)) at the leading edge of a fourth pulse signal issued from D-flip flop 212. When the pulse signal d is inverted by an inverter 214 into the pulse signal $\bar{d}$, the counter 213 loads low level signals from input terminals A to D to output terminals $Q_D$ to $Q_A$ at the leading edge of a fifth pulse signal issued from D-flip flop 212 to again count a series of the pulse signals from D-flip flop 212. Additionally, the input terminals A to D of counter 213 are respectively grounded. In the embodiment, a SN74LS161 type counter manufactured by TEXAS INSTRUMENTS INCORPORATED in U.S.A. is used as the counter 213. A waveform shown in (c) of FIG. 7 is one of an output signal from the output terminal $Q_A$ of counter 213.

When the wave shaper 110 produces a reference signal a together with an angular signal b after reset of D-flip flops 212, 215, 216, D-flip flop 212 is responsive to the reference and angular signals a, b through OR-gate 211 from wave shaper 110 and one of the clock signals $\bar{\phi}$ to produce a pulse signal. D-flip flop 215 is also responsive to the reference signal a and one of the clock signals $\bar{\phi}$ to produce a high level signal so that NAND-gate 217 generates a reset signal $\bar{c}$ under reset of D-flip flop 216 to reset the counter 213. In this case, generation of the reset signal $\bar{c}$ is conducted in synchronization with the leading edge of the reference signal a.

When a low level signal is produced from D-flip flop 216 in response to the high level signal from D-flip flop 215 and one of the clock signals $\bar{\phi}$ from CPU, it is applied to NAND-gate 217 to make the reset signal $\bar{c}$ a high level signal for release of the reset condition of counter 213. When a series of angular signals b following the reference signal a are produced from wave shaper 110, they are applied by D-flip flop 212 sequentially as pulse signals to counter 213 in response to the clock signals $\bar{\phi}$. Thus, the counter 213 serves to repetitively produce a pulse signal $\bar{d}$ through inverter 214 in response to each of fifth pulse signals issued from D-flip flop 212 on a basis of the pulse signal defined by the reference signal a.

Figure 8:
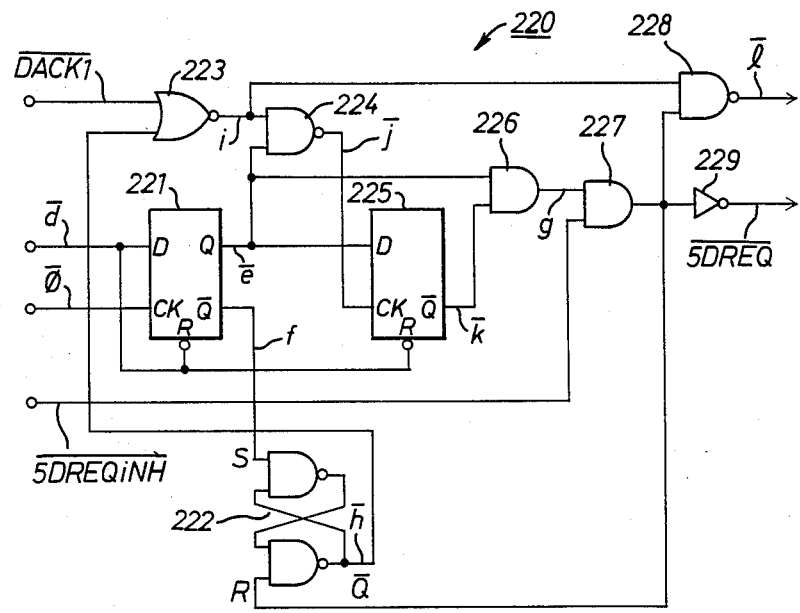
FIG. 8 is a circuit diagram of the first DMA request circuit shown in block form in FIG. 5.

FIG. 8 illustrates an embodiment of the first DMA request circuit 220 which comprises a D-flip flop 221 reset by the pulse signal $\bar{d}$ from signal generator 210 to produce low and high level signals e and f respectively at its output terminals Q and $\bar{Q}$ (see FIGS. 9(b), (c)). Upon release of the reset condition at the trailing edge of the pulse signal $\bar{d}$, D-flip flop 221 serves to make the low and high level signals e and f respectively high and low level signals at the trailing edge of one of the clock signals $\bar{\phi}$. The first DMA request circuit 220 also comprises an RS-flip flop 222, a NAND-gate 224 and a D-flip flop 225 each of which is connected to D-flip flop 221. RS-flip flop 222 is responsive to a high level signal from an AND-gate 227 to produce a low level signal $\bar{h}$ (see FIG. 9(e)) at its output terminal $\bar{Q}$ when the high level signal f from D-flip flop 221 is at a low level. RS-flip flop 222 is also responsive to the high level signal f and a low level signal from AND-gate 227 to make the low level signal $\bar{h}$ a high level signal.

NAND-gate 224 is responsive to a high level signal i (see FIG. 9(h)) from a NOR-gate 223 to produce a low level signal $\bar{j}$ (see FIG. 9(i)) when the low level signal $\bar{e}$ from D-flip flop 221 is at a high level. The low level signal $\bar{j}$ from NAND-gate 224 rises to a high level in response to the low level signal $\bar{e}$. The low level signal $\bar{j}$ also rises to the high level when the high level signal i drops to a low level. NOR-gate 223 serves to conduct generation of the high level signal i in response to the DMA acknowledge and low level signals $\overline{DACK1}$ and $\bar{h}$ respectively from DMA control device 140 and RS-flip flop 222. The high level signal i drops to a low level when one of the DMA acknowledge and low level signals $\overline{DACK1}$ and $\bar{h}$ rises to a high level.

D-flip flop 225 is reset by the pulse signal $\bar{d}$ from signal generator 210 and responsive to the high level signal from D-flip flop 221 at the trailing edge of the low level signal $\bar{j}$ from NAND-gate 224 to produce a low level signal $\bar{k}$ (see FIG. 9(j)) at its output terminal $\bar{Q}$. An AND-gate 226 serves to produce a high level signal g (see FIG. 9(d)) when the low level signals $\bar{e}$, $\bar{k}$ from D-flip flops 221, 225 are at a high level. The high level signal g from AND-gate 226 drops to a low level in response to one of the low level signals $\bar{e}$, $\bar{k}$. An AND-gate 227 serves to produce a high level signal in response to the high level signal g from AND-gate 226 when the DMA request prohibition signal $\overline{5DREQiNH}$ from output signal generator 320 is at a high level. The high level signal from AND-gate 227 drops to a low level in response to the DMA request prohibition signal $\overline{5DREQiNH}$ and also drops to the low level when the high level signal g drops to a low level.

A NAND-gate 228 serves to conduct generation of the low level signal $\bar{l}$ (see FIG. 9(k)) in response to the high level signals from NOR-gate 223 and AND-gate 227. When one of the high level signals from NOR-gate 223 and AND-gate 227 drops to a low level, the low level, signal $\bar{l}$ becomes a high level signal. An inverter 229 receives the high level signal from AND-gate 227 to produce a low level signal as the DMA request signal $\overline{5DREQ}$ (see FIG. 9(f)). This means that the DMA request signal $\overline{5DREQ}$ is repetitively produced from inverter 229 upon generation of each pulse signal $\bar{d}$ or at each five-degree crank-angle. In the embodiment, a SN74LS74 type D-flip flop manufactured by TEXAS INSTRUMENTS INCORPORATED is used as each of D-flip flops 221, 225.

Assuming that each series of clock and pulse signals $\bar{\phi}$ and $\bar{d}$ appear respectively from CPU and signal generator 210 while DMA acknowledge and DMA request prohibition signals $\overline{DACK1}$ and $\overline{5DREQiNH}$ respectively from DMA control device 140 and output signal generator 320 are at a high level, D-flip flop 221 is reset by one of the pulse signals $\bar{d}$ to produce low and high level signals $\bar{e}$ and f at its output terminals Q and $\bar{Q}$, and simultaneously D-flip flop 225 is reset to produce a high level signal k at its output terminal $\bar{Q}$. At this stage, NOR-gate 223 produces a low level signal i because the DMA acknowledge signal $\overline{DACK1}$ is at the high level. This makes a low level signal $\bar{l}$ from NAND-gate 228 a high level signal. Then, AND-gate 227 produces a low level signal under control of AND-gate 226 responsive to the low and high level signals from D-flip flops 221, 225 to make a DMA request signal $\overline{5DREQ}$ from inverter 229 a high level signal. At this stage, a high level signal j is produced from NAND-gate 224 due to the low level signals i, $\bar{e}$ from NOR-gate 223 and D-flip flop 221, and a high level signal h is produced from RS-flip flop 222 due to the high and low level signals from D-flip flop 221 and AND-gate 227.

When one of the pulse signals $\bar{d}$ rises to a high level, the low and high level signals $\bar{e}$ and f from D-flip flop 221 are inverted into high and low level signals respectively in response to one of the clock signals $\bar{\phi}$. Then, AND-gate 226 is responsive to the high level signals from D-flip flops 221, 225 to produce a high level signal g so that the inverter 229 produces a DMA request signal $\overline{5DREQ}$ under control of AND-gate 227. At this stage, RS-flip flop 222 produces a low level signal $\bar{h}$ in response to the low and high level signals from D-flip flop 221 and AND-gate 227.

When a DMA acknowledge signal $\overline{DACK1}$ appears from DMA control device 140, NOR-gate 223 produces a high level signal i under generation of the low level signal $\bar{h}$ from RS-flip flop 222 such that NAND-gates 224 and 228 produce low level signals $\bar{j}$, $\bar{l}$ respectively due to the high level signals from D-flip flop 221 and AND-gate 227. When the DMA acknowledge signal $\overline{DACK1}$ rises again to a high level, the high level signal i from NOR-gate 223 drops to a low level to make the low level signals $\bar{j}$, $\bar{l}$ from NAND-gates 224, 228 respectively high level signals. Then, D-flip flop 225 is responsive to the high level signals from D-flip flop 221 and NAND-gate 224 to produce a low level signal $\bar{k}$ so that AND-gate 227 cooperates with AND-gate 226 to make the DMA request signal $\overline{5DREQ}$ from inverter 229 a high level signal.

Figure 10:
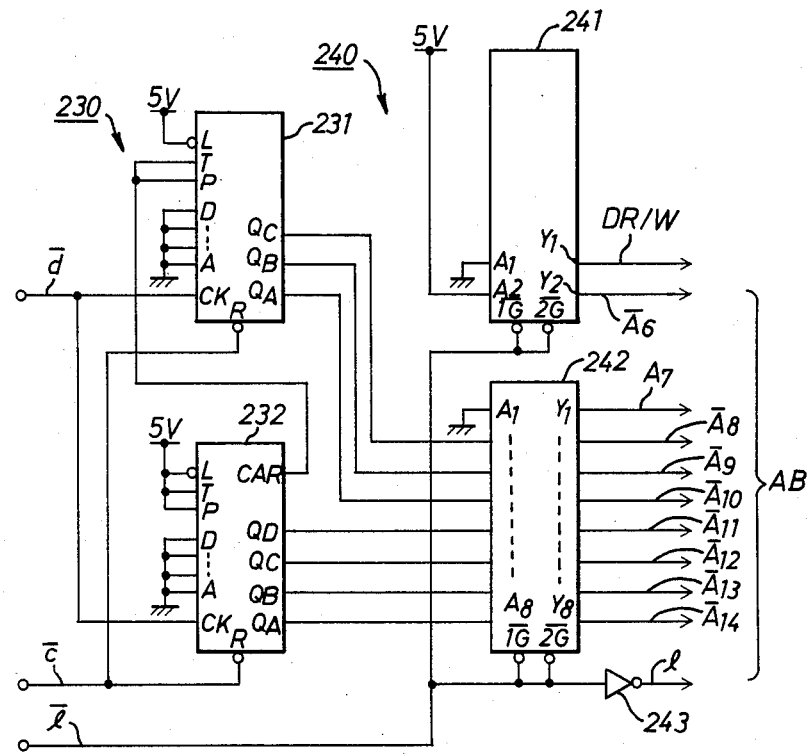
FIG. 10 is circuit diagrams of the crank-angle count circuit and first address signal generator shown in block form in FIG. 5.

In FIG. 10, there are illustrated respective embodiments of the crank-angle count circuit 230 and the address signal generator 240. The crank-angle count circuit 230 comprises a synchronous four-bit counter 232 which is reset by the reset signal $\bar{c}$ from signal generator 210 to produce low level signals respectively at its output terminals $Q_A$, $Q_B$, $Q_C$ and $Q_D$. The counter 232 sequentially counts a series of the pulse signals $\bar{d}$ from signal generator 210 at each trailing edge of the pulse signals $\bar{d}$ such that output signals defined by the counted pulse signals $\bar{d}$ are produced from the output terminals $Q_A$ to $Q_D$ of counter 232. When all the output signals from counter 232 become repetitively high levels during the count operation in counter 232, a high level signal is repetitively produced from a carry terminal CAR of counter 232 to be applied to input terminals P, T of a synchronous four-bit counter 231. In addition, the counter 232 is grounded at its input terminals A to D and connected at its input terminals P, T, L to the five-volt DC power source.

The counter 231 is reset by the reset signal $\bar{c}$ from signal generator 210 to produce low level signals respectively at its output terminals $Q_A$, $Q_B$ and $Q_C$. The counter 231 is also responsive to each of the high level signals from the carry terminal CAR of counter 232 to repetitively count a series of the pulse signals $\bar{d}$ such that output signals defined by the counted pulse signals $\bar{d}$ are produced from the output terminals $Q_A$, $Q_B$ and $Q_C$ of counter 231. In the embodiment, a SN74LS161 type counter manufactured by TEXAS INSTRUMENTS INCORPORATED is ued as each of the synchronous four-bit counters 231, 232.

The address signal generator 240 includes a pair of three-state inverted buffers 241, 242 and an inverter 243. The buffer 241 is provided with an input terminal $A_1$ grounded and with an input terminal $A_2$ connected to the five-volt DC power source. The buffer 241 is connected at its control terminals $1\overline{G}$, $2\overline{G}$ to NAND-gate 228 of first DMA request circuit 220. When the buffer 241 receives the low level signal l from NAND-gate 228 at its control terminals $1\overline{G}$, $2\overline{G}$, low and high level signals appearing respectively at the input terminals $A_1$ and $A_2$ of buffer 241 are inverted and produced from output terminals $Y_1$ and $Y_2$ of buffer 241 as read-enable and address signals DR/W and $\overline{A}_6$. When the low level signal $\overline{l}$ from NAND-gate 228 rises to a high level, high impedance appears at the output terminals $Y_1$, $Y_2$ of buffer 241.

The three-state inverted buffer 242 is provided with an input terminal $A_1$ grounded and with input terminals $A_2$, $A_3$ and $A_4$ connected respectively to the output terminals $Q_C$, $Q_B$ and $Q_A$ of counter 231. The buffer 242 is connected at its input terminal $A_5$ to $A_8$ to the output terminals $Q_D$ to $Q_A$ of counter 232 and also connected at its control terminals $1\overline{G}$, $2\overline{G}$ to NAND-gate 228 of first DMA request circuit 220. When the buffer 242 receives the low level signal $\overline{l}$ from NAND-gate 228, a low level signal appearing at the input terminal $A_1$ of buffer 242 is inverted and produced from an output terminal $Y_1$ of buffer 242 as an address signal $A_7$. When high level signals appear respectively from the output terminals $Q_C$ to $Q_A$ of counter 231 and the output terminals $Q_D$ to $Q_A$ of counter 232, they are inverted by the buffer 242 in response to the low level signal $\overline{l}$ and produced as address signals $\overline{A}_8$ to $\overline{A}_{14}$. In this case, the buffer 242 produces address signals $A_8$ to $A_{14}$ at its output terminals $Y_2$ to $Y_8$ respectively when the high level signals from counters 231, 232 are at a low level. The inverter 243 serves to invert the low level signal $\overline{l}$ into a high level signal l. Additionally, high impedance appears at the output terminals $Y_1$ to $Y_8$ of buffer 242 when the low level signal $\overline{l}$ from NAND-gate 228 rises to a high level. In the embodiment, a 74LS240 type inverted buffer manufactured by TEXAS INSTRUMENTS INCORPORATED is used as each of the buffers 241, 242.

In operation of the address signal generator 240 relative to the crank-angle count circuit 230, when the counters 231, 232 are reset by a reset signal $\overline{c}$ from signal generator 210, they serve to produce low level signals at their output terminals. When at this stage the first DMA request circuit 220 produces a low level signal $\overline{l}$, read-enable and address signals DR/W and $\overline{A}_6$ are produced from the buffer 241, and simultaneously the low level signal appearing at the input terminal $A_1$ of buffer 242 and low level sinals from counters 231, 232 are inverted by the buffer 242 into address signals $A_7$ to $A_{14}$. The low level signal $\overline{l}$ is also inverted by the inverter 243 into a high level or latch signal l. The address signals $\overline{A}_6$ and $A_7$ to $A_{14}$ define a binary signal for specifying the address $200_{16}$ of RAM. In addition, high impedance appears at the output terminals of counters 241, 242 when the low level signal $\overline{l}$ rises to a high level.

When the counters 231, 232 receive a pulse signal $\overline{d}$ appearing from signal generator 210 at this stage, the counter 232 counts the same pulse signal $\overline{d}$ to produce a high level signal at its output terminal $Q_A$. Under this condition, output signals appearing at the output terminals $Q_B$ to $Q_D$ of counter 232 and the output terminals $Q_A$ to $Q_C$ of counter 231 are respectively at a low level. When a low level signal $\overline{l}$ following the above-noted low level signal $\overline{l}$ is produced from the first DMA request circuit 220, it is inverted by the inverter 243 into a high level signal l, and simultaneously read-enable and address signals DR/W, $\overline{A}_6$ and $A_7$ are produced respectively from the output terminals $Y_1$, $Y_2$ of buffer 241 and the output terminal $Y_1$ of buffer 242. The high level signal from the output terminal $Q_A$ of counter 232 is produced from the output terminal $Y_2$ of buffer 242 in response to the low level signal $\overline{l}$ as an address signal $\overline{A}_8$, and simultaneously the low level signals from the output terminals $Q_C$ to $Q_A$ of counter 231 and the output terminals $Q_D$ to $Q_C$ of counter 232 are produced from the output terminals $Y_3$ to $Y_8$ of buffer 242 as address signals $A_9$ to $A_{14}$. The address signals $\overline{A}_6$, $A_7$, $\overline{A}_8$ and $A_9$ to $A_{14}$ define a binary signal for specifying the address $202_{16}$ of RAM. Thereafter, pulse signals $\overline{d}$ appearing from signal generator 210 following the above-noted pulse signal $\overline{d}$ are sequentially counted by the crank-angle count circuit 230 so that a plurality of address signals are repetitively produced from the address signal generator 240 in response to each low level signal $\overline{l}$ as a binary signal for specifying one of the addresses $204_{16}$ to $28E_{16}$ of RAM, as easily understood from the above description.

Figure 11:
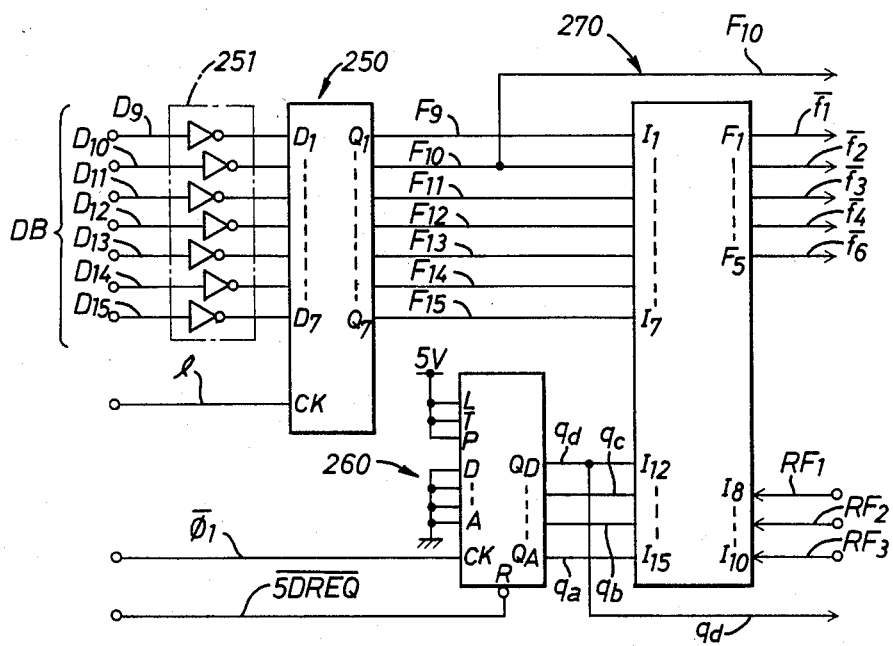
FIG. 11 illustrates circuit diagrams of the latch circuit, control counter and programmable-logic-array circuit shown in block form in FIG. 5.
Figure 12:
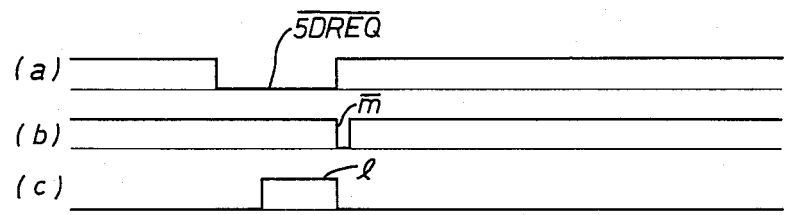
FIG. 12 illustrates waveforms obtained at input points of the latch circuit and control counter of FIG. 11.

In FIG. 11, there are illustrated embodiments of the latch circuit 250, the control counter 260 and the PLA circuit 270 respectively. The latch circuit 250 is connected through an inverter buffer 251 to the data bus DB and is of TC4508 type manufactured by TOKYO SHIBAURA DENKI KABUSHIKI KAISHA in Japan. The buffer 251 is in the form of a plurality of inverters which receive the binary signals from the addresses $200_{16}$ to $28E_{16}$ of RAM through the data bus DB to invert the same signals. The latch circuit 250 latches the inverted output signals from buffer 251 at the trailing edge of the high level signal l (see FIG. 12(c)) to produce flag signals $F_8$ (or $\overline{F}_8$) to $F_{15}$ (or $\overline{F}_{15}$) respectively at its output terminals $Q_1$ to $Q_7$.

The control counter 260 is of SN74LS161 type which is manufactured by TEXAS INSTRUMENTS INCORPORATED. The control counter 260 is reset by the DMA request signal $\overline{5DREQ}$ from first DMA request circuit 220 to produce low level signals $\overline{q}_a$ to $\overline{q}_d$ respectively at its output terminals $Q_A$ to $Q_D$. When the control counter 260 is released from the reset condition at the trailing edge of the DMA request signal $\overline{5DREQ}$, it serves to count a series of the pulse signals $\overline{\phi}_1$ from pulse signal control circuit 280 to produce output signals indicative of the number of the counted pulse signals $\overline{\phi}_1$ as four-bit notation at its output terminals $Q_A$ to $Q_D$. In this case, the output terminals $Q_A$ and $Q_D$ of counter 260 are utilized respectively to define the least and highest significant bits of the output signals from counter 260. In addition, the counter 260 is grounded at its input terminals A to D and connected at its terminals L, T and P to the five-volt DC power source.

The PLA circuit 270 is of 82S100 type which is manufactured by NATIONAL SEMICONDUCTOR CORPORATION in U. S. A. The PLA circuit 270 is provided with the input terminals $I_1$ to $I_7$ connected respectively to the output terminals $Q_1$ to $Q_7$ of latch circuit 250 and with input terminals $I_{12}$ to $I_{15}$ connected respectively to the output terminals $Q_D$ to $Q_A$ of control counter 260. The PLA circuit 270 is also connected at its input terminals $I_8$, $I_9$ and $I_{10}$ to the output signal generator 320. The PLA circuit 270 serves to produce output signals $\bar{f}_1$ to $\bar{f}_4$ and $\bar{f}_6$ respectively at its output terminals $F_1$ to $F_5$ when these output signals $\bar{f}_1$ to $\bar{f}_4$ and $\bar{f}_6$ satisfy the following logic equations (1) to (8) in relation to the flag signals $F_9$ to $F_{15}$ and $RF_1$ to $RF_3$ respectively from the latch circuit 250 and the output signal generator 320 and the output signals from control counter 260.

(1) In case the control counter 260 produces a high level signal $q_a$ at its output terminal $Q_A$ and produces low level signals $\bar{q}_b$ to $\bar{q}_d$ respectively at its output terminals $Q_B$ to $Q_D$:

$$\bar{f}_1 = \overline{q_a \cdot \bar{q}_b \cdot \bar{q}_c \cdot \bar{q}_d \cdot F_{15}} \tag{1}$$

(2) In case the counter 260 produces a high level signal $q_b$ at its output terminal $Q_B$ and produces low level signals $\bar{q}_a$, $\bar{q}_c$ and $\bar{q}_d$ respectively at its output terminals $Q_A$, $Q_C$ and $Q_D$:

$$\bar{f}_2 = \overline{\bar{q}_a \cdot q_b \cdot \bar{q}_c \cdot \bar{q}_d \cdot F_{12}} \tag{2}$$

(3) In case the counter 260 produces high level signals $q_a$ and $q_b$ respectively at its output terminals $Q_A$ and $Q_B$ and produces low level signals $\bar{q}_c$ and $\bar{q}_d$ respectively at its output terminals $Q_C$ and $Q_D$:

$$\bar{f}_3 = \overline{q_a \cdot q_b \cdot \bar{q}_c \cdot \bar{q}_d \cdot F_{11}} \tag{3}$$

(4) In case the counter 260 produces a high level signal $q_c$ at its output terminal $Q_C$ and produces low level signals $\bar{q}_a$, $\bar{q}_b$ and $\bar{q}_d$ respectively at its output terminals $Q_A$, $Q_B$ and $Q_D$:

$$f_{4a} = \bar{q}_a \cdot \bar{q}_b \cdot q_c \cdot \bar{q}_d \cdot F_{10} \cdot F_{13} \cdot RF_2 \cdot \overline{RF_3} \tag{4}$$

In case the counter 260 produces high level signals $q_a$ and $q_c$ respectively at its output terminals $Q_A$ and $Q_C$ and low level signals $\bar{q}_b$ and $\bar{q}_d$ respectively at its output terminals $Q_B$ and $Q_D$:

$$f_5 = q_a \cdot \bar{q}_b \cdot q_c \cdot \bar{q}_d \cdot F_9 \cdot RF_2 \cdot \overline{RF_3} \tag{5}$$

In case the counter 260 produces high level signals $q_a$ to $q_c$ respectively at its output terminals $Q_A$ to $Q_C$ and produces a low level signal $\bar{q}_d$ at its output terminal $Q_D$:

$$f_7 = RF_1 \cdot RF_2 \cdot \overline{RF_3} \cdot F_{10} \tag{6}$$

When one of the equations (4), (5) and (6) is satisfied, another logic equation is given as follows.

$$\bar{f}_4 = \overline{f_{4a} + f_5 + f_7} \tag{7}$$

(5) In case the counter 260 produces high level signals $q_b$ and $q_c$ respectively at its output terminals $Q_B$ and $Q_C$ and produces low level signals $\bar{q}_a$ and $\bar{q}_d$ respectively at its output terminals $Q_A$ and $Q_D$:

$$\bar{f}_6 = \overline{\bar{q}_a \cdot q_b \cdot q_c \cdot \bar{q}_d \cdot F_{14}} \tag{8}$$

Hereinafter, operation of the PLA circuit 270 is described in relation to those of the latch circuit 250 and control counter 260. Assuming that DMA request and pulse signals $\overline{SDREQ}$ and $\bar{\phi}_1$ appear respectively from the DMA request and pulse signal control circuits 220 and 280 and that flag signals $\overline{RF_1}$, $RF_2$ and $\overline{RF_3}$ appear from the output signal generator 320, the DMA request and pulse signals $\overline{SDREQ}$ and $\bar{\phi}_1$ are applied to the control counter 260, and the flag signals $\overline{RF_1}$, $RF_2$ and $\overline{RF_3}$ are applied to the PLA circuit 270. Assuming that a latch signal 1 appears from the address signal generator 240 and that a plurality of binary signals $D_9$, $\overline{D}_{10}$, $D_{11}$, $\overline{D}_{12}$, $\overline{D}_{13}$, $\overline{D}_{14}$ and $\overline{D}_{15}$ are inverted and read out from the address $200_{16}$ of RAM, the inverted binary signals $\overline{D}_9$, $D_{10}$, $\overline{D}_{11}$, $D_{12}$, $D_{13}$, $D_{14}$ and $D_{15}$ are inverted and latched by the latch circuit 250 at the trailing edge of the latch signal 1 and applied to the PLA circuit 270 as binary flag signals $F_9$, $\bar{F}_{10}$, $F_{11}$, $\bar{F}_{12}$, $F_{13}$, $F_{14}$ and $\bar{F}_{15}$.

When the control counter 260 produces a high level signal $q_a$ and low level signals $\bar{q}_b$, $\bar{q}_c$ and $\bar{q}_d$ in response to the first pulse signal $\bar{\phi}_1$ from control circuit 280 after reset by the DMA request signal $\overline{SDREQ}$, the PLA circuit 270 serves to check that the logic equation (1) may not be satisfied by the flag signal $\bar{F}_{15}$ and the high and low level signals $q_a$, $\bar{q}_b$, $\bar{q}_c$ and $\bar{q}_d$. Upon completing the check of PLA circuit 270, an output signal $\bar{f}_1$ is produced as a high level signal from the output terminal $F_1$ of PLA circuit 270. When the counter 260 is responsive to the second pulse signal $\bar{\phi}_1$ from control circuit 280 to produce a high level signal $q_b$ and low level signals $\bar{q}_a$, $\bar{q}_c$ and $\bar{q}_d$, the PLA circuit 270 checks satisfaction of the logic equation (2) relative to the flag signal $\bar{F}_{12}$ and the high and low level signals $q_b$, $\bar{q}_a$, $\bar{q}_c$ and $\bar{q}_d$ to produce an output signal $\bar{f}_2$ at its output terminal $F_2$.

When the counter 260 is responsive to the third pulse signal $\bar{\phi}_1$ from control circuit 280 to produce high level signals $q_a$ and $q_b$ and low level signals $\bar{q}_c$ and $\bar{q}_d$, the PLA circuit 270 serves to check that the logic equation (3) is satisfied by the flag signal $F_{11}$ and the high and low level signals $q_a$, $q_b$, $\bar{q}_c$ and $\bar{q}_d$. This produces an output signal $\bar{f}_3$ from the output terminal $F_3$ of PLA circuit 270. When the counter 260 receives the fourth pulse signal $\bar{\phi}_1$ from control circuit 280 to produce a high level signal $q_c$ and low level signals $\bar{q}_a$, $\bar{q}_b$ and $\bar{q}_d$, the PLA circuit 270 checks that the logic equations (4), (7) may not be satisfied by the flag signals $\bar{F}_{10}$, $\bar{F}_{13}$, $RF_2$ and $\overline{RF_3}$ and the high and low level signals $q_c$, $\bar{q}_a$, $\bar{q}_b$ and $\bar{q}_d$. This maintains as a high level signal an output signal $\bar{f}_4$ to be produced from the output terminal $F_4$ of PLA circuit 270.

When the counter 260 is responsive to the fifth pulse signal $\bar{\phi}_1$ from control circuit 280 to produce high level signals $q_a$ and $q_c$ and low level signals $\bar{q}_b$ and $\bar{q}_d$, the PLA circuit 270 serves to check that the logic equations (5), (7) are satisfied by the flag signals $F_9$, $RF_2$ and $\overline{RF_3}$ and the high and low level signals $q_a$, $q_c$, $\bar{q}_b$ and $\bar{q}_d$. This produces an output signal $\bar{f}_4$ from the output terminal $F_4$ of PLA circuit 270. When the counter 260 is responsive to the sixth pulse signal $\bar{\phi}_1$ from control circuit 280 to produce low level signals $\bar{q}_a$ and $\bar{q}_d$ and high level signals $q_b$ and $q_c$, the PLA circuit 270 serves to check that the logic equation (8) may not be satisfied by the flag signal $\overline{F}_{14}$ and the low and high level signals $\overline{q}_a$, $\overline{q}_d$, $q_b$ and $q_c$. This maintains as a high level signal an output signal $\overline{f}_6$ to be produced from the output terminal $F_5$ of PLA circuit 270.

When the counter 260 is responsive to the seventh pulse signal $\overline{\phi}_1$ from control circuit 270 to produce high level signals $q_a$, $q_b$ and $q_c$ and a low level signal $\overline{q}_d$, the PLA circuit 270 checks that the logic equations (6), (7) may not be satisfied by the flag signals $\overline{F}_{10}$, $\overline{RF}_1$, $RF_2$ and $\overline{RF}_3$. This maintains the output signal $\overline{f}_4$ as a high level signal. When the counter 260 receives the eighth pulse signal $\overline{\phi}_1$ from control circuit 280, it produces low level signals $\overline{q}_a$, $\overline{q}_b$ and $\overline{q}_c$ and a high level signal $q_d$. In addition, it should be understood that the PLA circuit 290 cooperates with the latch circuit 250 and the control counter 260 repetitively to conduct operation similar to the above-noted operation in case a plurality of binary signals are sequentially read out from each of the addresses $202_{16}$, - - - , $28E_{16}$ of RAM.

Figure 13:
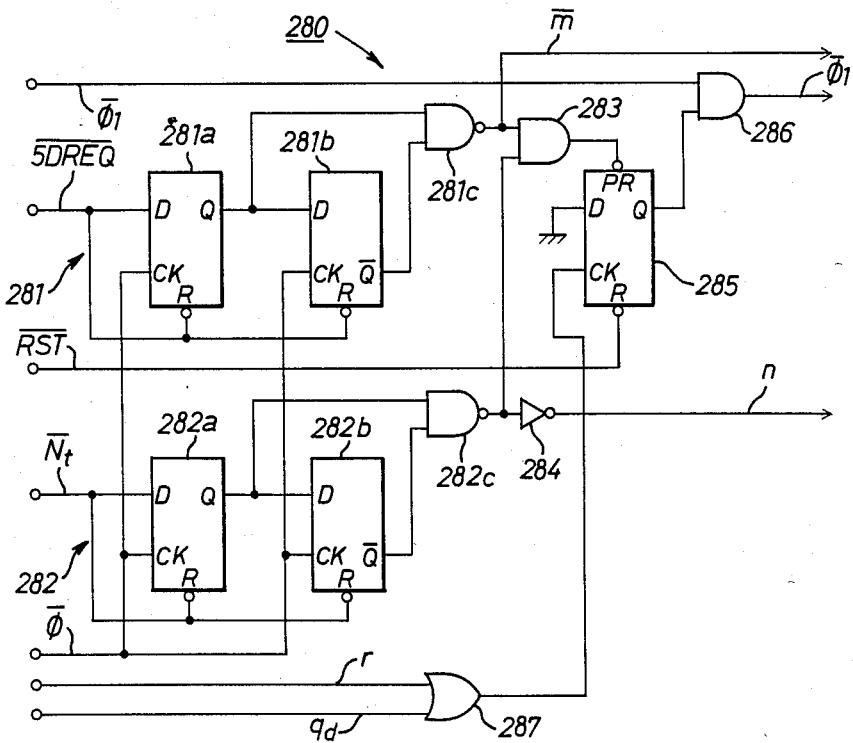
FIG. 13 is a circuit diagram of the pulse signal control circuit shown in block form in FIG. 5.

FIG. 13 illustrates an embodiment of the pulse signal control circuit 280 in which a first synchronous differentiator 281 is formed by a pair of D-flip flops 281a, 281b and a NAND-gate 281c. D-flip flop 281a is reset by the DMA request signal $\overline{5DREQ}$ from first DMA request circuit 220 to produce a low level signal at its output terminal Q. When the DMA request signal $\overline{5DREQ}$ rises to a high level, a high level signal is produced from the output terminal Q of D-flip flop 281a in response to the trailing edge of one of the clock signals $\overline{\phi}$ from CPU. Upon receipt of the DMA request signal $\overline{5DREQ}$ from DMA request circuit 220, D-flip flop 281b is reset to produce a high level signal at its output terminal $\overline{Q}$. D-flip flop 281b is also responsive to the high level signal from D-flip flop 281a to produce a low level signal at its output terminal $\overline{Q}$ at the trailing edge of one of the clock signals $\overline{\phi}$. NAND-gate 281c is responsive to the high level signals from D-flip flops 281a, 281b to conduct generation of the low level or latch signal $\overline{m}$. When one of the high level signals from D-flip flops 281a, 281b drops to a low level, the latch signal $\overline{m}$ (see FIG. 12(b)) from NAND-gate 281c rises to a high level.

The pulse signal control circuit 280 comprises a second synchronous differentiator 282 which is formed by a pair of D-flip flops 282a, 282b and a NAND-gate 282c. D-flip flop 282a is reset by the load signal $\overline{N}_t$ from second address signal generator 310 to produce a low level signal at its output terminal Q. When the load signal $\overline{N}_t$ rises to a high level, a high level signal is produced from the output terminal Q of D-flip flop 282a at the trailing edge of one of the clock signals $\overline{\phi}$. Upon receipt of the load signal $\overline{N}_t$ from address signal generator 310, D-flip flop 282b is reset to produce a high level signal at its output terminal $\overline{Q}$. D-flip flop 282b is also responsive to the high level signal from D-flip flop 282a to produce a low level signal at its output terminal $\overline{Q}$ at the trailing edge of one of the clock signals $\overline{\phi}$. NAND-gate 282c is responsive to the high level signals from D-flip flops 282a, 282b to produce a low level signal. When one of the high level signals from D-flip flops 282a, 282b drops to a low level, the low level signal from NAND-gate 282c rises to a high level.

D-flip flop 285 is reset by the reset signal $\overline{RST}$ from CPU to produce a low level signal at its output terminal Q. When an AND-gate 283 produces a low level signal in response to one of the low level signals from NAND-gates 281c, 282c, D-flip flop 285 receives the low level signal from AND-gate 283 at its preset terminal PR to produce a high level signal at its output terminal Q. D-flip flop 285 serves to produce a low level signal at its output terminal Q at the leading edge of one of the output signals $q_d$ and r respectively through an OR-gate 287 from the control counter 260 and the second DMA request circuit 300. An AND-gate 286 is responsive to the high level signal from D-flip flop 285 to permit applying of the pulse signals $\overline{\phi}_1$ therethrough from pulse signal generator 290 to the control counter 260. When the high level signal from D-flip flop 285 drops to a low level, AND-gate 286 serves to inhibit applying of the pulse signals $\overline{\phi}_1$ from pulse signal generator 290 to the control counter 260. An inverter 284 serves to conduct generation of the high level signal n in response to the low level signal from NAND-gate 282c.

Assuming that reset and clock signals $\overline{RST}$ and $\overline{\phi}$ appear from CPU and also that DMA request and pulse signals $\overline{5DREQ}$ and $\overline{\phi}_1$ appear respectively from the first DMA request circuit 220 and the pulse signal generator 290, D-flip flop 285 is reset by the reset signal $\overline{RST}$ such that it produces a low level signal to inhibit pass of the pulse signals $\overline{\phi}_1$ through AND-gate 286. At this stage, it is assumed that a load signal $\overline{N}_t$ to be produced from the second address signal generator 310 is at a high level and also that output signals $q_d$ and r to be produced respectively from the control counter 260 and second DMA request circuit 300 are at a low level.

When the DMA request signal $\overline{5DREQ}$ from first DMA request circuit 220 rises to a high level, the first synchronous differentiator 281 is responsive to one of the clock signals $\overline{\phi}$ from CPU to produce a latch signal $\overline{m}$. Then, D-flip flop 285 is controlled by AND-gate 283 responsive to the latch signal $\overline{m}$ to produce a high level signal so as to permit pass of the pulse signals $\overline{\phi}_1$ through AND-gate 286 from pulse signal generator 290. When an output signal r appears from the second DMA request circuit 300, D-flip flop 285 receives the output signal r through OR-gate 287 so that it produces a low level signal to inhibit pass of the pulse signals $\overline{\phi}_1$ through AND-gate 286.

When a load signal $\overline{N}_t$ appears from the second address signal generator 310 and rises to a high level, the second synchronous differentiator 282 receives one of the clock signals $\overline{\phi}$ from CPU to instantaneously produce a low level signal. Thus, the inverter 284 produces a high level signal n in response to the low level signal from differentiator 282, and simultaneously D-flip flop 285 produces a high level signal under control of AND-gate 283 to permit pass of the pulse signals $\overline{\phi}_1$ through AND-gate 286. Additionally, in case the control counter 260 produces an output signal $q_d$, D-flip flop 285 cooperates with OR-gate 287 to inhibit pass of the pulse signals $\overline{\phi}_1$ through AND-gate 286, as previously described.

Figure 14:
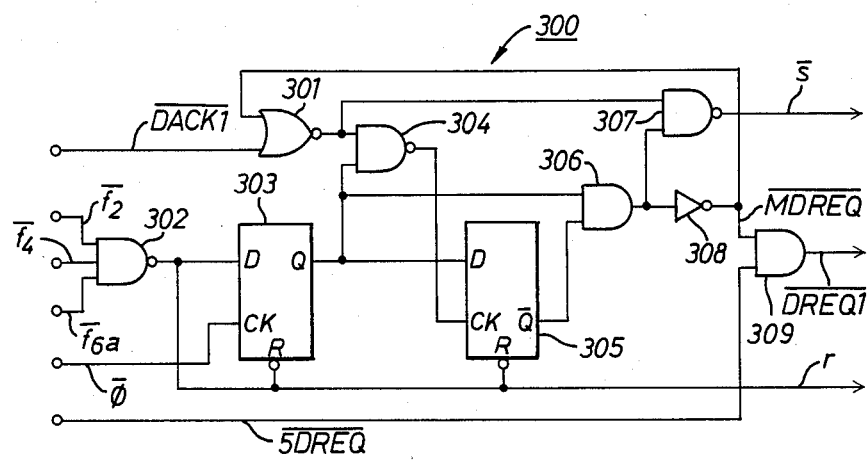
FIG. 14 is a circuit diagram of the second DMA request circuit shown in block form in FIG. 5.

In FIG. 14, there is illustrated an embodiment of the second DMA request circuit 300 which comprises a NOR-gate 301 connected to an inverter 308 and the DMA control device 140, and a NAND-gate 302 connected to the PLA circuit 270 and the output signal generator 320. NOR-gate 301 serves to produce a high level signal in response to the DMA acknowledge signal $\overline{DACK1}$ from DMA control device 140 and a MULTI-DMA request signal $\overline{MDREQ}$ from inverter 308. When one of the DMA acknowledge and MULTI-DMA request signals $\overline{DACK1}$ and $\overline{MDREQ}$ rises to a high level, the high level signal from NOR-gate 301 drops to a low level. NAND-gate 302 acts to conduct generation of the high level signal r in response to one of the output signal $\bar{f}_{6a}$ from output signal generator 320 and the output signals $\bar{f}_2$ and $\bar{f}_4$ from PLA circuit 270. When all the output signals $\bar{f}_2$, $\bar{f}_4$ and $\bar{f}_{6a}$ rise to a high level respectively, the high level signal r from NAND-gate 302 drops to a low level.

The DMA request circuit 300 also comprises a D-flip flop 305 connected to NOR-gate 301 and NAND-gate 302 respectively through a NAND-gate 304 and a D-flip flop 303. D-flip flop 303 is reset by the low level signal from NAND-gate 302 to produce a low level signal at its output terminal Q. D-flip flop 303 is also responsive to the high level signal r from NAND-gate 302 at the trailing edge of one of the clock signals $\bar{\phi}$ from CPU to produce a high level signal at its output terminal Q. D-flip flop 305 is reset by the low level signal from NAND-gate 302 to produce a high level signal at its output terminal $\bar{Q}$. When NAND-gate 304 produces a high level signal in response to one of the low level signals from NOR-gate 301 and D-flip flop 303, D-flip flop 305 receives the low or high level signal from D-flip flop 303 to produce a high or low level signal at its output terminal $\bar{Q}$.

An AND-gate 306 is responsive to the high level signals from D-flip flops 303, 305 to produce a high level signal. The high level signal from AND-gate 306 drops to a low level when one of the high level signals from D-flip flops 303, 305 becomes a low level signal. A NAND-gate 307 receives the high level signals from NOR-gate 301 and AND-gate 306 to conduct generation of the selection-enable signal $\bar{s}$. The selection-enable signal $\bar{s}$ from NAND-gate 307 rises to a high level in response to one of the low level signals from NOR-gate 301 and AND-gate 306. The inverter 308 is responsive to the high level signal from AND-gate 306 to conduct generation of the MULTI-DMA request signal $\overline{MDREQ}$. The MULTI-DMA request signal $\overline{MDREQ}$ is inverted by the inverter 308 in response to the low level signal from AND-gate 306. An AND-gate 309 is responsive to one of the DMA request signals $\overline{5DREQ1}$ and $\overline{MDREQ}$ from DMA request circuit 220 and inverter 308 to conduct generation of the DMA request signal $\overline{DREQ1}$. The DMA request signal $\overline{DREQ1}$ from AND-gate 309 rises to a high level when each of the DMA request signals $\overline{DREQ1}$ and $\overline{MDREQ}$ rises to a high level.

Assuming that under reset of D-flip flops 303, 305 output and clock signals $\bar{f}_2$ and $\bar{\phi}$ appear respectively from the PLA circuit 270 and CPU, they are respectively applied to NAND-gate 302 and D-flip flop 303. At this stage, it is assumed that DMA acknowledge and request signals $\overline{DACK1}$ and $\overline{5DREQ}$ to be issued respectively from DMA request circuit 220 and DMA control device 140 are at a high level and also that output signals $\bar{f}_4$ and $\bar{f}_{6a}$ to be issued respectively from PLA circuit 270 and output signal generator 320 are at a high level.

When the output signal $\bar{f}_2$ is applied to NAND-gate 302, as previously described, a high level signal r is produced from NAND-gate 302 so that D-flip flop 303 is responsive to one of the clock signals $\bar{\phi}$ from CPU to produce a high level signal. Then, AND-gate 306 is responsive to the high level signal from D-flip flop 303 under release from reset of D-flip flop 305 to produce a high level signal which is inverted by the inverter 308 into a MULTI-DMA request signal $\overline{MDREQ}$. The MULTI-DMA request signal $\overline{MDREQ}$ from inverter 308 is thereafter produced from AND-gate 309 as a DMA request signal $\overline{DREQ1}$. When a DMA acknowledge signal $\overline{DACK1}$ appears from the DMA control device 140, OR-gate 301 produces a high level signal during generation of the MULTI-DMA request signal $\overline{MDREQ}$ from inverter 308 so that a selection-enable signal $\bar{s}$ is produced from NAND-gate 307 due to the high level signal from AND-gate 306.

When the DMA acknowledge signal $\overline{DACK1}$ from DMA control device 140 rises to a high level, NOR-gate 301 serves to produce a low level signal in response to which a high level signal is produced from NAND-gate 304. Then, D-flip flop 305 is responsive to the high level signal during generation of the high level signal from D-flip flop 303 to produce a low level signal so that the DMA request signal $\overline{DREQ1}$ from AND-gate 309 rises to a high level under control of AND-gate 306 and inverter 308. Simultaneously, the selection-enable signal $\bar{s}$ from NAND-gate 307 rises to a high level under control of AND-gate 306 responsive to the low level signal from D-flip flop 305. In addition, the above-noted low level signal from NOR-gate 301 is maintained until a MULTI-DMA request signal $\overline{MDREQ}$ is again produced from the inverter 308. When a DMA request signal $\overline{5DREQ}$ appears from DMA request circuit 220, it is produced from AND-gate 309 as a DMA request signal $\overline{DREQ1}$. Furthermore, it should be understood that in case each of output signals appear respectively from the PLA circuit 270 and output signal generator 320, the second DMA request circuit 300 also conducts generation of the selection-enable signal $\bar{s}$ and the DMA request signal $\overline{DREQ1}$, as previously described.

Figure 15:
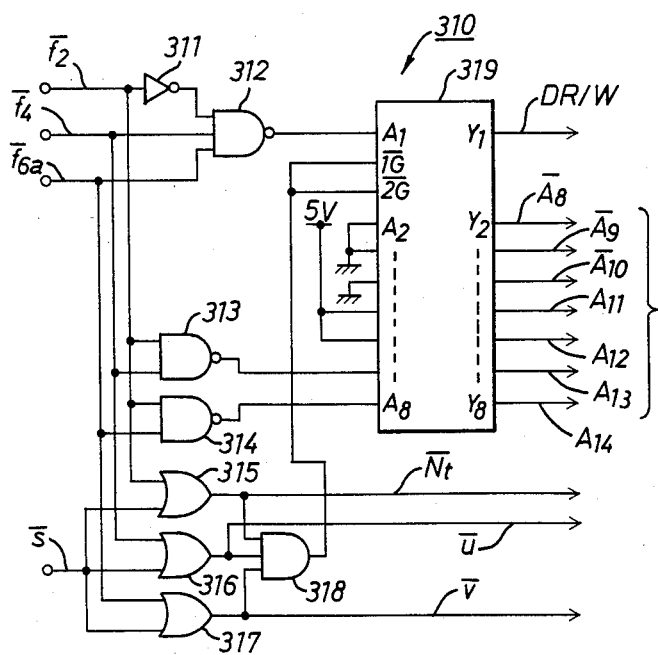
FIG. 15 is a circuit diagram of the second address signal generator shown in block form in FIG. 5.

FIG. 15 illustrates an embodiment of the second address signal generator 310 which includes an inverter 311 and NAND-gates 312, 313 and 314. When the output signal $\bar{f}_2$ from PLA circuit 270 is at a high level, NAND-gate 312 serves to produce a high level signal under control of inverter 311. The high level signal from NAND-gate 312 is also produced in response to one of the output signals $\bar{f}_4$ and $\bar{f}_{6a}$ respectively from PLA circuit 270 and output signal generator 320. The high level signal from NAND-gate 312 drops to a low level when the output signals $\bar{f}_4$ and $\bar{f}_{6a}$ are at a high level during generation of the output signal $\bar{f}_2$. NAND-gate 313 is responsive to one of the output signals $\bar{f}_2$ and $\bar{f}_4$ from PLA circuit 270 to produce a high level signal. The high level signal from NAND-gate 313 drops to a low level when both of the output signals $\bar{f}_2$ and $\bar{f}_4$ rise to a high level. A high level signal is produced from NAND-gate 314 in response to one of the output signals $\bar{f}_2$ and $\bar{f}_{6a}$ respectively from PLA circuit 270 and output signal generator 320. The high level signal from NAND-gate 314 drops to a low level when both the output signals $\bar{f}_2$ and $\bar{f}_{6a}$ rise to a high level.

The address signal generator 310 also includes an AND-gate 318 connected to OR-gates 315, 316 and 317. OR-gate 315 receives the output and selection-enable signals $\bar{f}_2$ and $\bar{s}$ respectively from PLA and second DMA request circuits 270 and 300 to conduct generation of the load signal $\overline{N}_t$. When one of the output and selection-enable signals $\bar{f}_2$ and $\bar{s}$ rises to a high level, the load signal $\overline{N}_t$ rises to a high level. OR-gate 316 is responsive to the output and selection-enable signals $\bar{f}_4$ and $\bar{s}$ respectively from PLA and DMA request circuits 270 and 300 to conduct generation of the load signal $\bar{u}$. The load signal $\bar{u}$ from OR-gate 316 rises to a high level when one of the output and selection-enable signals $\bar{f}_4$ and $\bar{s}$ rises to a high level. OR-gate 317 serves to conduct generation of the load signal $\bar{v}$ in response to the selection-enable and output signals $\bar{s}$ and $\bar{f}_{6a}$ respectively from DMA request circuit 300 and output signal generator 320. The load signal $\bar{v}$ from OR-gate 317 rises to a high level when one of the selection-enable and output signals $\bar{s}$ and $\bar{f}_{6a}$ rises to a high level. Furthermore, a low level signal is produced from AND-gate 318 in response to one of the load signals $\overline{N}_t$, $\bar{u}$ and $\bar{v}$ respectively from OR-gates 315 to 316. The low level signal from AND-gate 318 rises to a high level when all of the load signals $\overline{N}_t$, $\bar{u}$ and $\bar{v}$ rise to a high level respectively.

A three-state noninverted buffer 319 of SN74LS244 type manufactured by TEXAS INSTRUMENTS INCORPORATED is provided with control terminals $1\overline{G}$, $2\overline{G}$ connected to AND-gate 318. The buffer 319 is also provided with input terminals $A_1$, $A_7$ and $A_8$ connected respectively to NAND-gates 312, 313 and 314 and with input terminals $A_2$ to $A_4$ grounded, input terminals $A_5$, $A_6$ of buffer 319 being connected to the five-volt DC power source. The buffer 319 is connected at its output terminal $Y_1$ to the DMA control device 140 and connected at its input terminals $Y_2$ to $Y_8$ to the address bus AB. When the high level signals appear respectively from NAND-gates 312 to 314, the buffer 319 is responsive to the low level signal from AND-gate 318 to conduct generation of the read-enable signal DR/W at its output terminal $Y_1$ and to produce address signals $\overline{A}_8$, $\overline{A}_9$, $\overline{A}_{10}$ and $A_{11}$ to $A_{14}$ respectively at its output terminals $Y_2$ to $Y_8$. The read-enable and address signals DR/W, $A_{13}$ and $A_{14}$ drop to a low level respectively when the high level signals from NAND-gates 312 to 314 drop to a low level. Additionally, a high impedance appears at the output terminals $Y_1$ to $Y_8$ of buffer 319.

When an output signal $\bar{f}_2$ appears from the PLA circuit 270, it is inverted by the inverter 311 and applied to NAND-gate 312 as a high level signal. At this stage, it is assumed that output and selection-enable signals $\bar{f}_4$, and $\bar{f}_{6a}$ and $\bar{s}$ to be issued respectively from the PLA circuit 270, output signal generator 320 and DMA request circuit 300 are at a high level. When a low level signal is produced from NAND-gate 312 in response to the high level signal from inverter 311 while the output signals $\bar{f}_4$, $\bar{f}_{6a}$ are at the high level, it is applied to the input terminal $A_1$ of buffer 319. Low level signals are also produced from NAND-gates 313, 314 in response to the output signal $\bar{f}_2$ from PLA circuit 270 and applied respectively to the input terminals $A_7$, $A_8$ of buffer 319. Furthermore, AND-gate 318 produces a high level signal under control of OR-gates 315 to 317 because the output signals $\bar{f}_4$, $\bar{f}_{6a}$ and the selection-enable signal $\bar{s}$ are at the high level. Thus, the buffer 319 receives the high level signal from AND-gate 318 such that high impedance appears at the output terminals $Y_1$ to $Y_8$ of buffer 319. This disconnects the buffer 319 from the DMA control device 140 and the address bus AB.

When a selection-enable signal $\bar{s}$ appears from the second DMA request circuit 300 at this stage, a load signal $\overline{N}_t$ is produced from OR-gate 315 to make the high level signal from AND-gate 318 a low level signal. Then, the buffer 319 is responsive to the low level signal from AND-gate 318 to produce a write-enable signal $\overline{DR/W}$ at its output terminal $Y_1$ and also to produce address signals $\overline{A}_8$, $\overline{A}_9$, $\overline{A}_{10}$ and $A_{11}$ to $A_{14}$ respectively at its output terminals $Y_2$ to $Y_8$. The address signals $\overline{A}_8$ to $\overline{A}_9$ and $A_{11}$ to $A_{14}$ define a binary signal for specifying the address $EO_{16}$ of RAM. Thereafter, the selection-enable and output signals $\bar{s}$ and $\bar{f}_2$ rise sequentially to a high level.

When an output signal $\bar{f}_4$ appears from the PLA circuit 270, high level signals are produced respectively from NAND-gates 312, 313 and applied to the input terminals $A_1$, $A_7$ of buffer 319. At this stage, a low level signal appearing from NAND-gate 314 is applied to the input terminal $A_8$ of buffer 319, and a high level signal is produced from AND-gate 318 under control of OR-gates 315 to 316 to cause appearance of high impedance at the output terminals $Y_1$ to $Y_8$ of buffer 319. When a selection-enable signal $\bar{s}$ appears from the DMA request circuit 300, a load signal $\bar{u}$ is produced from OR-gate 316 during generation of the output signal $\bar{f}_4$ to make the high level signal from AND-gate 318 a low level signal. Thus, a read-enable signal DR/W is produced from the output terminal $Y_1$ of buffer 319 in response to the low level signal from AND-gate 318, and simultaneously address signals $\overline{A}_8$, $\overline{A}_9$, $\overline{A}_{10}$, $A_{11}$, $A_{12}$, $A_{13}$ and $A_{14}$ are produced respectively from the output terminals $Y_2$ to $Y_8$ of buffer 319 to define a binary signal for specifying the address $E2_{16}$ of RAM. Thereafter, the selection-enable and output signals $\bar{s}$ and $\bar{f}_4$ rise sequentially to a high level.

When an output signal $\bar{f}_{6a}$ appears from the output signal generator 320, high level signals are produced respectively from NAND-gates 312, 314 and applied to the input terminals $A_1$, $A_8$ of buffer 319. At this stage, a low level signal appearing from NAND-gate 313 is applied to the input terminal $A_7$ of buffer 319, and a high level signal is produced from AND-gate 318, as previously described, to cause appearance of high impedance at the output terminals $Y_1$ to $Y_8$ of buffer 319. When a selection-enable signal $\bar{s}$ appears from the DMA request circuit 300, a load signal $\bar{v}$ is produced from OR-gate 317 during generation of the output signal $\bar{f}_{6a}$ to make the high level signal from AND-gate 318 a low level signal. Thus, a read-enable signal DR/W is produced from the output terminal $Y_1$ of buffer 319 in response to the low level signal from AND-gate 318, and simultaneously address signals $\overline{A}_8$ to $\overline{A}_{10}$, $A_{11}$, $A_{12}$, $\overline{A}_{13}$ and $A_{14}$ are produced respectively from the output terminals $Y_2$ to $Y_8$ of buffer 319 to define a binary signal for specifying the address $E4_{16}$ of RAM.

Figure 16:
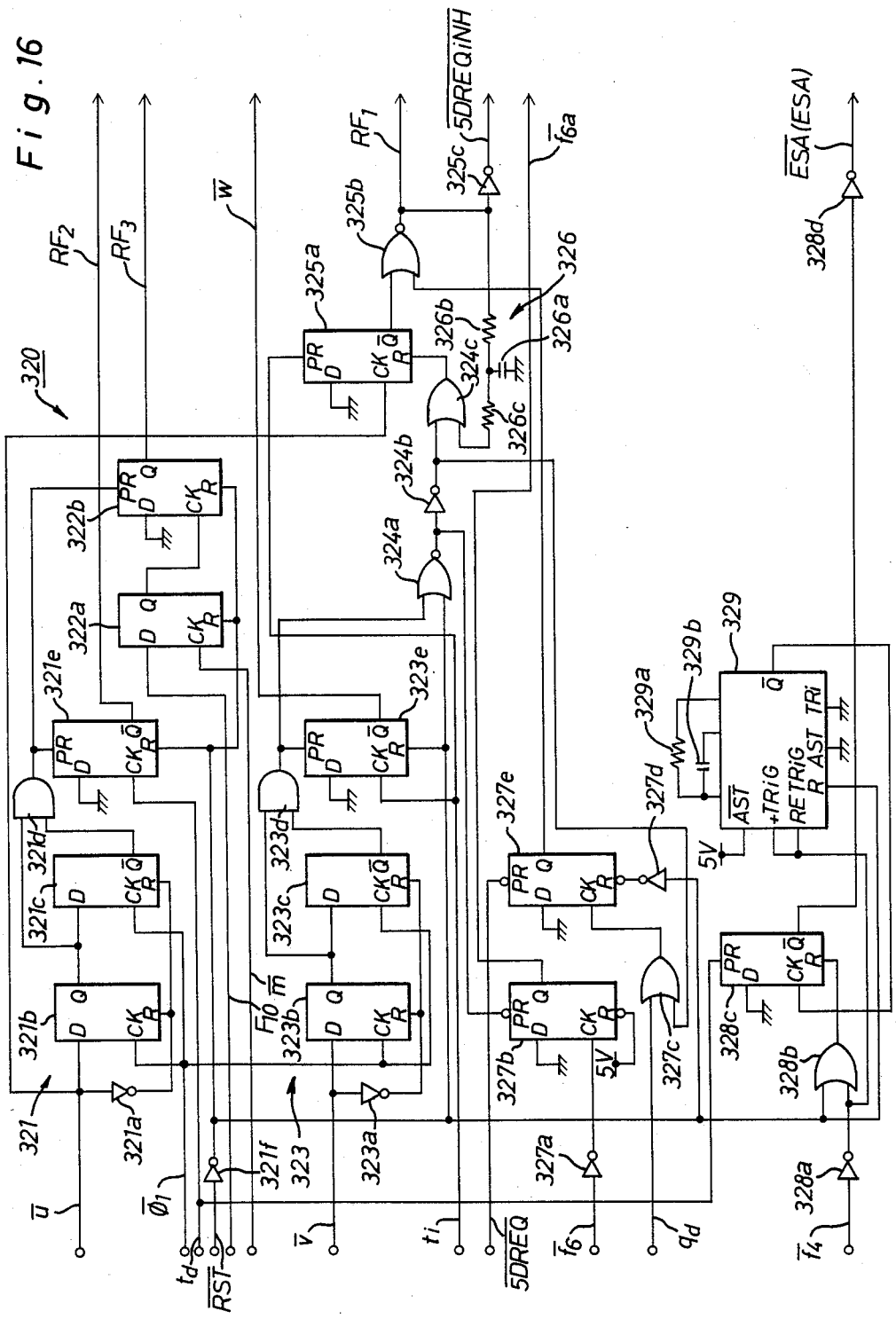
FIG. 16 is a circuit diagram of the output signal generator illustrated in block form in FIG. 5.

FIG. 16 illustrates an embodiment of the output signal generator 320 which comprises an inverter 321a connected to the address signal generator 310, a synchronous differentiator 321, having D-flip flops 321b, 321c and an AND-gate 321d, connected to the inverter 321a and pulse signal generator 290, and a D-flip flop 321e connected to the differentiator 321 and third count circuit 360. When D-flip flops 321b and 321c of differentiator 321 are reset by the inverter 321a in response to the load signal $\bar{u}$ from address signal generator 310, they serve to produce low and high level signals respectively at their output terminals Q and $\overline{Q}$. When the load signal $\bar{u}$ rises to a high level, D-flip flop 321b produces a high level signal at its output terminal Q at the trailing edge of one of the pulse signals $\bar{\phi}_1$ from pulse signal generator 290. D-flip flop 321c receives the low or high level signal from D-flip flop 321b to produce a high or low level signal at its output terminal $\overline{Q}$ at the trailing edge of one of the pulse signals $\bar{\phi}_1$.

AND-gate 321d is responsive to one of the low level signals from D-flip flops 321b, 321c to produce a low level signal. The low level signal from AND-gate 321d rises instantaneously to a high level in response to the high level signals from D-flip flops 321b, 321c. D-flip flop 321e is reset by an inverter 321f in response to the reset signal $\overline{RST}$ from CPU to produce a high level signal at its output terminal $\overline{Q}$. Upon receipt of the high level signal from AND-gate 321d at its preset terminal PR, D-flip flop 321e makes the high level signal therefrom a low level signal. D-flip flop 321e is also responsive to the high level signal $t_d$ from third count circuit 360 to produce a high level signal at its output terminal $\overline{Q}$ as the flag signal $RF_2$.

The output signal generator 320 also comprises a D-flip flop 322b connected through a D-flip flop 322a to the latch circuit 250 and pulse signal control circuit 280, a synchronous differentiator 323 through an inverter 323a to the address signal generator 310, and a D-flip flop 323e connected to the differentiator 323 and second count circuit 350. D-flip flops 322a, 322b are reset by the inverter 321f in response to the reset signal $\overline{RST}$ from CPU to produce low level signals respectively at their output terminals Q. D-flip flop 322a receives the flag signal $F_{10}$ or $\overline{F}_{10}$ from latch circuit 250 at the trailing edge of the latch signal $\overline{m}$ from pulse signal control circuit 280 to produce a high or low level signal at its output terminal Q. Upon receipt of the high level signal from AND-gate 321d at its preset terminal PR, D-flip flop 322b serves to produce a high level signal as the flag signal $RF_3$ at its output terminal Q. D-flip flop 322b is also responsive to the leading edge of the high level signal from D-flip flop 322a to produce a low level signal at its output terminal Q. In addition, D-flip flop 322b is grounded at its input terminal D.

The synchronous differentiator 323 is formed by a pair of D-flip flops 323b, 323c and an AND-gate 323d. D-flip flops 323b, 323c are reset by the inverter 323a in response to the load signal $\overline{v}$ from address signal generator 310 to produce low and high level signals respectively at their output terminals Q and $\overline{Q}$. D-flip flop 323b receives the load signal $\overline{v}$ from address signal generator 310 at the trailing edge of one of the pulse signals $\overline{\phi}_1$ to produce a low level signal at its output terminal Q. When the load signal $\overline{v}$ rises to a high level, the low level signal from D-flip flop 323b rises to a high level in response to the trailing edge of one of the pulse signals $\overline{\phi}_1$. Upon receipt of the high or low level signal from D-flip flop 323b, D-flip flop 323c serves to produce a low or high level signal at its output terminal $\overline{Q}$ at the trailing edge of one of the pulse signals $\overline{\phi}_1$.

AND-gate 323d is responsive to one of the low level signals from D-flip flops 323b, 323c to produce a low level signal. The low level signal from AND-gate 323d rises instantaneously to a high level in response to the high level signals from D-flip flops 323b, 323c. D-flip flop 323e is reset by the inverter 321f in response to the reset signal $\overline{RST}$ from CPU to produce a high level signal w at its output terminal $\overline{Q}$. Generation of the low level signal $\overline{w}$ is conducted from the output terminal $\overline{Q}$ of D-flip flop 323e in response to the high level signal from AND-gate 323d. D-flip flop 323e is also responsive to the high level signal $t_i$ from second count circuit 350 to conduct generation of the high level signal w at its output terminal $\overline{Q}$. In addition, D-flip flop 323e is grounded at its input terminal D.

Furthermore, the output signal generator 320 comprises a D-flip flop 327b connected through an OR-gate 324a to the inverter 321f and AND-gate 323d, and a D-flip flop 327e connected to NOR-gate 324a through an OR-gate 327c and an inverter 324b. D-flip flop 327b serves to conduct generation of the output signal $\bar{f}_{6a}$ at its output terminal Q under control of the inverter 327a responsive to the leading edge of the output signal $\bar{f}_6$ from PLA circuit 270. When NOR-gate 324a produces a low level signal in response to one of the high level signals from inverter 321f and AND-gate 323d, D-flip flop 327b receives the low level signal from NOR-gate 324a at its preset terminal PR to make the output signal $\bar{f}_{6a}$ a high level signal. In addition, D-flip flop 327b is grounded at its input terminal D and connected at its reset terminal R to the five-volt DC power source.

D-flip flop 327e is reset by the reset signal $\overline{RST}$ through inverters 321f, 327d from CPU to produce a low level signal at its output terminal Q. Upon receiving the DMA request signal $\overline{5DREQ}$ from first DMA request circuit 220 at its preset terminal PR, D-flip flop 327e serves to produce a high level signal at its output terminal Q. D-flip flop 327e is also responsive to the leading edge of the output signal $q_d$ through an OR-gate 327c from control counter 260 to generate a low level signal at its output terminal Q. Generation of the low level signal from D-flip flop 327e is further conducted in response to the leading edge of one of the high level signals from inverter 321f and AND-gate 323d through NOR-gate 324a, inverter 324b and OR-gate 327c. Additionally, D-flip flop 327e is grounded at its input terminal D.

A D-flip flop 325a is reset in response to one of the high level signals from inverter 321f and AND-gate 323d through NOR-gate 324a, inverter 324b and OR-gate 324c to generate a high level signal at its output terminal $\overline{Q}$. D-flip flop 325a is also reset upon receipt of a high level signal from a time constant circuit 326 through a resistor 326c and OR-gate 324c to conduct generation of the high level signal at its output terminal $\overline{Q}$. Upon receiving the high level signal $t_i$ from second count circuit 350 at its preset terminal PR, D-flip flop 325a serves to produce a low level signal at its output terminal $\overline{Q}$. The low level signal from D-flip flop 325a rises to a high level in response to the trailing edge of the load signal $\overline{u}$ from address signal generator 310. In addition, D-flip flop 325a is grounded at its input terminal D.

A NOR-gate 325b is responsive to the low level signals from D-flip flops 325a, 327e to produce a high level signal as the flag signal $RF_1$. The frag signal $RF_1$ from NOR-gate 325b drops to a low level in response to one of the high level signals from D-flip flops 325a, 327e. The time constant circuit 326 includes a capacitor 326a and a resistor 326b to form a predetermined time constant and is responsive to the high level signal from NOR-gate 325b to produce the same with time delay defined by the time constant. An inverter 325c serves to produce a low level signal as the DMA request prohibition signal $\overline{5DREQiNH}$ in response to the flag signal $RF_1$ from NOR-gate 325b. The prohibition signal $\overline{5DREQiNH}$ from inverter 325c rises to a high level in response to the low level signal from NOR-gate 325b. In addition, the resistor 326c acts a role for protection of OR-gate 324c.

A D-flip flop 328c is reset under control of OR-gate 328b and an inverter 328a responsive to the output signal $\bar{f}_4$ from PLA circuit 270 to produce a high level signal at its output terminal $\overline{Q}$. The reset of D-flip flop 328e is also conducted under control of OR-gate 328b and inverter 321f responsive to the reset signal $\overline{RST}$ from CPU. Upon receipt of the high level signal $t_d$ from third count circuit 360 at its preset terminal PR, D-flip flop 328c serves to produce a low level signal at its output terminal $\overline{Q}$. The low level signal from D-flip flop 328c rises to a high level in response to the leading edge of a high level signal from a monostable multivibrator 329 because an input terminal D of D-flip flop 328c is grounded. An inverter 328d receives the low level signal from D-flip flop 328c to produce a high level signal ESA indicative of start timing for energization of the ignition coil as the above-noted first output signal. The inverter 328d is also responsive to the high level signal from D-flip flop 328c to produce a low level signal $\overline{ESA}$ indicative of deenergization timing of the ignition coil as the above-noted second output signal.

The monostable multivibrator 329 is reset under control of inverter 321f responsive to the reset signal $\overline{RST}$ from CPU to produce a high level signal at its output terminal $\overline{Q}$. When the output signal $\bar{f}_4$ from PLA circuit 270 is inverted by the inverter 328a into a high level signal, the multivibrator 329 receives the high level signal from inverter 328a at its input terminals +TRiG, RETRiG to produce a low level signal at its output terminal $\overline{Q}$. When the output signal $\bar{f}_4$ rises to a high level, the multivibrator 329 produces a high level signal at its output terminal $\overline{Q}$ under control of inverter 328a with time delay defined by a predetermined time constant of a time constant circuit having a resistor 329a and a capacitor 329b. In the embodiment, a TC4013B type D-flip flop manufactured by TOKYO SHIBAURA DENKI K.K. is used as each of D-flip flops 321b, 321c, 321e, 322a, 322b, 323b, 323c, 323e, 325a, and 328c. An SN74LS74 type D-flip flop manufactured by TEXAS INSTRUMENTS INCORPORATED is also used as each of D-flip flops 327b, 327e and a TC4047 type multivibrator manufactured by TOKYO SHIBAURA DENKI K.K. is used as the monostable multivibrator 329. Additionally, the resistor 329a of multivibrator 329 has a resistance value of one hundred kiroohms, and the capacitor 329b has a capacitance value of ten microfarads.

When DMA request and pulse signals $\overline{5DREQ}$ and $\bar{\phi}_1$ appear respectively from the first DMA request circuit 220 and pulse signal generator 290 after reset of the output signal generator 320, D-flip flop 327e is responsive to the DMA request signal $\overline{5DREQ}$ from DMA request circuit 220 to produce a high level signal upon receipt of which NOR-gate 325b produces a low level signal $\overline{RF}_1$. At this stage, a DMA request prohibition signal $\overline{5DREQiNH}$ to be issued from the inverter 325c is at a high level due to the low level signal $\overline{RF}_1$. When flag and latch signals $F_{10}$ and $\overline{m}$ respectively from latch and pulse signal control circuits 250 and 280 after the DMA request signal $\overline{5DREQ}$ from DMA request circuit 200 has risen to a high level, D-flip flop 322b cooperates with D-flip flop 322a to produce a low level signal $\overline{RF}_3$.

When an output signal $\bar{f}_6$ appears from the PLA circuit 270, an output signal $\bar{f}_{6a}$ is produced from D-flip flop 327b under control of the inverter 327a. When a load signal $\bar{v}$ also appears from the second address signal generator 310, the synchronous differentiator 323 produces a high level signal in response to pulse signals $\bar{\phi}_1$ from pulse signal generator 290 so that a low level signal $\bar{w}$ is generated from D-flip flop 323e. The output signal $\bar{f}_{6a}$ from D-flip flop 327b also rises to a high level under control of NOR-gate 324a responsive to the high level signal from differentiator 323, and a low level signal is generated from D-flip flop 327e under control of OR-gate 327c, inverter 324b and NOR-gate 324a responsive to the high level signal from differentiator 323. At this stage, reset condition of D-flip flop 325a is maintained by the high level signal through OR-gate 324c, inverter 324b and NOR-gate 324a from the differentiator 323 to generate a low level signal $\overline{RF}_1$ from NOR-gate 325b.

When a high level signal $t_i$ appears from the second count circuit 350, the low level signal $\bar{w}$ from D-flip flop 322e rises to a high level, and simultaneously the high level signal from D-flip flop 325a drops to a low level to make the low level signal from NOR-gate 325b a flag signal $RF_1$ during generation of the low level signal from D-flip flop 327e. Then, the flag signal $RF_1$ from NOR-gate 325b is inverted by the inverter 325c into a DMA request prohibition signal $\overline{5DREQiNH}$ and is also delayed and produced by the time constant circuit 326 with the predetermined time constant as a high level signal. Thus, NOR-gate 325b cooperates with D-flip flop 325a in response to the high level signal through OR-gate 324c and resistor 326c from time constant circuit 326 to make the flag signal $RF_1$ a low level signal and also to make the DMA request prohibition signal $\overline{5DREQiNH}$ a high level signal.

When an output signal $\bar{f}_4$ appears from the PLA circuit 270, it is inverted by the inverter 328a into a high level signal in response to which a low level signal is generated from the monostable multivibrator 329. D-flip flop 328c is also responsive to the high level signal through OR-gate 328b from the inverter 328a to maintain reset condition thereof so that a low level signal is produced from the inverter 328d as a second output signal $\overline{ESA}$. When a load signal $\bar{u}$ appears from the address signal generator 310, a high level signal is produced from the synchronous differentiator 321 in response to pulse signals $\bar{\phi}_1$ from pulse signal generator 290 and applied to D-flip flops 321e, 322b. Thus, D-flip flop 321e serves to produce a low level signal $\overline{RF}_2$ in response to the high level signal from differentiator 321, and simultameously D-flip flop 322b produces a flag signal $RF_3$.

When a high level signal $t_d$ appears from the third count circuit 360, D-flip flop 328c produces a low level signal in response to which a first output signal ESA is generated from the inverter 328d. D-flip flop 321e is also responsive to the high level signal $t_d$ from count circuit 360 to produce a flag signal $RF_2$. Additionally, in case D-flip flop 327e receives an output signal $g_d$ from control counter 260 through OR-gate 327c, it produces a low level signal to permit generation of a flag signal $RF_1$ from NOR-gate 325b when a low level signal appears from D-flip flop 325a.

Figure 17:
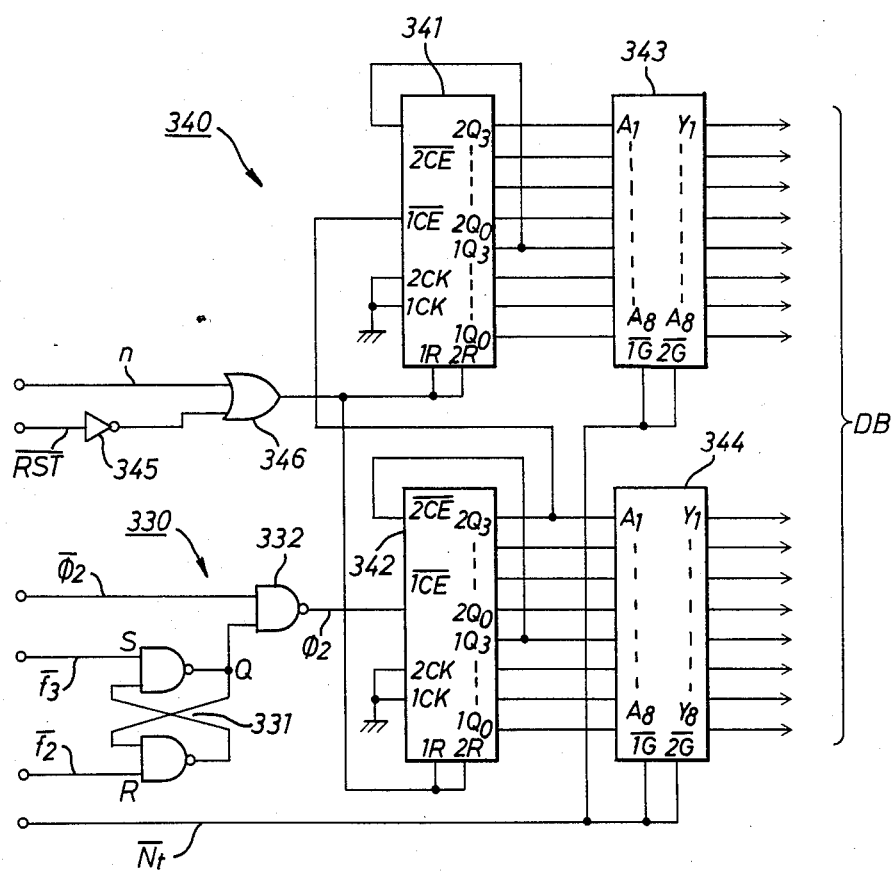
FIG. 17 illustrates circuit diagrams of the pulse signal control circuit and first count circuit shown in block form in FIG. 5.

FIG. 17 illustrates respective embodiments of the pulse signal control and first count circuits 330 and 340. The pulse signal control circuit 330 is provided with an RS-flip flop 331 connected to the PLA circuit 270 and with a NAND-gate 332 connected to the pulse signal generator 290 and RS-flip flop 331. RS-flip flop 331 serves to produce a high level signal at its output terminal Q in response to the output signal $\bar{f}_3$ from PLA ciucuit 270. The high level signal from RS-flip flop 331 drops to a low level in response to the output signal $\bar{f}_2$ from PLA circuit 270. NAND-gate 332 receives a series of the pulse signals $\bar{\phi}_2$ from pulse signal generator 290 during generation of the high level signal from RS-flip flop 331 to generate a series of the pulse signals $\phi_2$. Generation of the pulse signals $\phi_2$ from NAND-gate 332 is inhibited by the low level signal from RS-flip flop 331.

The first count 340 comprises a pair of eight-bit counters 341, 342 connected to CPU and the pulse signal control circuit 280 through an inverter 345 and an OR-gate 346. Upon receipt of the output signal n from pulse signal control circuit 280 through OR-gate 346, each of the counters 341, 342 is reset to produce a low level signal at its output terminals $1Q_0$ to $2Q_3$. The reset of each of counters 341, 342 is also conducted under control of OR-gate 346 when the reset signal $\overline{RST}$ from CPU is inverted by the inverter 345. After this reset condition, the counter 341 cooperates with the counter 342 to count a series of the pulse signals $\phi_2$ from NAND-gate 332 such that output signals defined by the counted pulse signals $\phi_2$ are generated as a binary signal at the output terminals $1Q_0$ to $2Q_3$ of each counter 341, 342.

A pair of three-state inverted buffers 343 and 344 receive the load signal $\overline{N}_t$ from address signal generator 310 at their control terminals $1\overline{G}$, $2\overline{G}$ such that they invert the binary signal from counters 341, 342 and produce a binary signal indicative of rotative time of the crankshaft 13 at their output terminals $Y_1$ to $Y_8$. When the load signal $\overline{N}_t$ rises to a high level, high impedance appears at the output terminals of buffers 343, 344 to disconnect the buffers 343, 344 from the data bus DB. In the embodiment, a TC4520B type counter manufactured by TOKYO SHIBAURA DENKI KABUSHIKI KAISHA is used as each of the counters 341, 342, and an SN74LS240 type three-state inverted buffer manufactured by TEXAS INSTRUMENTS INCORPORATED is used as each of the buffers 343, 344.

In operation of the first count circuit 340 relative to the pulse signal control circuit 330, assuming that output and pulse signals $\bar{f}_3$ and $\overline{\phi}_2$ appear respectively from the PLA circuit 270 and pulse signal generator 290 after reset of the counters 341, 342 responsive to a reset signal $\overline{RST}$ from CPU, NAND-gate 332 cooperates with RS-flip flop 331 in response to the output signal $\bar{f}_3$ to produce a series of pulse signals $\phi_2$. Then, the pulse signals $\phi_2$ from NAND-gate 332 are counted by the counters 341, 342 and produced as a binary signal indicative of the counted pulse signals $\phi_2$ which is applied to the buffers 343, 344.

When the output signal $\bar{f}_3$ rises to a high level and an output signal $\bar{f}_2$ appears from the PLA circuit 270, RS-flip flop 331 produces a low level signal to inhibit generation of the pulse signals $\phi_2$ from NAND-gate 332. This means that the counted value of the binary signal from counters 341, 342 is defined by the number of the pulse signals $\phi_2$ issued from NAND-gate 332 within a time interval between the output signals $\bar{f}_2$ and $\bar{f}_3$. When a load signal $\overline{N}_t$ appears from the address signal generator 310, the binary signal from counters 341, 342 is inverted by the buffers 343, 344 and produced as a binary signal indicative of rotative time of the crankshaft 13 and, in turn, applied to the data bus DB. When an output signal n appears from the pulse signal control circuit 280, each of counters 341, 342 is reset under control of OR-gate 346 to produce low level signals.

Figure 18:
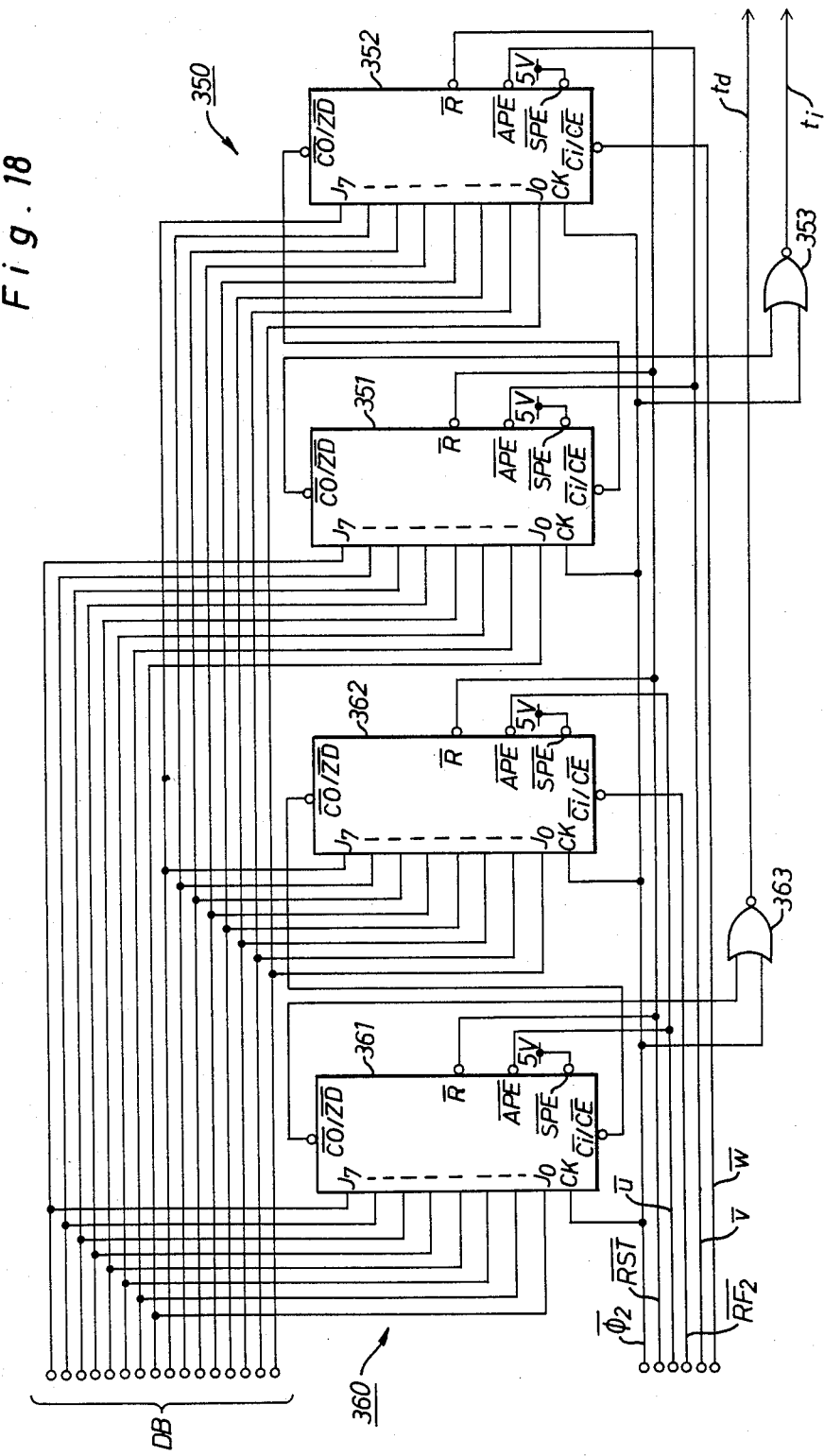
FIG. 18 shows circuit diagrams of the second and third count circuits illustrated in block form in FIG. 5.

In FIG. 18, there are illustrated respective embodiments of the second and third circuits 350 and 360. The second count circuit 350 includes a pair of eight-bit presettable down counters 351, 352 and a NOR-gate 353. Each of the down counters 351, 352 is provided with input terminals $J_0$ and $J_7$ connected to the data bus DB and with an input terminal CK connected to the pulse signal generator 290. Each of the down counters 351, 352 is also provided with a reset terminal $\overline{R}$ connected to CPU and with a terminal $\overline{APE}$ connected to the address signal generator 310. The counter 352 is provided with a terminal $\overline{Ci/CE}$ connected to the output signal generator 320, whereas the counter 351 is provided with a terminal $\overline{Ci/CE}$ connected to an output terminal $\overline{CO/ZD}$ of counter 352.

Upon receipt of the low level signal $\bar{w}$ from output signal generator 320 after reset by the reset signal $\overline{RST}$ from CPU, the counter 352 is cooperable with the counter 351 in accordance with the pulse signals $\bar{\phi}_2$ from pulse signal generator 290 to initiate counting-down of the calculated time value for determination of the ignition timing defined by the binary signal from RAM. At this stage, a high level signal is produced from an output terminal $\overline{CO/ZD}$ of counter 351 such that NOR-gate 353 generates a low level signal. When the high level signal from counter 351 drops to a low level upon completion of counting-down in counters 351, 352, NOR-gate 353 serves to instantaneously conduct generation of the high level signal $t_i$ in synchronization with the pulse signals $\bar{\phi}_2$. In addition, counting-down of each of counters 351, 352 is inhibited when the low level signal $\bar{w}$ rises to a high level.

The third count circuit 360 includes a pair of eight-bit presettable down counters 361 and 362 and a NOR-gate 363. Each of the down counters 361, 362 is provided with input terminals $J_0$ to $J_7$ connected to the data bus DB and with an input terminal CK connected to the pulse signal generator 290. Each of the counters 361, 362 is also provided with a reset terminal $\overline{R}$ connected to CPU and with a terminal $\overline{APE}$ connected to the address signal generator 310. The counter 362 is provided with a terminal $\overline{Ci/CE}$ connected to the output signal generator 320, whereas the counter 361 is provided with a terminal $\overline{Ci/CE}$ connected to an output terminal $\overline{CO/ZD}$ of the counter 362.

Upon receipt of the low level signal $\overline{RF_2}$ from output signal generator 320 after reset by the reset signal $\overline{RST}$ from CPU, the counter 362 is cooperable with the counter 361 in accordance with the pulse signals $\bar{\phi}_2$ from pulse signal generator 290 to initiate counting-down of the calculated deenergization time value of the ignition coil defined by the binary signal from RAM. At this stage, a high level signal is produced from an output terminal $\overline{CO/ZD}$ of counter 361 such that NOR-gate 363 generates a low level signal. When the high level signal from the counter 361 drops to a low level upon completion of counting-down in counters 361, 362, NOR-gate 363 serves to instantaneously conduct generation of the high level signal $t_d$ in synchronization with the pulse signals $\bar{\phi}_2$. Additionally, counting-down of each of the counters 361, 362 is inhibited when the low level signal $\overline{RF_2}$ rises to a high level. In the embodiments, a presettable down counter of CD40103B type manufactured by RCA CORPORATION in U.S.A. is used as each of the counters 351, 352, 361 and 362.

Figure 19:
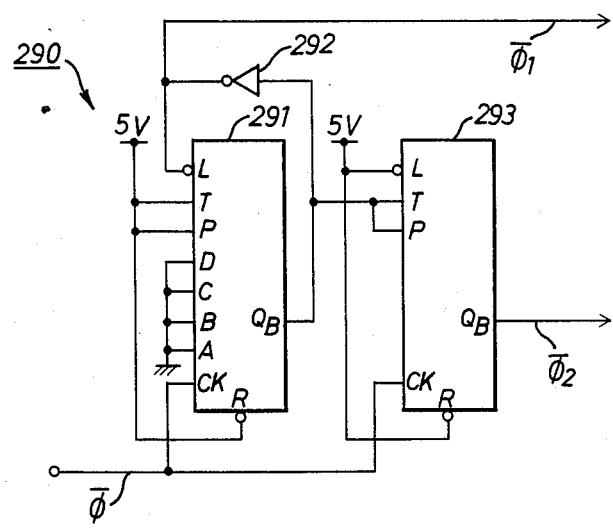
FIG. 19 is a circuit diagram of the pulse signal generator shown in block form in FIG. 5.

FIG. 19 illustrates an embodiment of the pulse signal generator 290 in which a synchronous four-bit counter 291 counts a series of the clock signals $\bar{\phi}$ from CPU to produce a series of pulse signals at its output terminal $Q_B$. The pulse signals from counter 291 is inverted by an inverter 292 into the pulse signals $\bar{\phi}_1$. A synchronous four-bit counter 293 is responsive to each of the pulse signals from counter 291 to count a series of the pulse signals $\bar{\phi}$ so as to produce a series of the pulse signals $\bar{\phi}_2$. In the embodiment, the pulse signals $\bar{\phi}_1$ and $\bar{\phi}_2$ have respectively one (MHz) and two hundred and fifty (Hz) because the clock signal $\bar{\phi}$ has three (MHz).

OPERATION

When an ignition switch (not shown) for the vehicle is actuated, the ignition control apparatus 100 receives the DC voltage +B from the DC power supply 50 to be ready for its operation, and the internal combustion engine 10 is responsive to the DC voltage from DC power supply 50 to be conditioned in cranking. When a reset $\overline{RST}$ signal and a series of clock signals $\overline{\phi}$ appear from CPU, each of the interrupt and DMA control devices 120, 140 is reset by the reset signal $\overline{RST}$ to receive a series of the clock signals $\overline{\phi}$, and the A-D converter 130 serves to receive a series of the clock signals $\overline{\phi}$ from CPU. When the reset and clock signals $\overline{RST}$ and $\overline{\phi}$ from CPU are applied to I/O, the signal generator 210 and pulse signal control circuit 280 are reset by the reset signal $\overline{RST}$ to receive the clock signals $\overline{\phi}$, the first and second DMA request circuits 220, 300 receive the clock signals $\overline{\phi}$, and the output signal generator 320 and the count circuits 340, 350, 360 are reset by the reset signal $\overline{RST}$. The pulse signal generator 290 also receives a series of the clock signals $\overline{\phi}$ to produce each series of pulse signals $\overline{\phi}_1$ and $\overline{\phi}_2$. Then, the pulse signals $\overline{\phi}_1$ are applied to the pulse signal control circuit 280 and output signal generator 320, whereas the pulse signals $\overline{\phi}_2$ are applied to the pulse signal control circuit 330 and the count circuits 350, 360.

Furthermore, the initial ignition spark advance angle value and the initial deenergization time value of the ignition coil are read out by CPU from ROM and temporarily stored respectively at the addresses $E4_{16}$ and $E2_{16}$ of RAM. At the same time, the binary signals $D_9$, $D_{10}$, $D_{11}$, $D_{12}$ and $D_{15}$ are inverted and read out by CPU from ROM and applied to RAM. Then, each of the inverted binary signals $\overline{D}_9$, $\overline{D}_{11}$ are inverted and stored at the addresses $200_{16}$, $230_{16}$ and $260_{16}$ of RAM, the inverted binary signal $\overline{D}_{10}$ is inverted and stored at the addresses $218_{16}$ to $22E_{16}$, $248_{16}$ to $25E_{16}$ and $278_{16}$ to $28E_{16}$ of RAM, and each of the inverted binary signals $\overline{D}_{12}$, $\overline{D}_{15}$ is also inverted and stored at the addresses $20C_{16}$, $23C_{16}$ and $26C_{16}$ of RAM (see FIG. 20). Additionally, the binary signals $D_9$ to $D_{15}$ are stored at the remaining addresses of RAM as low level signals respectively.

Assuming that the crank-angle of crankshaft 13 reaches the zero-degree during cranking of engine 10, first and second detection signals are produced from the signal detector 80 and reshaped by the wave shaper 110 into reference and angular signals a and b which are respectively applied to I/O. An amount of the sucked air is also detected by the air flow meter 70 as an analog signal, and the DC voltage from the DC power supply 50 is detected by the potentiometer 90 as an analog signal.

When the analog signals from the air flow meter 70 and potentiometer 90 are applied to the A-D converter 130, they are sequentially converted by the A-D converter 130 respectively into binary signals at the predetermined time interval. Upon repetitively completing the conversion, the A-D converter 130 serves to produce a DMA request signal DREQ2 in response to which the DMA control device 140 produces a hold request signal $\overline{HOLD}$ so that CPU generates a hold acknowledge signal $\overline{HOLDA}$ to cause high impedance at the address, control and data buses AB, $CB_1$ and DB. When the DMA control device 140 is responsive to the hold acknowledge signal $\overline{HOLDA}$ from CPU to produce DMA acknowledge, memory-enable and data-bus input signals $\overline{DACK2}$, $\overline{MEMEN}$ and $\overline{DBiN}$, the DMA acknowledge signal $\overline{DACK2}$ is applied to the A-D converter 130, and the memory-enable and data-bus input signals $\overline{MEMEN}$ and $\overline{DBiN}$ are applied to the control bus $CB_1$. Then, the A-D converter 130 is responsive to the DMA acknowledge signal $\overline{DACK2}$ to produce a write-enable signal $\overline{DR/W}$ upon receipt of which the DMA control device 140 produces a write-enable signal $\overline{WE}$ to apply the same to the control bus $CB_1$ and to make the data-bus input signal $\overline{DBiN}$ a high level signal. Thus, each of the binary signals from A-D converter 130 is applied and stored by the DMA control device 140 in RAM.

When the reference signal a and a series of the angular signals b from wave shaper 110 are applied to I/O, as previously described, the signal generator 210 serves to produce reset and first pulse signals $\overline{c}$ and $\overline{d}$ in accordance with a series of the pulse signals $\overline{\phi}$ from CPU. Then, the reset signal $\overline{c}$ is applied to the crank-angle count circuit 230, whereas the first pulse signal $\overline{d}$ is applied to the first DMA request and crank-angle count circuits 220, 230. Subsequently, the crank-angle count circuit 230 is reset by the reset signal $\overline{c}$ and produces a binary signal in response to the first pulse signal $\overline{d}$ to apply the same to the first address signal generator 240. Furthermore, a DMA request signal $\overline{5DREQ}$ is produced from the first DMA request circuit 220 in accordance with the pulse and clock signals $\overline{d}$ and $\overline{\phi}$ respectively from signal generator 210 and CPU and is applied to the second DMA circuit 300, control counter 260, output signal generator 320 and pulse signal control circuit 280. At this stage, a DMA acknowledge signal $\overline{DACK1}$ to be issued from the DMA control device 140 is at a high level to maintain a low level signal $\overline{l}$ from DMA request circuit 220 in a high level. A DMA request prohibition signal $\overline{5DREQiNH}$ to be issued from output signal generator 320 is at a high level.

When the second DMA request circuit 300 receives the DMA request signal $\overline{5DREQ}$ from first DMA request circuit 220, as previously described, it serves to produce a DMA request signal $\overline{DREQ1}$ upon receipt of which the DMA control device 140 produces a hold request signal $\overline{HOLD}$ in accordance with a series of the clock signals $\overline{\phi}$ from CPU such that CPU generates a hole acknowledge signal $\overline{HOLDA}$ to cause high impedance at the data, address and control buses DB, AB and $CB_1$. At this stage, high and selection-enable signals r and $\overline{s}$ to be issued from the DMA request circuit 300 are respectively at low and high levels because output signals $\overline{f}_2$, $\overline{f}_4$, $\overline{f}_6$, $\overline{f}_{6a}$ and a DMA acknowledge signal $\overline{DACK1}$ to be respectively issued from the PLA circuit 270, output signal generator 320 and DMA control device 140 are at a high level.

When the DMA control device 140 is responsive to the hold acknowledge signal $\overline{HOLDA}$ from CPU to produce DMA acknowledge, memory-enable and data-bus input signals $\overline{DACK1}$, $\overline{MEMEN}$ and $\overline{DBiN}$, the DMA acknowledge signal $\overline{DACK1}$ is applied to the first and second DMA request circuits 220, 300, and the memory-enable and data-bus input signals $\overline{MEMEN}$ and $\overline{DBiN}$ are applied to the control bus $CB_1$. At this stage, write-enable and DMA acknowledge signals $\overline{WE}$ and $\overline{DACK2}$ to be issued from the DMA control device 140 are at a high level. Then, the DMA request circuit 220 is responsive to the DMA acknowledge signal $\overline{DACK1}$ to produce a low level signal $\overline{l}$ in response to which the address signal generator 240 applies the binary signal from crankangle count circuit 230 to RAM through the address bus AB as a binary address signal indicative of the address $200_{16}$ of RAM and also to produce read-enable and latch signals DR/W and 1 to be respectively applied to the DMA control device 140 and the latch circuit 250. Additionally, the selection-enable signal $\bar{s}$ from DMA request circuit 300 is still maintained in a high level.

When the read-enable signal DR/W, the latch signal l and the binary address signal indicative of the address $200_{16}$ of RAM are respectively applied to the DMA control device 140, the latch circuit 250 and RAM, as previously described, a plurality of the binary signals $D_9$, $\bar{D}_{10}$, $D_{11}$, $\bar{D}_{12}$, $\bar{D}_{13}$, $\bar{D}_{14}$ and $\bar{D}_{15}$ (see FIG. 20) are inverted and read out from the address $200_{16}$ of RAM and, in turn, latched by the latch circuit 250 in response to the latch signal l as a plurality of flag signals $F_9$, $\bar{F}_{10}$, $F_{11}$, $\bar{F}_{12}$, $\bar{F}_{13}$, $\bar{F}_{14}$ and $\bar{F}_{15}$ respectively. These latched flag signals are then applied to the PLA circuit 270, and the latched flag signal $\bar{F}_{10}$ is further applied to the output signal generator 320. At this stage, flag signals $\overline{RF}_1$, $RF_2$ and $\overline{RF}_3$ applied to the PLA circuit 270 appear from the output signal generator 320. When the DMA request signal $\overline{SDREQ}$ from first DMA request circuit 220 rises to a high level, a first pulse signal $\bar{\phi}_1$ is produced from the pulse signal control circuit 280 and counted by the control counter 260 and, in turn, produced as a high level signal $q_a$ and low level signals $\bar{q}_b$, $\bar{q}_c$ and $\bar{q}_d$ which are applied to the PLA circuit 270.

When the PLA circuit 270 receives the flag signals $F_9$, $\bar{F}_{10}$, $F_{11}$, $\bar{F}_{12}$, $\bar{F}_{13}$, $\bar{F}_{14}$, $\bar{F}_{15}$ from latch circuit 250, the flag signals $\overline{RF}_1$, $RF_2$, $\overline{RF}_3$ from output signal generator 320 and the high and low level signals $q_a$, $\bar{q}_b$, $\bar{q}_c$, $\bar{q}_d$ from counter 260, as previously described, it checks that the logic equation (1) may not be satisfied in relation to the flag signal $\bar{F}_{15}$. This means that an output signal $\bar{f}_1$ to be issued from PLA circuit 270 is at a high level. When a second pulse signal $\bar{\phi}_1$ is produced from pulse signal control circuit 280, it is counted by the control counter 260 and produced as a high level signal $q_b$ and low level signals $\bar{q}_a$, $\bar{q}_c$, $\bar{q}_d$. Then, the PLA circuit 270 checks that the logic equation (2) may not be satisfied in relation to the flag signal $\bar{F}_{12}$. This means that an output signal $\bar{f}_2$ to be issued from the PLA circuit 270 is at a high level.

When a third pulse signal $\bar{\phi}_1$ is produced from the pulse signal control circuit 280, it is counted by the control counter 260 and produced as high level signals $q_a$, $q_b$ and low level signals $\bar{q}_c$, $\bar{q}_d$. Then, the PLA circuit 270 checks that the logic equation (3) is satisfied in relation to the flag signal $F_{11}$ and produces an output signal $\bar{f}_3$ to be applied to the pulse signal control circuit 330. Thus, the pulse signal control circuit 330 receives a series of the pulse signals $\bar{\phi}_2$ from pulse signal generator 290 to produce a series of pulse signals $\phi_2$ during generation of the output signal $\bar{f}_3$. As a result, the first count circuit 340 starts to count a series of the pulse signals $\phi_2$.

When a fourth pulse signal $\bar{\phi}_1$ is produced from the pulse signal control circuit 280, it is counted by the control counter 260 and produced as low level signals $\bar{q}_a$, $\bar{q}_b$, $\bar{q}_d$ and a high level signal $q_c$. Then, the PLA circuit 270 checks that the logic equations (4), (7) may not be satisfied in relation to the flag signals $\bar{F}_{10}$, $\bar{F}_{13}$. This means that an output signal $\bar{f}_4$ to be issued from the PLA circuit 270 is at a high level. When a fifth pulse signal $\bar{\phi}_1$ is produced from pulse signal control circuit 280, it is counted by the control counter 260 and produced as high level signals $q_a$, $q_c$ and low level signals $\bar{q}_b$, $\bar{q}_d$. Then, the PLA circuit 270 checks satisfaction of each of the logic equations (5), (7) in relation to the flag signals $F_9$, $RF_2$ and $\overline{RF}_3$ to produce an output signal $\bar{f}_4$. The output signal $\bar{f}_4$ from PLA circuit 270 is applied to the second DMA request circuit 300, the address signal generator 310 and the output signal generator 320.

When the output signal generator 320 receives the output signal $\bar{f}_4$ from PLA circuit 270, as previously described, it serves to generate a second output signal $\overline{ESA}$ which is applied to the ignitor 60. This means that the ignition coil of ignitor 60 is forcibly deenergized at the auxiliary deenergization timing given by the ignition control apparatus. However, the ignition coil may not produce any spark voltage at this stage because it is not previously energized. Furthermore, the second DMA request circuit 300 is responsive to the output signal $\bar{f}_4$ from output signal generator 320 to produce high level and DMA request signals r and $\overline{DREQ1}$ which are respectively applied to the pulse signal control circuit 280 and the DMA control device 140. At this stage, the selection-enable signal $\bar{s}$ from DMA request circuit 300 is maintained at a high level.

Then, the pulse signal control circuit 280 is responsive to the high level signal r from DMA request circuit 300 to inhibit generation of the pulse signals $\bar{\phi}_1$ therefrom, and the DMA control device 140 is responsive to the DMA request signal $\overline{DREQ1}$ to produce a hold request signal $\overline{HOLD}$ upon receipt of which CPU reproduces a hold acknowledge signal $\overline{HOLDA}$ to cause high impedance at the data bus DB, address bus AB and control bus $CB_1$. When the DMA control device 140 is responsive to the hold acknowledge signal $\overline{HOLDA}$ to produce DMA acknowledge, memory-enable and data-bus input signals $\overline{DACK1}$, $\overline{MEMEN}$ and $\overline{DBiN}$, the DMA acknowledge signal $\overline{DACK1}$ is applied to the DMA request circuits 220, 300, and the memory-enable and data-bus input signals $\overline{MEMEN}$ and $\overline{DBiN}$ are applied to the control bus $CB_1$.

When the second DMA request circuit 300 produces a selection-enable signal $\bar{s}$ in response to the DMA acknowledge signal $\overline{DACK1}$ from DMA control device 140, the address signal generator 310 is responsive to the selection-enable and output signals $\bar{s}$ and $\bar{f}_4$ to generate a read-enable signal DR/W, a load signal $\bar{u}$ and a binary address signal indicative of the address $E2_{16}$ of RAM. Then, the read-enable signal DR/W is applied to the DMA control device 140, the load signal $\bar{u}$ is applied to the output signal generator 320 and the third count circuit 360, and the binary address signal indicative of the address $E2_{16}$ of RAM is applied to the address $E2_{16}$ of RAM. Thus, the initial deenergization time value of the ignition coil is read out from the address $E2_{16}$ of RAM and applied through the data bus DB to the third count circuit 360 as a binary signal.

When the output signal generator 320 produces flag signals $\overline{RF}_2$ and $RF_3$ upon receipt of the load signal $\bar{u}$ from address signal generator 320, both the flag signals $\overline{RF}_2$ and $RF_3$ are applied to the PLA circuit 270, and the flag signal $\overline{RF}_2$ is applied to the third count circuit 360. Then, the third count circuit 360 is responsive to the flag signal $\overline{RF}_2$ to start counting-down of the initial deenergization time value of the ignition coil, and the output signal $\bar{f}_4$ from PLA circuit 270 rises to a high level in response to the flag signal $\overline{RF}_2$ to make the high level signal r from the second DMA request circuit 300 a low level signal. This again permits generation of the pulse signals $\bar{\phi}_1$ from pulse signal control circuit 280.

When a sixth pulse signal $\bar{\phi}_1$ is produced from pulse signal control circuit 280, it is counted by the control counter 260 and produced as low level signals $\bar{q}_a$, $\bar{q}_d$ and high level signals $q_b$, $q_c$. Then, the PLA circuit 270 checks that the logic equation (8) may not be satisfied in relation to the flag signal $\bar{F}_{14}$. This means that an output signal $\bar{f}_6$ to be issued from PLA circuit 270 is at a high level. When an eighth pulse signal $\bar{\phi}_1$ is produced from pulse signal control circuit 280, it is counted by the control counter 260 and produced as low level signals $\bar{q}_a$, $\bar{q}_b$, $\bar{q}_c$ and a high level signal $q_d$. Thus, generation of the pulse signals $\bar{\phi}_1$ from pulse signal control circuit 280 is inhibited by the high level signal $q_d$ from counter 260.

When the crank-angle of crankshaft 13 reaches thirty degrees under this condition, the signal generator 210 serves to produce a seventh pulse signal $\bar{d}$, as previously described, upon receipt of which the crank-angle count circuit 230 generates a binary signal indicative of the number of the counted pulse signals $\bar{d}$ which is applied to the address signal generator 240. When a DMA request signal $\overline{5DREQ}$ appears from the first DMA request circuit 220, the second DMA request circuit 300 produces a DMA request signal $\overline{DREQ1}$ in response to which the DMA control device 140 generates a hold request signal $\overline{HOLD}$ so that CPU generates a hold acknowledge signal $\overline{HOLDA}$ to cause high impedance at the buses DB, AB and $CB_1$, as previously described. Furthermore, the DMA control device 140 serves to produce a DMA acknowledge signal $\overline{DACK1}$, a memory-enable signal $\overline{MEMEN}$ and a data-bus input signal $\overline{DBiN}$, as previously described. Then, the DMA acknowledge signal $\overline{DACK1}$ is applied to the DMA request circuits 220, 300, and the memory-enable and data-bus input signals $\overline{MEMEN}$, $\overline{DBiN}$ are applied to the control bus $CB_1$. In addition, a low level signal $\bar{l}$ to be issued from DMA request circuit 220 is at a high level due to the pulse signal $\bar{d}$ from signal generator 210.

When the first DMA request circuit 220 is responsive to the DMA acknowledge signal $\overline{DACK1}$ from DMA control device 140 to produce a low level signal $\bar{l}$, the address signal generator 240 applies the binary signal from crank-angle count circuit 230 to RAM as a binary address signal indicative of the address $20C_{16}$ of RAM and produces read-enable and latch signals DR/W and l which are respectively applied to the DMA control device 140 and the latch circuit 250. Then, a plurality of the binary signals $\bar{D}_9$, $\bar{D}_{10}$, $\bar{D}_{11}$, $D_{12}$, $\bar{D}_{13}$, $\bar{D}_{14}$ and $D_{15}$ are inverted and read out from the address $20C_{16}$ of RAM and, in turn, latched by the latch circuit 250 in response to the latch signal l respectively as a plurality of frag signals $\bar{F}_9$, $\bar{F}_{10}$, $\bar{F}_{11}$, $F_{12}$, $\bar{F}_{13}$, $\bar{F}_{14}$ and $F_{15}$. All the latched frag signals from latch circuit 250 are applied to the PLA circuit 270, and the frag signal $\bar{F}_{10}$ is further applied to the output signal generator 320. At this stage, generation of the frag signals $\overline{RF_1}$, $\overline{RF_2}$ and $RF_3$ from the output signal generator 320 are maintained.

When a first pulse signal $\bar{\phi}_1$ appears from the pulse signal control circuit 280 at the trailing edge of the DMA request signal $\overline{5DREQ}$ from DMA request circuit 220, a high level signal $q_a$ and low level signals $\bar{q}_b$, $\bar{q}_c$, $\bar{q}_d$ are produced from the control counter 260. Then, the PLA circuit 270 checks satisfaction of the logic equation (1) in relation to the flag signal $F_{15}$ to produce an output signal $\bar{f}_1$ which is applied to the interrupt control device 120 as a specified angular interrupt signal. Then, the interrupt control device 120 is responsive to the interrupt signal $\bar{f}_1$ to apply an interrupt request signal to CPU through the second control bus $CB_2$.

When CPU is responsive to the interrupt request signal to acknowledge interruption request of the interrupt control device 120, it serves to halt calculation of energization time of the ignition coil. Then, the initial ignition spark advance angle value (for example, eighty eight degrees) is read out by CPU from the address $E4_{16}$ of RAM to determine a five-degree crank-angle (eighty five degrees) for initiation of count in the second count circuit 350 and five-degree crank-angles (ninety degrees to one hundred and fifteen degrees) for definition of main forcible ignition spark advance angles by utilizing the predetermined program from ROM, and count time for determination of the ignition timing is also calculated by CPU from a difference (three degrees) between the initial ignition spark advance angle value and the five-degree crank-angle for initiation of count in the count circuit 350.

Thereafter, CPU serves to store a binary signal $D_{14}$ at the address $222_{16}$ of RAM corresponding to the five-degree crank-angle of eighty-five degrees and to store binary signals $D_{13}$ respectively at the addresses $224_{16}$ to $22E_{16}$ of RAM corresponding to the five-degree crank-angles of ninety degrees to one hundred and fifteen degrees. The calculated count time corresponding to the crank-angle of three degrees is also stored by CPU at the address $E4_{16}$ of RAM. Furthermore, a binary signal indicative of energization time of the ignition coil is read out by CPU from RAM to calculate deenergization time of the ignition coil in relation to the initial ignition spark advance angle value by using the predetermined program. Then, the calculated deenergization time of the ignition coil is stored by CPU at the address $E2_{16}$ of RAM as a binary signal. Additionally, CPU starts again to calculate energization time of the ignition coil upon completing the above execution based on the interruption request.

When a second pulse signal $\bar{\phi}_1$ is produced from pulse signal control circuit 280, the control counter 260 serves to generate a high level signal $q_b$ and low level signals $\bar{q}_a$, $\bar{q}_c$, $\bar{q}_d$, as previously described. Then, the PLA circuit 270 checks that the logic equation (2) is 1 satisfied in relation to the flag signal $F_{12}$, an output signal $\bar{f}_2$ being produced from the PLA circuit 270 to be applied to the DMA request circuit 300, address signal generator 310 and pulse signal control circuit 330. Thus, the pulse signal control circuit 330 is responsive to the output signal $\bar{f}_2$ to stop generation of the pulse signals $\phi_2$ therefrom, and the DMA request circuit 300 is also responsive to the output signal $\bar{f}_2$ to produce a high level signal r and a DMA request signal $\overline{DREQ1}$ which are respectively applied to the pulse signal control circuit 280 and DMA control device 140. At this stage, a selection-enable signal $\bar{s}$ from DMA request circuit 300 is at a high level due to the output signal $\bar{f}_2$.

When the DMA request and high level signals $\overline{DREQ1}$ and r are respectively applied to the DMA control device 140 and pulse signal control circuit 280, as previously described, the pulse signal control circuit 280 stops generation of the pulse signals $\bar{\phi}_1$ therefrom, and the DMA control device 140 serves to apply a DMA acknowledge signal $\overline{DACK1}$ to the DMA request circuits 220, 300 and also to apply memory-enable and data-bus input signals $\overline{MEMEN}$ and $\overline{DBiN}$ to the control bus $CB_1$, as previously described. Then, the DMA request circuit 300 is responsive to the DMA acknowledge signal $\overline{DACK1}$ to produce a selection-enable signal $\bar{s}$ upon receipt of which the address signal generator 310 produces a write-enable signal $\overline{DR/W}$, a load signal $N_t$ and a binary address signal indicative of the address $E0_{16}$ of RAM during generation of the output signal $\bar{f}_2$. Thus, the DMA control device 140 is responsive to the write-enable signal $\overline{DR/W}$ from address signal generator 310 to produce a write-enable signal $\overline{WE}$ and also to make the data-bus input signal $\overline{\text{DBiN}}$ a high level signal. As a result, a calculated value in the first count circuit 340 is applied to RAM through the data bus in response to the load signal $\overline{N}_t$ and stored at the address $EO_{16}$ of RAM as a binary signal. In addition, the pulse signal control circuit 280 starts to generate pulse signals $\phi_1$ at the trailing edge of the load signal $\overline{N}_t$.

When a third pulse signal $\overline{\phi}_1$ is produced from pulse signal control circuit 280, high level signals $q_a$, $q_b$ and low level signals $\overline{q}_c$ and $\overline{q}_d$ are produced from the control counter 260, as previously described. Then, the PLA circuit 270 checks that the logic equation (3) may not be satisfied in relation to the flag signal $\overline{F}_{11}$. This means that an output signal $\overline{f}_3$ from PLA circuit 270 is at a high level. Additionally, the PLA circuit 270 also checks that each of the logic equations (4) to (8) may not be satisfied in case of appearance of each of fourth to sixth pulse signals $\overline{\phi}_1$ from pulse signal control circuit 280.

When the third count circuit 360 counts the initial deenergization time value of the ignition coil down to zero during further rotation of the crankshaft 13, a high level signal $t_d$ is produced from the count circuit 360 in response to the pulse signals $\overline{\phi}_2$ from pulse signal generator 290 and applied to the output signal generator 320. Then, a flag signal $RF_2$ is produced from the output signal generator 320 in response to the high level signal $t_d$ and applied to the PLA and third count circuit 360, and simultaneously a first output signal ESA is produced from the output signal generator 320 and applied to the ignitor 60 to energize the ignition coil.

When a thirteenth pulse signal $\overline{d}$ appears from the signal generator 210 during rotation of the crankshaft 13, a thirteenth binary signal is produced from the crank-angle count circuit 230 and is applied to the address signal generator 240, as previously described. A DMA request signal $\overline{\text{SDREQ}}$ is also produced from the DMA request circuit 220 such that the DMA control device 140 is responsive to a DMA request signal $\overline{\text{DREQ1}}$ from DMA request circuit 300 to apply a DMA acknowledge signal $\overline{\text{DACK1}}$ to the DMA request circuits 220, 300 and also to apply memory-enable and data-bus input signals $\overline{\text{MEMEN}}$ and $\overline{\text{DBiN}}$ to the control bus $CB_1$.

When a low level signal $\overline{l}$ is produced from the DMA request circuit 220 in response to the DMA acknowledge signal $\overline{\text{DACK1}}$, the address signal generator 240 applies the thirteenth binary signal from crank-angle count circuit 230 to RAM as a binary address signal indicative of $218_{16}$ of RAM and produces read-enable and latch signals DR/W and 1 which are respectively applied to the DMA control device 140 and latch circuit 250. Then, a plurality of the binary signals $\overline{D}_9$, $D_{10}$, $\overline{D}_{11}$, $\overline{D}_{12}$, $\overline{D}_{13}$, $\overline{D}_{14}$ and $\overline{D}_{15}$ are read out from the address $218_{16}$ of RAM and applied by the latch circuit 250 to the PLA circuit 270 respectively as a plurality of flag signals $\overline{F}_9$, $F_{10}$, $\overline{F}_{11}$, $\overline{F}_{12}$, $\overline{F}_{13}$, $\overline{F}_{14}$ and $\overline{F}_{15}$, and the flag signal $F_{10}$ is further applied to the output signal generator 320. At this stage, generation of the flag signals $\overline{RF}_1$, $RF_2$ and $RF_3$ from the output signal generator 320 are maintained. When the DMA request signal $\overline{\text{SDREQ}}$ from DMA request circuit 220 rises to a high level, the pulse signal control circuit 280 produces a latch signal $\overline{m}$ and first to fifth pulse signals $\overline{\phi}_1$. Then, the output signal generator 320 is responsive to the latch and flag signals $\overline{m}$ and $F_{10}$ to produce a frag signal $\overline{RF}_3$, and the PLA circuit serves to check that each of the logic equation (1) to (8) may not be satisfied, as previously described. This means that output signals $\overline{f}_1$ to $\overline{f}_6$ from PLA circuit 270 are at a high level respectively.

When an eighteenth pulse signal $\overline{d}$ appears from the signal generator 210 during rotation of the crankshaft 13, the crank-angle count circuit 230 serves to produce an eighteenth binary signal which is applied to the address signal generator 240. The DMA request circuit 220 also produces a DMA request signal $\overline{\text{SDREQ}}$ such that the DMA control device 140 is responsive to a DMA request signal $\overline{\text{DREQ1}}$ from DMA request circuit 300 to apply a DMA acknowledge signal $\overline{\text{DACK1}}$ to the DMA request circuits 220, 300 and to apply memory-enable and data-bus input signals $\overline{\text{MEMEN}}$ and $\overline{\text{DBiN}}$ to the control bus $CB_1$, as previously described.

When the DMA request circuit 220 produces a low level signal $\overline{l}$ in response to the DMA acknowledge signal $\overline{\text{DACK1}}$, the address signal generator 240 applies the eighteenth binary signal from crank-angle count circuit 230 to RAM as a binary address signal indicative of the address $222_{16}$ of RAM and produces read-enable and latch signals DR/W and 1 which are respectively applied to the DMA control device 140 and the latch circuit 250. Then, a plurality of the binary signals $\overline{D}_9$, $D_{10}$, $\overline{D}_{11}$, $\overline{D}_{12}$, $\overline{D}_{13}$, $D_{14}$ and $\overline{D}_{15}$ are read out from the address $222_{16}$ of RAM and applied by the latch circuit 250 to the PLA circuit 270 respectively as a plurality of flag signals $\overline{F}_9$, $F_{10}$, $\overline{F}_{11}$, $\overline{F}_{12}$, $\overline{F}_{13}$, $F_{14}$ and $\overline{F}_{15}$, and the flag signal $F_{10}$ is further applied to the output signal generator 320. At this stage, generation of the flag signals $\overline{RF}_1$, $RF_2$, $\overline{RF}_3$ from the output signal generator 320 are maintained.

When a sixth pulse signal $\overline{\phi}_1$ appears from the pulse signal control circuit 280 after the DMA request signal $\overline{\text{SDREQ}}$ has risen to a high level, low level signals $\overline{q}_a$, $\overline{q}_d$ and high level signals $q_b$, $q_c$ are produced from the control counter 260, as previously described. Then, the PLA circuit 270 checks that the logic equation (8) is satisfied in relation to the flag signal $F_{14}$ and produces an output signal $\overline{f}_6$ in response to which the output signal generator 320 serves to generate an output signal $\overline{f}_{6a}$. The output signal $\overline{f}_{6a}$ from output signal generator 320 is applied to the DMA request circuit 300 and the address signal generator 310. Thus, the DMA request circuit 300 is responsive to the output signal $\overline{f}_{6a}$ to produce high level and DMA request signals r and $\overline{\text{DREQ1}}$ which are respectively applied to the pulse signal control circuit 280 and the DMA control device 140.

Then, the pulse signal control circuit 280 is responsive to the high level signal r from DMA request circuit 300 to stop generation of the pulse signals $\overline{\phi}_1$ therefrom, and the DMA control device 140 is responsive to the DMA request signal $\overline{\text{DREQ1}}$ from DMA request circuit 300 to apply a DMA acknowledge signal $\overline{\text{DACK1}}$ to the DMA request circuits 220, 300 and to apply memory-enable and data-bus input signals $\overline{\text{MEMEN}}$ and $\overline{\text{DBiN}}$ to the control bus $CB_1$. When a selection-enable signal $\overline{s}$ is produced from DMA request circuit 300, the address signal generator 310 serves to produce a read-enable signal DR/W, a load signal $\overline{v}$ and a binary address signal indicative of the address $E4_{16}$ of RAM during generation of the output signal $\overline{f}_{6a}$. The read-enable signal DR/W is applied to the DMA control device 140, the load signal $\overline{v}$ is applied to the output signal generator 320 and second count circuit 350, and the binary address signal indicative of the address $E4_{16}$ of RAM is applied to the address $E4_{16}$ of RAM.

Then, the calculated count time corresponding to the crank-angle of three degrees is read out from the address $E4_{16}$ of RAM and applied to the second count circuit 350. The output signal $\bar{f}_{6a}$ from output signal generator 320 also rises to a high level in response to the load signal $\bar{V}$ so that the high level signal r from the DMA request circuit 300 drops to a low level so as to terminate the DMA request by I/O. Furthermore, the output signal generator 320 is responsive to the load signal $\bar{v}$ to produce a low level signal $\bar{w}$ upon receipt of which the second count circuit 350 starts to count down the calculated count time corresponding to the crank-angle of three degrees. Upon completion of the count-down, the second count circuit 350 receives the pulse signals $\bar{\phi}_2$ from pulse signal generator 290 to produce a high level signal $t_i$ which is applied to the output signal generator 320.

When each of the low level and flag signals $\bar{w}$ and $\overline{RF}_1$ from output signal generator 320 rises to a high level in response to the high level signal $t_i$, count-down of the second count circuit 350 is inhibited by the high level signal w, and the PLA circuit 270 checks satisfaction of each of the logic equations (6), (7) in relation to the flag signal $RF_1$ to produce an output signal $\bar{f}_4$. Then, the output signal generator 320 is responsive to the output signal $\bar{f}_4$ to produce a second output signal $\overline{ESA}$ upon receipt of which the ignition coil of ignitor 60 is deenergized to produce a spark voltage to be applied to the spark plugs 30 through the distributor 31. When the DMA request circuit 300 produces high and DMA request signals r and $\overline{DREQ1}$ in response to the output signal $\bar{f}_4$, generation of the pulse signals $\bar{\phi}_1$ from pulse signal control circuit 280 is inhibited by the high level signal r, and the DMA control device 140 is responsive to the DMA request signal $\overline{DREQ1}$ to produce a hold request signal $\overline{HOLD}$ such that it produces DMA acknowledge, memory-enable and data-bus input signals $\overline{DACK1}$, $\overline{MEMEN}$ and $\overline{DBiN}$ in response to a hold acknowledge signal $\overline{HOLDA}$ from CPU.

When a selection-enable signal $\bar{s}$ appears from the DMA request circuit 300 in response to the DMA acknowledge signal $\overline{DACK1}$, the address signal generator 310 produces a read-enable signal DR/W, a load signal $\bar{u}$ and a binary address signal indicative of the address $E2_{16}$ of RAM, as previously described. Then, the read-enable signal DR/W is applied to the DMA control device 140, the load signal $\bar{u}$ is applied to the output signal generator 320 and the third count circuit 360, and the binary address signal indicative of the address $E2_{16}$ of RAM is applied to the address $E2_{16}$ of RAM. Subsequently, a calculated deenergization time value of the ignition coil is read out from the address $E2_{16}$ of RAM and applied as a binary signal to the third count circuit 360, and flag signals $\overline{RF}_2$, $RF_3$ are produced from the output signal generator 320 in response to the load signal $\bar{u}$ and applied to the PLA circuit 270, the flag signal $\overline{RF}_2$ being further applied to the third count circuit 360. Thus, the count circuit 360 is responsive to the flag signal $\overline{RF}_2$ to start count-down of the calculated deenergization time value of the ignition coil, and simultaneously the PLA circuit 270 makes the output signal $\bar{f}_4$ a high level signal in response to which the high level signal r from DMA request circuit 300 drops to a low level to terminate the DMA request of I/O.

When a nineteenth pulse signal $\bar{d}$ appears from the signal generator 210, the crank-angle count circuit 230 produces a nineteenth binary address signal which is applied to the address signal generator 240. The DMA request circuit 220 also produces a DMA request signal $\overline{5DREQ}$ such that the DMA control device 140 is responsive to a DMA request signal $\overline{DREQ1}$ from the DMA request circuit 300 to produce DMA acknowledge, memory-enable and data-bus input signals $\overline{DACK1}$, $\overline{MEMEN}$ and $\overline{DBiN}$, as previously described. When the DMA request circuit 220 is responsive to the DMA acknowledge signal $\overline{DACK1}$ to produce a low level signal $\bar{l}$, the address signal generator 240 applies the nineteenth binary signal from crank-angle count circuit 230 to RAM as a binary address signal indicative of the address $224_{16}$ of RAM and produces read-enable and latch signals DR/W and l to be respectively applied to the DMA control device 140 and latch circuit 250. Then, a plurality of the binary signals $\bar{D}_9$, $D_{10}$, $\bar{D}_{11}$, $\bar{D}_{12}$, $D_{13}$, $\bar{D}_{14}$ and $\bar{D}_{15}$ are read out from the address $224_{16}$ of RAM and applied by the latch circuit 250 to the PLA circuit 270 respectively as a plurality of flag signals $\bar{F}_9$, $F_{10}$, $\bar{F}_{11}$, $\bar{F}_{12}$, $F_{13}$, $\bar{F}_{14}$ and $\bar{F}_{15}$, and the flag signal $F_{10}$ is further applied to the output signal generator 320. At this stage, generation of the flag signals $RF_1$, $\overline{RF}_2$ and $RF_3$ from the output signal generator 320 are maintained.

When the DMA request signal $\overline{5DREQ}$ rises to a high level, latch and pulse signals l and $\bar{\phi}_1$ are produced from pulse signal control circuit 280, as previously described. Then, the PLA circuit 270 checks under control of the control counter 260 that each of the logic equations (1) to (8) may not be satisfied, as previously described. This means that the main forcible ignition by the ignition control apparatus may not be conducted after the ignition of the spark plug 30. In addition, it will be understood that at a crank-angle of one hundred and twenty degrees the ignition control apparatus repeats the substantially same operation as the above-noted description, thereby to ensure smooth rotation of the engine 10.

In case count-down of the second count circuit 350 is not yet completed at the crank-angle of eighty eight degrees due to sudden increase of rotational speed of the crankshaft 13 during the above-noted operation, the output signal generator 320 maintains generation of the flag signals $\overline{RF}_1$, $RF_2$ and $\overline{RF}_3$. Thus, the PLA circuit 270 checks that each of the logic equations (4), (7) is satisfied in relation to low and high level signals $q_a$, $q_b$, $q_d$ and $q_c$ issued from the control counter 260 during generation of flag signals $\bar{F}_9$, $F_{10}$, $\bar{F}_{11}$, $\bar{F}_{12}$, $F_{13}$, $\bar{F}_{14}$ and $\bar{F}_{15}$ from the latch circuit 250, as previously described. As a result, the PLA circuit 270 serves to produce an output signal $\bar{f}_4$ in response to which the output signal generator 320 generates a second output signal $\overline{ESA}$ to deenergize the ignition coil. This means that the main forcible ignition of engine 10 by the ignition control apparatus is conducted at a five-degree crank-angle of ninety degrees close to the crank-angle of eighty eight degrees, thereby to ensure normal rotation of engine 10.

In case the second count circuit 350 does not produce any second output signal $\overline{ESA}$ upon arrival of the crank-angle to one hundred and fifteen degrees during the above-noted operation, it produces a second output signal $\overline{ESA}$ at a crank-angle of one hundred and twenty degrees to conduct the auxiliary forcible ignition of engine 10 by the ignition control apparatus, as previously described. This means that the ignition of engine 10 can be ensured under normal operation of I/O and DMA control device 140, thereby to maintain rotation of the engine 10. Additionally, in case the ignition of engine 10 may not be conducted at the crank-angle of one hundred and twenty degrees, the ignition coil is released from the energized condition under control of the multivibrator 329 and prevented from its burning.

Although in the above embodiment the present invention is adapted to the six cylinder internal combustion engine 10, it may be also adapted to, for example, a four cylinder internal combustion engine, a rotary engine and the like. In this case, the control specifications of engine 10 may be easily modified in necessity.

While in the above embodiment the engine 10 is controlled by the present invention at a five-degree crank-angle, it may be also controlled at, for example, a thirty-degree crank-angle by easily modifying the control specifications of engine 10. In this case, the crank-angle corresponding to the auxiliary forcible ignition timing of engine 10 may be changed to, for example, an ignition spark retard angle of fifteen degrees.

For practice of the present invention, the ignition control apparatus may be utilized as a device for testing control specifications of combustion engines of various types. Furthermore, the ignition control apparatus may be used as a fuel injection control apparatus in which construction of the ignition control apparatus is modified such that deenergization time of the ignition coil, ignition timing of engine 10 and count time for determination of the ignition timing correspond respectively with deenergization time of the fuel injector, deenergization timing of the fuel injector and count time for determination of the deenergization timing of the fuel injector.

Having thus described the preferred embodiment of the invention it should be understood that numerous structural modifications and adaptations may be resorted to without departing from the spirit of the invention.

What is claimed is:

1. An electronic control apparatus for an internal combustion engine having electric operating means for operating said engine upon activation thereof, the control apparatus comprising:

first detecting means for producing a reference signal indicative of a reference angular position of said engine;

second detecting means for producing a series of electric angular signals respectively at a predetermined angular interval of rotation of said engine;

condition detecting means for detecting operating condition of said engine;

clock means for producing a series of clock signals at a predetermined time interval;

processing means for calculating an optimum angle of said engine necessary for activation of said electric operating means in accordance with said detected operating condition of said engine and a rotational time of said engine, for determining an angular position defined by integer times as large as said predetermined angular interval at the advance angle side of the calculated angle, for calculating an interval of time necessary for said engine to rotate the angular difference between the calculated angle and the determined angular position, and calculating an optimum interval of time for deactivating said electric operating means;

temporary memory means having a plurality of addressable memory locations corrsponding to respective angular positions of said engine which are integer times as large as said predetermined angular interval, said temporary memory means storing first and second informations at respective first and second predetermined storage locations corresponding to starting and terminating points for calculation of a time necessary for rotation of said engine, said temporary memory means further storing a third information at one of said storage locations corresponding to said calculated interval of time;

addressing means for successively addressing said storage locations of said temporary memory means in response to the number of said angular signals produced after said reference signal so that said temporary memory means produces said first, second and third informations when said first, second and said one of said memory locations are addressed respectively;

first counter means for starting and terminating to count said clock signals in response to said first and second informations, respectively, produced from said temporary memory means to thereby count said rotational time of said engine to be used by said processing means for calculating said optimum angle;

second counter means for counting said clock signals in response to said third information produced from said temporary memory means and producing a first signal which deactivates said electric operating means when the count value thereof reaches the calculated interval of time; and third counter means for counting said clock signals in response to said first signal and producing a second signal which activates said electric operating means when the count value thereof reaches the calculated optimum interval of time.

2. An electronic control apparatus for an internal combustion engine having electric operating means for operating said engine, the control apparatus comprising:

first detecting means for producing a reference signal indicative of a reference angular position of said engine;

second detecting means for producing a series of electric angular signals respectively at a predetermined angular interval of rotation of said engine;

condition detecting means for detecting operating conditions of said engine, said operating conditions including a rotational time of said engine to rotate from a first predetermined angular position to a second predetermined angular position;

clock means for producing a series of clock signals at a predetermined time interval;

processing means for calculating an optimum angle of said engine in accordance with said detected operating conditions of said engine, for determining an angular position defined by integer times as large as said predetermined angular interval at the advance angle side of the calculated angle, and for calculating an interval of time necessary for said engine to rotate the angular difference between the calculated angle and the determined angular position;

temporary memory means having a plurality of addressable memory locations corresponding to respective angular positions of said engine which are integer times as large as said predetermined angular interval, said temporary memory means storing an information at one of said storage locations corresponding to said calculated interval of time;

addressing means for successively addressing said storage locations of said temporary memory means in response to the number of said angular signals produced after said reference signal so that said temporary memory means produces said information when said one of said memory locations are addressed; and drive means for activating and deactivating said electric operating means, said drive means including a counter circuit for counting said clock signals in response to said information produced from said temporary memory means and producing an output signal which deactivates said electric operating means when the count value thereof reaches the calculated interval of time.

3. An electronic ignition control apparatus for an internal combustion engine having an output shaft rotated by a piston, an ignition coil adapted to generate a spark voltage upon deenergization thereof and a spark plug activated by the spark voltage to ignite the air-fuel mixture metered into a combustion chamber of said engine so as to operate said piston, the ignition control apparatus comprising:

first detecting means for producing a reference signal indicative of a reference angular position of said output shaft;

second detecting means for producing a series of electric angular signals respectively at a predetermined angular interval of said output shaft related to the reference signal;

third detecting means for producing a first binary signal indicative of the operating condition of said engine;

a pulse signal generator for producing a series of pulse signals at a predetermined frequency;

first memory means for previously memorizing second and third binary signals respectively indicative of the starting and terminating points for calculation of a time necessary for rotation of a predetermined angle defined by integer times as large as said predetermined angular interval, said first memory means further memorizing a program for calculating an optimum spark advance angle of said engine based on a function describing a desired relationship among the operating condition of said engine, a rotational time of said output shaft and the spark advance angle, for determining a fourth binary signal indicative of an angular position defined by integer times as large as said predetermined angular interval at the advance angle side of the calculated advance angle, and for calculating a time defined by the difference between the calculated advance angle and the angular position defined by said fourth binary signal;

second memory means for temporarily storing the second and third binary signals from said first memory means and storing the fourth binary signal and a fifth binary signal indicative of the time defined by the difference between the calculated advance angle and the angular position defined by the fourth binary signal;

a counter circuit responsive to the pulse signals from said pulse signal generator and the electric angular signals from said second detecting means for counting the number of the pulse signals relative to the number of the electric angular signals to selectively produce first to third count signals indicative of the counted numbers of the pulse signals defining respectively the first to third predetermined numbers of the pulse signals; and a programmable-logic-array circuit responsive to the first count signal for producing a first control signal based on a first logic equation describing a relationship between the second binary signal and the first predetermined number of the pulse signals, said programmable-logic-array circuit being responsive to the second count signal for producing a second control signal based on a second logic equation describing a relationship between the third binary signal and the second predetermined number of the pulse signals and being responsive to the third count signal for producing a third control signal based on a third logic equation describing a relationship between the fourth binary signal and the third predetermined number of the pulse signals;

calculation means responsive to the first control signal to start calculation of the number of the pulse signals and responsive to the second control signal to cease the calculation of the number of the pulse signals, said calculation means producing a sixth binary signal indicative of the calculated number of the pulse signals defining the actual rotation time of said output shaft;

processing means for calculating the optimum spark advance angle from the function in dependence upon the first and sixth binary signals such that the fourth binary signal is determined in relation to the calculated spark advance angle to be stored in said second memory means, said processing means further determining an energization timing of said ignition coil in relation to the calculated advance angle and calculating the difference between the calculated spark advance angle and the angular position defined by the fourth binary signal such that the fifth binary signal is determined in relation to the calculated difference to be stored in said second memory means; and drive means responsive to the determined energization timing from said processing means to energize said ignition coil and responsive to the third control signal from said control means to start calculation of the value of the fifth binary signal from said second memory means to conduct deenergization of said ignition coil upon completing the calculation.

4. An electronic ignition control apparatus for an internal combustion engine having an output shaft rotated by a piston, an ignition coil adapted to generate a spark voltage upon deenergization thereof and a spark plug activated by the spark voltage to ignite the air-fuel mixture metered into a combustion chamber of said engine so as to operate said piston, the ignition control apparatus comprising:

first detecting means for producing a reference signal indicative of a reference angular position of said output shaft;

second detecting means for producing a series of electric angular signals respectively at a predetermined angular interval of said output shaft related to the reference signal;

third detecting means for producing a first binary signal indicative of the operating condition of said engine;

a pulse signal generator for producing a series of pulse signals at a predetermined frequency;

first memory means for previously memorizing second and third binary signals respectively indicative of the starting and terminating points for calculation of a time necessary for rotation of a predetermined angle defined by integer times as large as said predetermined angular interval, said first memory means further memorizing a program for calculating an optimum spark advance angle of said engine based on a function describing a desired relationship among the operating condition of said engine, a rotational time of said output shaft and the spark advance angle, for determining fourth and fifth binary signals indicative of angular positions defined by integer times as large as said predetermined angular interval at the advance and retard angle sides of the calculated advance angle respectively, and for calculating a time defined by the difference between the calculated advance angle and the angular position defined by said fourth binary signal;

second memory means for temporarily storing the second and third binary signals from said first memory means and storing the fourth and fifth binary signals and a sixth binary signal indicative of the time defined by the difference between the calculated advance angle and the angular position defined by the fourth binary signal;

control means responsive to the pulse signals from said pulse signal generator and the electric angular signals from said second detecting means for producing a first control signal based on a first logic equation describing a relationship between the second binary signal and the first predetermined number of the pulse signals, for producing a second control signal based on a second logic equation describing a relationship between the third binary signal and the second predetermined number of the pulse signals, for producing a third control signal based on a third logic equation describing a relationship between the fourth binary signal and the third predetermined number of the pusle signals and for producing a fourth control signal based on a fourth logic equation describing a relationship between the fifth binary signal and the fourth predetermined number of the pulse signals;

calculation means responsive to the first control signal to start calculation of number of the pulse signals and responsive to the second control signal to cease the calculation of the number of the pulse signals, said calculation means producing a seventh binary signal indicative of the calculated number of the pulse signals defining the actual rotation time of said output shaft;

processing means for calculating the optimum spark advance angle from the function in dependence upon the first and seventh binary signals such that the fourth and fifth binary signals are determined in relation to the calculated spark advance angle to be stored in said second memory means, said processing means further determining an energization timing of said ignition coil in relation to the calculated advance angle and calculating the difference between the calculated spark advance angle and the angular position defined by the fourth binary signal such that the sixth binary signal is determined in relation to the calculated difference to be stored in said second memory means; and drive means responsive to the determined energization timing from said processing means to energize said ignition coil and responsive to the third control signal from said control means to start calculation of the value of the sixth binary signal from said second memory means to conduct deenergization of said ignition coil upon completing the calculation, said drive means being responsive to the fourth control signal to conduct deenergization of said ignition coil if the calculation of the value of the sixth binary signal may not be completed by said drive means prior to lapse of time necessary for the actual rotation of said output shaft corresponding to the difference between the calculated advance angle and the angular position defined by the fourth binary signal.

5. An electronic ignition control apparatus as claimed in claim 4, wherein said control means includes:

a counter circuit responsive to the pulse signals from said pulse signal generator and the electric angular signals from said second detecting means for counting the number of the pulse signals relative to the number of the electric angular signals to selectively produce first to fourth count signals indicative of the counted numbers of the pulse signals defining respectively the first to fourth predetermined number of the pulse signals; and a programmable-logic-array circuit responsive to the first count signal for producing a first control signal based on a first logic equation describing a relationship between the second binary signal and the first predetermined number of the pulse signals, said programmable-logic-array circuit being responsive to the second count signal for producing a second control signal based on a second logic equation describing a relationship between the third binary signal and the second predetermined number of the pulse signals, being responsive to the third count signal for producing a third control signal based on a third logic equation describing a relationship between the fourth binary signal and the third predetermined number of the pulse signals and being responsive to the fourth count signal for producing a fourth control signal based on a fourth logic equation describing a relationship between the fifth binary signal and the fourth predetermined number of the pulse signals.

6. An electronic ignition control apparatus as claimed in claim 4, wherein said first memory means is arranged to previously memorize an eighth binary signal indicative of deenergization point of said ignition coil defined by integer times as large as said predetermined angular interval at the retard angle side of the determined angle value of the fifth binary signal;

said second memory means is arranged to temporarily store the eighth binary signal from said first memory means;

said control means is responsive to the pulse signals from said pulse signal generator and the electric angular signals from said second detecting means for producing a fifth control signal based on a fifth logic equation describing a relationship between the eighth binary signal and the fifth predetermined number of the pulse signals; and said drive means is responsive to the fifth control signal to conduct deenergization of said ignition coil if said ignition coil may not be deenergized at the determined angle value of the fifth binary signal.

7. An electronic ignition control apparatus for an internal combustion engine having an output shaft rotated by a piston, an ignition coil adapted to generate a spark voltage upon deenergization thereof and a spark plug activated by the spark voltage to ignite the air-fuel mixture metered into a combustion chamber of said engine so as to operate said piston, the ignition control apparatus comprising:

first detecting means for producing a reference signal indicative of a reference angular position of said output shaft;

second detecting means for producing a series of electric angular signals respectively at a predetermined angular interval of said output shaft related to the reference signal;

third detecting means for producing a first binary signal indicative of the operating condition of said engine;

a pulse signal generator for producing a series of pulse signals at a predetermined frequency;

first memory means for previously memorizing second and third binary signals respectively indicative of the starting and terminating points for calculation of a time necessary for rotation of a predetermined angle defined by integer times as large as said predetermined angular interval, said first memory means previously memorizing a plurality of fourth binary signals indicative of angular points respectively defined by integer times as large as said predetermined angular interval in a predetermined angular range permitting deenergization of said ignition coil, said first memory means further memorizing a program for calculating an optimum spark advance angle of said engine based on a function describing a desired relationship among the operating condition of said engine, a rotational time of said output shaft and the spark advance angle, for determining a fifth binary signal indicative of an angular position defined by integer times as large as said predetermined angular interval at the advance angle side of the calculated advance angle, and for calculating a time defined by the difference between the calculated advance angle and the angular position defined by said fifth binary signal;

second memory means for temporarily storing the second, third and fourth binary signals from said first memory means and storing the fifth binary signal and a sixth binary signal indicative of the time defined by the difference between the calculated advance angle and the angular position defined by the fifth binary signal;

control means responsive to the pulse signals from said pulse signal generator and the electric angular signals from said second detecting means for producing a first control signal based on a first logic equation describing a relationship between the second binary signal and the first predetermined number of the pulse signals, for producing a second control signal based on a second logic equation describing a relationship between the third binary signal and the second predetermined number of the pulse signals and for producing a third control signal based on a third logic equation describing a relationship between the fifth binary signal and the third predetermined number of the pulse signals, said control means including a logic circuit responsive to the prior one of the plurality of fourth binary signals for producing a fourth control signal, said control means being responsive to completion of calculation of the value of the sixth binary signal for producing a fifth control signal based on a fifth logic equation describing a relationship between the remaining one of the plurality of fourth binary signals and the fourth control signal;

calculation means responsive to the first control signal to start calculation of the number of the pulse signals and responsive to the second control signal to cease the calculation of the number of the pulse signals, said calculation means producing a seventh binary signal indicative of the calculated number of the pulse signals defining the actual rotation time of said output shaft;

processing means for calculating the optimum spark advance angle from the function in dependence upon the first and seventh binary signals such that the fifth binary signal is determined in relation to the calculated spark advance angle to be stored in said second memory means, said processing means further determining an energization timing of said ignition coil in relation to the calculated advance angle and calculating the difference between the calculated spark advance angle and the angular position defined by the fifth binary signal such that the sixth binary signal is determined in relation to the calculated difference to be stored in said second memory means; and drive means responsive to the determined energization timing from said processing means to energize said ignition coil and responsive to the third control signal from said control means to start the calculation of the value of the sixth binary signal from said second memory means to conduct deenergization of said ignition coil upon completing the calculation during generation of the fifth control signal.

8. An electronic ignition control apparatus as claimed in claim 7, wherein said control means includes:

a counter circuit responsive to the pulse signals from said pulse signal generator and the electric angular signals from said second detecting means for counting the number of the pulse signals relative to the number of the electric angular signals to selectively produce first to third count signals indicative of the counted numbers of the pulse signals defining respectively the first to third predetermined numbers of the pulse signals; and a programmable-logic-array circuit responsive to the first count signal for producing a first control signal based on a first logic equation describing a relationship between the second binary signal and the first predetermined number of the pulse signals, said programmable-logic-array circuit being responsive to the second count signal for producing a second control signal based on a second logic equation describing a relationship between the third binary signal and the second predetermined number of the pulse signals and being responsive to the third count signal for producing a third control signal based on a third logic equation describing a relationship between the fifth binary signal and the third predetermined number of the pulse signals.

* * * * *